United States Patent
Yonemura et al.

[19]

[11] Patent Number: 6,024,420
[45] Date of Patent: *Feb. 15, 2000

[54] BRAKE CONTROL APPARATUS FOR A VEHICLE

[75] Inventors: Shuichi Yonemura, Anjo; Yoichi Abe, Kariya; Mamoru Sawada, Yokkaichi, all of Japan

[73] Assignee: Denso Corporation, Kariya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/773,765

[22] Filed: Dec. 24, 1996

[30] Foreign Application Priority Data

| Dec. 26, 1995 | [JP] | Japan | 7-339555 |
|---|---|---|---|
| Mar. 19, 1996 | [JP] | Japan | 8-063371 |
| Mar. 19, 1996 | [JP] | Japan | 8-063372 |
| Mar. 19, 1996 | [JP] | Japan | 8-063373 |
| Mar. 19, 1996 | [JP] | Japan | 8-063374 |
| Mar. 19, 1996 | [JP] | Japan | 8-063375 |
| Mar. 19, 1996 | [JP] | Japan | 8-063376 |
| Mar. 27, 1996 | [JP] | Japan | 8-072430 |
| Jun. 4, 1996 | [JP] | Japan | 8-141479 |
| Oct. 17, 1996 | [JP] | Japan | 8-274955 |
| Dec. 18, 1996 | [JP] | Japan | 8-338019 |

[51] Int. Cl.[7] ................................................. B60T 8/34
[52] U.S. Cl. ....................................................... 303/113.2
[58] Field of Search ........................... 303/113.4, 115.4, 303/116, 116.1, 116.2, 125, DIG. 11, 113.2, DIG. 3, DIG. 4

[56] References Cited

U.S. PATENT DOCUMENTS

| 4,453,782 | 6/1984 | Arikawa et al. | 303/114 |
|---|---|---|---|
| 4,580,847 | 4/1986 | Burgdorf . | |
| 5,158,343 | 10/1992 | Reichelt et al. . | |
| 5,169,214 | 12/1992 | Holzmann et al. | 303/116.1 |
| 5,236,256 | 8/1993 | Schmidt et al. | 303/113.2 |
| 5,261,730 | 11/1993 | Steiner et al. . | |
| 5,281,012 | 1/1994 | Binder et al. . | |
| 5,322,363 | 6/1994 | Sekiguchi et al. | 303/115.4 |
| 5,342,120 | 8/1994 | Zimmer et al. | 303/113.4 |
| 5,350,224 | 9/1994 | Nell et al. . | |
| 5,350,225 | 9/1994 | Steiner et al. . | |
| 5,367,942 | 11/1994 | Nell et al. . | |
| 5,374,112 | 12/1994 | Takata et al. | 303/116.1 |
| 5,383,719 | 1/1995 | Farr | 303/DIG. 4 |
| 5,393,131 | 2/1995 | Nomura et al. . | |

(List continued on next page.)

FOREIGN PATENT DOCUMENTS

| 2653725 | 5/1991 | France . |
|---|---|---|
| 1800633 | 5/1970 | Germany . |
| 4338906 | 5/1995 | Germany . |
| 54-162207 | 12/1979 | Japan . |
| 55-025621 | 2/1980 | Japan . |

(List continued on next page.)

OTHER PUBLICATIONS

Catalogue for a inner–contact type gear motor.

Primary Examiner—Peter M. Poon
Assistant Examiner—Charles R. Ducker, Jr.
Attorney, Agent, or Firm—Pillsbury Madison & Sutro LLP Intellectual Property Group

[57] ABSTRACT

A brake control apparatus for a vehicle employs a pressure-amplifying device which reduces a quantity of brake fluid generating a first brake-fluid pressure in a first conduit connected to a master cylinder, and increases second brake-fluid pressure in a second conduit, applied to a wheel cylinder simultaneously with the reduction in brake-fluid quantity in the first conduit. As a result, increase in the first brake-fluid pressure is suppressed even when a driver depress a brake pedal and load to generate the first brake-fluid pressure is alleviated. Additionally, the pressure-amplifying device applies the increased second brake-fluid pressure to the wheel cylinder. Therefore, it is possible to ensure sufficient braking force.

12 Claims, 45 Drawing Sheets

U.S. PATENT DOCUMENTS

| | | | |
|---|---|---|---|
| 5,401,083 | 3/1995 | Altmann et al. | 303/113.2 |
| 5,405,191 | 4/1995 | Nishiyama et al. | 303/116.1 |
| 5,427,442 | 6/1995 | Heibel . | |
| 5,445,441 | 8/1995 | Inagawa et al. . | |
| 5,445,444 | 8/1995 | Rump et al. . | |
| 5,487,597 | 1/1996 | Lebret . | |
| 5,492,394 | 2/1996 | Kusano et al. . | |
| 5,496,099 | 3/1996 | Resch . | |
| 5,544,947 | 8/1996 | Nishii et al. | 303/116.2 |
| 5,586,814 | 12/1996 | Steiner . | |
| 5,727,852 | 3/1998 | Pueschel et al. . | |
| 5,779,328 | 7/1998 | Mergenthaler et al. | 303/DIG. 3 |
| 5,882,091 | 3/1999 | Toda et al. | 303/113.2 |

FOREIGN PATENT DOCUMENTS

| | | |
|---|---|---|
| 59-045256 | 3/1984 | Japan . |
| 61-287850 | 12/1986 | Japan . |
| 1-257658 | 10/1989 | Japan . |
| 4-087868 | 3/1992 | Japan . |
| 4-121260 | 4/1992 | Japan . |
| 5-170074 | 7/1993 | Japan . |
| 5-92483 | 12/1993 | Japan . |
| 6-032312 | 2/1994 | Japan . |
| 7-076267 | 3/1995 | Japan . |
| 8-128392 | 5/1996 | Japan . |
| 8-230634 | 9/1996 | Japan . |
| 8-291793 | 11/1996 | Japan . |
| 2 297 134 | 7/1996 | United Kingdom . |

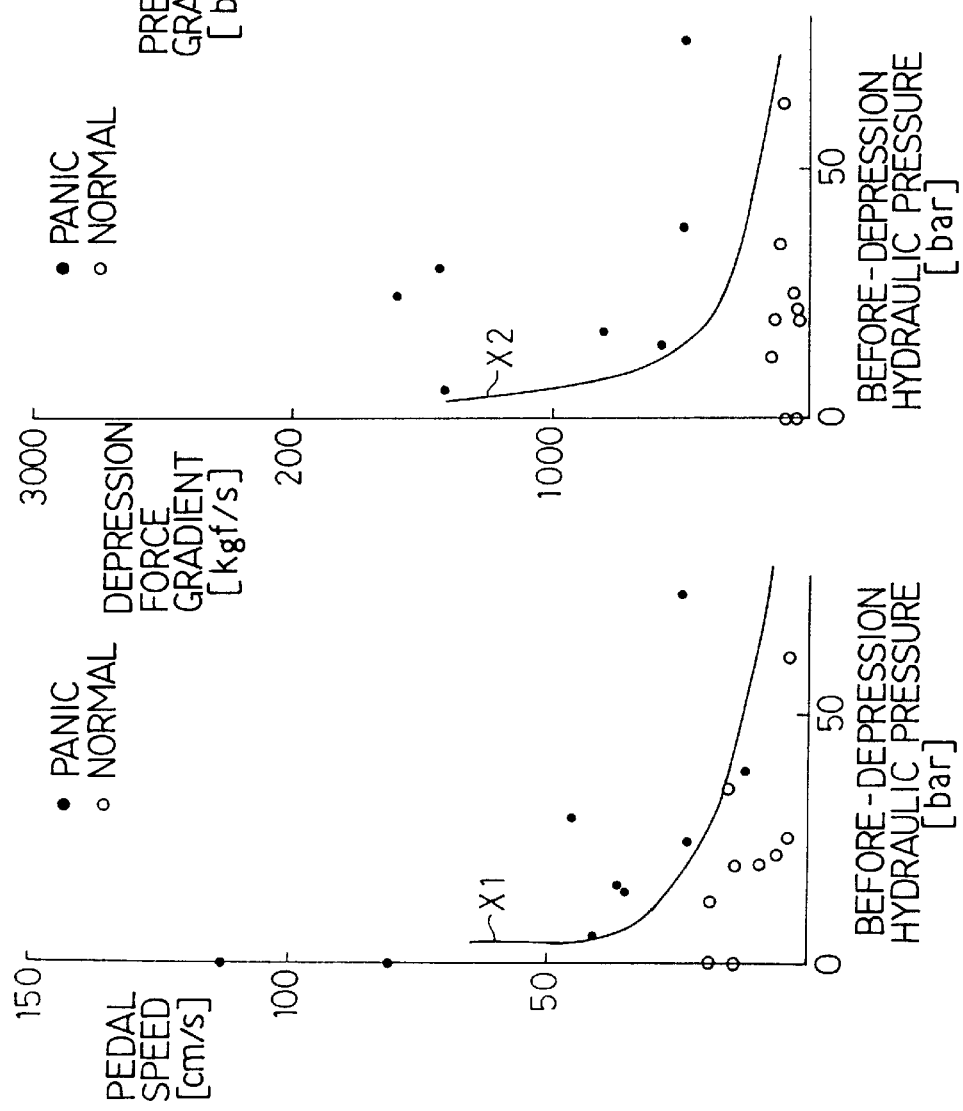

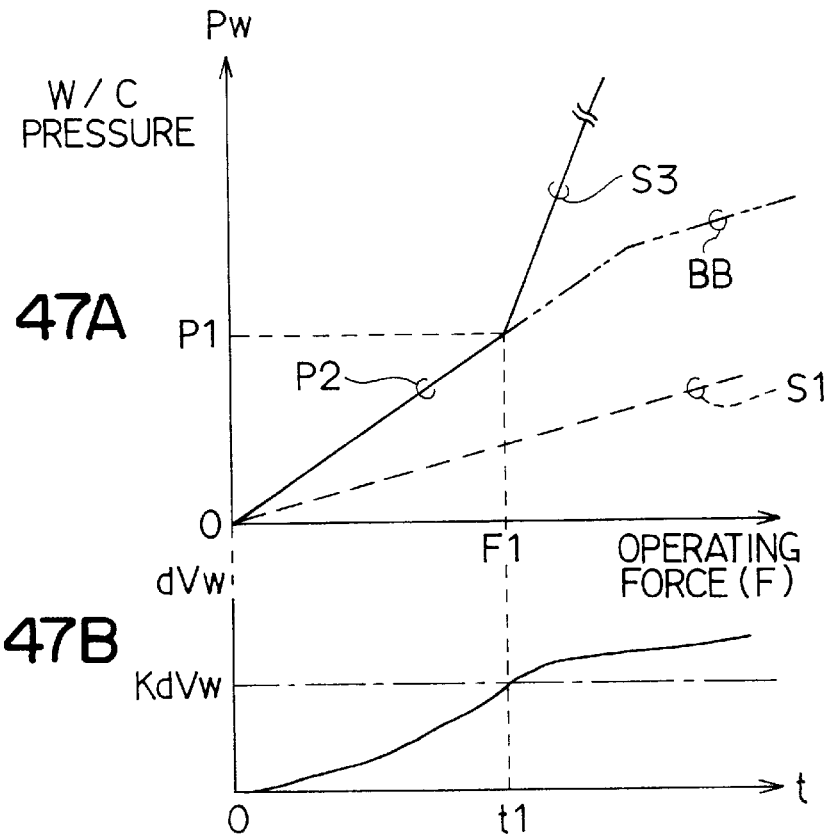
FIG. 47A
FIG. 47B
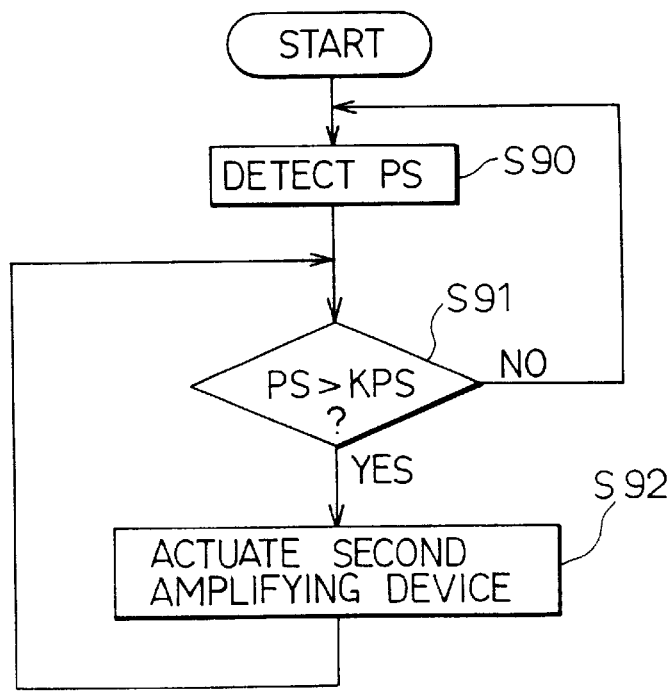
FIG. 48

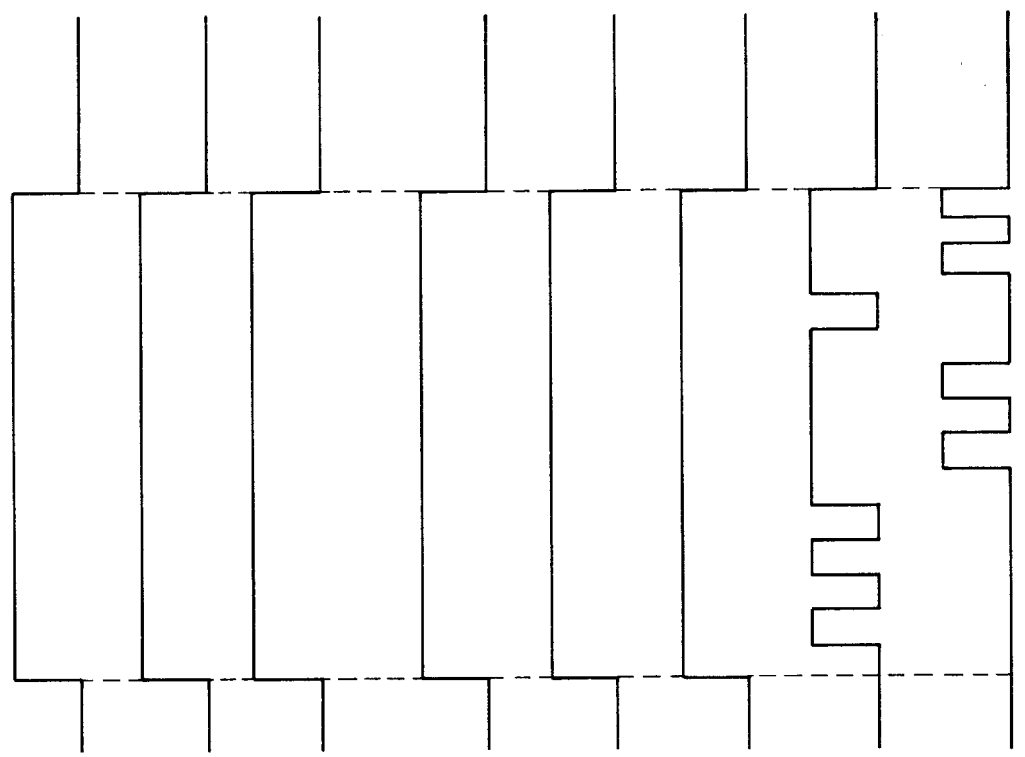

BRAKE CONTROL APPARATUS FOR A VEHICLE

CROSS-REFERENCE TO RELATED APPLICATIONS

The present invention is based upon and claims the benefit of priority of the prior Japanese Patent Applications No. Hei 7-339555 filed on Dec. 26, 1995, No. Hei 8-63371 filed on Mar. 19, 1996, No. Hei 8-63372 filed on Mar. 19, 1996, No. Hei 8-63373 filed on Mar. 19, 1996, No. Hei 8-63374 filed on Mar. 19, 1996, No. Hei 8-63375 filed on Mar. 19, 1996, No. Hei 8-63376 filed on Mar. 19, 1996, No. Hei 8-72430 filed on Mar. 27, 1996, No. Hei 8-141479 filed on Jun. 4, 1996, No. Hei 8-274955 filed on Oct. 17, 1996, and No. Hei. 8-338019 filed on Dec. 18, 1996, the contents of which are incorporated by reference.

BACKGROUND OF THE INVENTION

1. Field of the Invention

The present invention relates to a brake control apparatus for a vehicle, and more particularly, to a brake control apparatus which applies a brake fluid pressure to wheel cylinders that is higher than a pressure generated by a master cylinder to obtain a higher braking force on a road having a high friction coefficient.

2. Related Art

U.S. Pat. No. 5,427,442 discloses a brake fluid pressure boosting apparatus which boosts a brake fluid pressure applied to motor vehicle wheel cylinders to obtain optimal braking force. In the brake fluid pressure boosting apparatus, a brake pressure boosting effect is amplified during panic braking when a driver depresses a brake pedal with maximum force. As a result, greater than normal wheel cylinder pressure is applied to the wheel cylinders, and a high braking force is realized.

The prior art apparatus, however, increases wheel cylinder pressure by amplifying the boosting effect only when a pedal-depression force increase gradient is higher than a predetermined increase gradient. No consideration is given to lessening a reaction force acting on the brake pedal before or after the amplified boosting effect. Accordingly, load with respect to a driver's pedal depression is not lessened before or after the boosting effect is increased.

SUMMARY OF THE INVENTION

It is an object of the present invention to provide a brake control apparatus for a vehicle which not only can ensure high braking force by amplifying brake fluid pressure generated in a brake fluid pressure generating source and applying the amplified brake fluid pressure to wheel cylinders during vehicle braking, but also can lessen the load required to generate brake fluid pressure in the brake fluid pressure generating source.

To achieve this object, the vehicle brake control apparatus according to the present invention utilizes a pressure amplifying device which reduces a quantity of brake fluid generating a first brake fluid pressure in a first conduit, and which increases second brake fluid pressure in a second conduit applied to a wheel braking force generating device simultaneously with the reduction in brake fluid in the first conduit.

As a result, an increase in the first brake fluid pressure is suppressed, and the load required to generate the first brake fluid pressure is lessened by the pressure amplifying device. Additionally, the pressure amplifying device applies the increased second brake fluid pressure to the wheel braking force generating device. Therefore, it is possible to both lessen load at the brake fluid pressure-generating device and to ensure sufficient braking force.

During generation of the first brake fluid pressure, the pressure amplifying device may cause brake fluid to be moved from the first conduit, to which the first brake fluid pressure is applied, to the second conduit which communicates with the wheel braking force generating device. As a result, brake fluid pressure at the second conduit is increased due to the increase in brake fluid quantity.

When the present invention is applied in a brake control apparatus including a brake pedal and a master cylinder, an increase in master cylinder pressure can be suppressed, and so pedal reaction force due to master cylinder pressure also can be reduced. Accordingly, the load caused by brake pedal depression and the master cylinder pressure thus generated can be reduced. Simultaneously, the second brake fluid pressure at the second conduit is boosted to a level higher than that of the master cylinder pressure, and sufficient braking force is ensured.

An anti-skid system may also be combined with a brake control apparatus according to the present invention. In such a case, a switching device may be provided to selectively switch a pump to either take in brake fluid from a reservoir in the anti-skid system, or to take in brake fluid from the first conduit. The pump therefore either discharges brake fluid stored within the reservoir toward a wheel braking force generating device, or outputs brake fluid existing within the reservoir toward the brake fluid pressure generating source at the time of termination of anti-skid control.

BRIEF DESCRIPTION OF THE DRAWINGS

These and other objects, features and characteristics of the present invention will be appreciated from a study of the following detailed description, the appended claims, and drawings, all of which form a part of this application. In the drawings:

FIGS. 42A to 42C are graphs indicating experimental results according to the nineteenth embodiment;

FIGS. 47A and 47B are characteristic diagrams indicating a mode of operation of the twenty-second embodiment;

FIG. 48 is a flow diagram indicating control processing of a twenty-third embodiment;

FIGS. 57A to 57H are timing diagrams indicating operation of the brake control apparatus of the twenty-fifth embodiment;

DETAILED DESCRIPTION OF THE PREFERRED EMBODIMENTS

Numerous embodiments of a brake control apparatus according to the present invention will be described hereinafter with reference to the drawings.

First Embodiment

Figure 1:
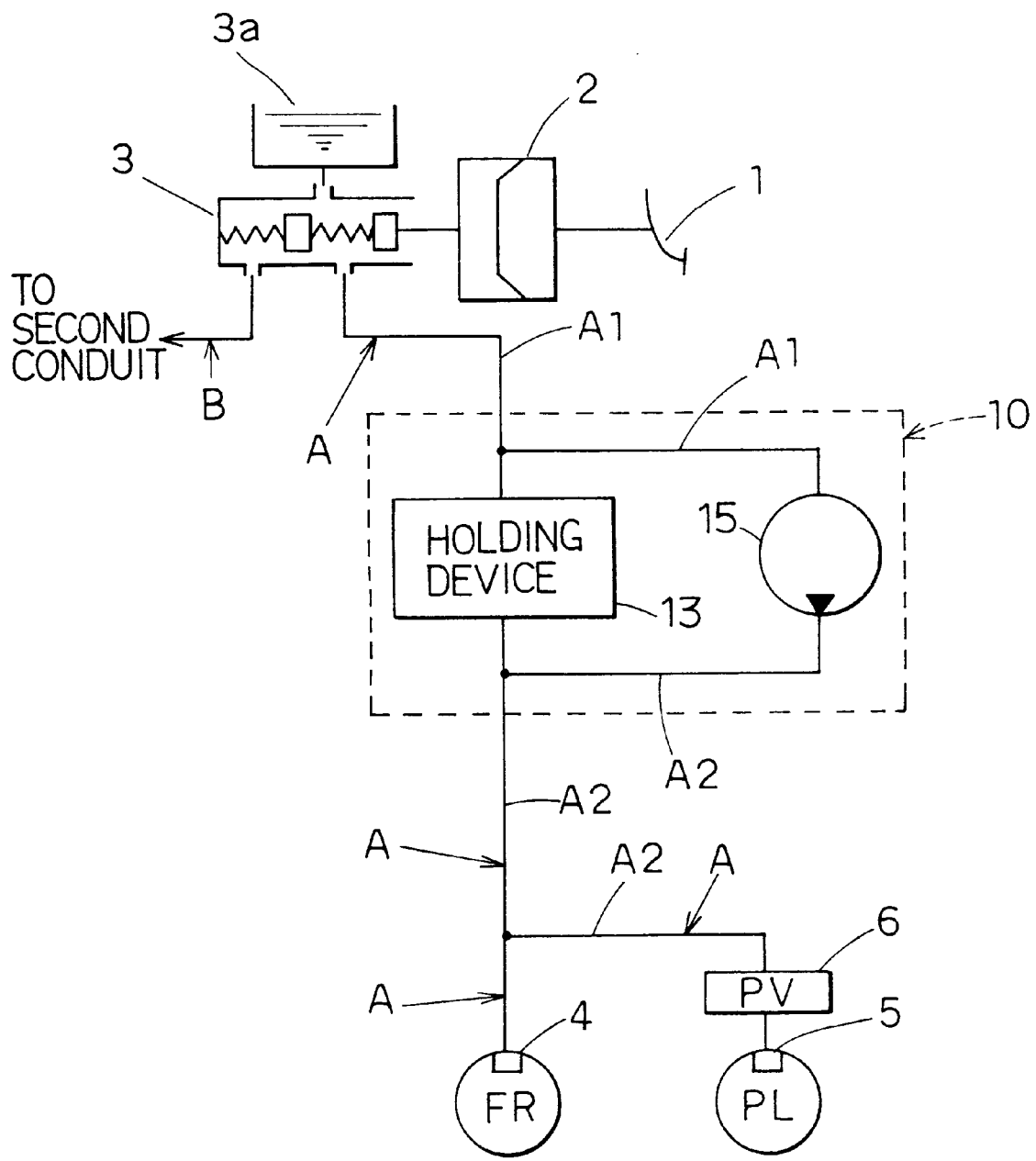
FIG. 1 is a model diagram indicating a first embodiment according to the present invention.

FIG. 1 is a structural view indicating the first embodiment according to the present invention. In the first embodiment, the brake control apparatus is implemented in a vehicle diagonal brake fluid conduit system. The system includes brake fluid conduits that connect the front-right wheel cylinder with the rear-left wheel cylinder, and the front-left wheel cylinder with rear-right wheel cylinder, respectively, in a front-wheel drive four-wheeled vehicle.

In FIG. 1, a brake pedal 1 depressed by a driver when applying braking force to the vehicle is connected to a booster 2, and depression force applied to the pedal 1 and pedal stroke thereof are conveyed to this booster 2. The booster 2 has, for example a first chamber set as an atmospheric-pressure chamber and a second chamber set as a vacuum chamber. An intake-manifold vacuum of an engine, a vacuum generated by a vacuum pump or the like is utilized as the vacuum introduced in the vacuum chamber.

Accordingly, the booster 2 directly boosts the driver's pedal depression or pedal stroke by a pressure differential of the atmospheric-pressure chamber and the vacuum chamber. The booster 2 has a push rod or the like to convey the depression force or pedal stroke boosted in this way to a master cylinder 3, and this push rod generates master cylinder pressure PU by compressing a master piston disposed on the master cylinder 3. The master cylinder 3 is provided with an independent master reservoir 3a to supply brake fluid to the master cylinder 3 or to accumulate excess brake fluid from the master cylinder 3.

Thus, an ordinary vehicle is provided with the brake pedal 1, booster 2, and master cylinder 3 as a brake fluid pressure-generating device for imparting braking force to the vehicle body.

The master cylinder pressure PU generated in the master cylinder 3 is conveyed to brake fluid within a first conduit A linking the master cylinder 3 and a first wheel cylinder 4 disposed in the front-right wheel FR to impart braking force to this wheel, and the master 3 and a second wheel cylinder 5 disposed in the rear-left wheel RL to impart braking force to this wheel. The master cylinder pressure PU is similarly conveyed also to a second conduit linking respective wheel cylinders disposed in the front-left wheel and the rear-right wheel to the master cylinder 3. However, because a structure similar to the first conduit A can be utilized, a detailed description will be omitted.

The first conduit A includes two parts separated by a pressure amplifying device 10 disposed in this first conduit A. That is to say, the first conduit A has a first conduit part Al to receive the master cylinder pressure PU in the interval from the master cylinder 3 to the pressure amplifying device 10 and a second conduit part A2 in the interval from the pressure amplifying device 10 to the wheel cylinders 4, 5.

The pressure amplifying device 10 moves brake fluid of the first conduit part A1 to the second conduit part A2 and holds the pressure at the second conduit part A2 at a second brake fluid pressure PL when the pedal 1 is depressed and the master cylinder pressure PU is generated within the first conduit A. According to the first embodiment, the pressure amplifying device 10 is made up of a holding device 13 and a pump 15 which will be described later.

Additionally, in the structure of the first conduit A, the first conduit part A1 is formed between the holding device 13 and the master cylinder 3 as well as the pump 15 and the master cylinder 3. The second conduit part A2 is formed between the wheel cylinders 4, 5 and the holding device 13 as well as the wheel cylinders 4, 5 and the pump 15. Furthermore, a conventional proportioning control valve 6 is disposed at the second conduit part A2 to operate so that the brake fluid pressure applied to the second wheel cylinder 5 on the rear-left wheel RL side becomes smaller than the brake fluid pressure applied to the first wheel cylinder 4 on the front-right wheel FR. This normal proportioning control valve 6 is provided to prevent the rear wheel, as far as is possible, from falling into a locking state earlier than the front wheel when load movement of the vehicle has occurred during vehicle braking.

The pump 15 is connected within the first conduit A in parallel with the holding device 13, takes in brake fluid from the first conduit part Al, and discharges brake fluid to the second conduit part A2 during generation of the master cylinder pressure PU. That is to say, the pump 15 and the holding device 13 are structured as a brake fluid moving device to move the brake fluid in the first conduit part A1 to the second conduit part A2 when the master cylinder pressure PU has been generated.

A plunger pump utilized in an ordinary anti-skid apparatus, a compressor or the like may be utilized as the pump 15. Additionally, the pump 15 may be constantly driven during generation of the master cylinder pressure PU, or may be driven in accordance with pedal depression force, pedal stroke of the brake pedal 1, or the master cylinder pressure PU. Additionally, the pump 15 may be driven by a motor (not illustrated) utilized in an ordinary anti-skid apparatus.

When brake fluid has been moved from the first conduit part A1 to the second conduit part A2 by the pump 15, and the brake fluid pressure of the second conduit part A2 has become the second brake fluid pressure PL, which is greater than the master cylinder pressure PU, the holding device 13 maintains this differential pressure (PL–PU). When the driver's foot has been removed from the brake pedal 1 and the master cylinder pressure PU has been released, it is preferred that the brake fluid applying the second brake fluid pressure PL to the wheel cylinders 4, 5 be returned to the master cylinder 3 side. At this time, the brake fluid may be returned through the holding device 13. Alternatively, the brake fluid may be returned by changing a two-way valve, connected in parallel to the holding device 13, from an interrupted state to a communicated state when it is detected that the pedal 1 has entered a non-depressed state based on output from a brake switch.

In this way, the pressure amplifying device 10 provided with the pump 15 and the holding device 13 moves the brake fluid of the first conduit part Al, which has assumed the same pressure as the master cylinder pressure PU accompanying depression of the brake pedal 1, to the second conduit part A2, and reduces the brake fluid pressure within the first conduit part A1, i.e., the master cylinder pressure PU. The pressure amplifying device 10 simultaneously maintains the differential pressure of the amplified second brake fluid pressure PL within the second conduit part A2 and the master cylinder pressure PU to thereby perform pressure amplification.

The second brake fluid pressure PL, now greater than the master cylinder pressure PU, is applied to the wheel cylinders 4, 5, so that high braking force is ensured.

A mode of operation according to the brake apparatus structured as was described above will be described hereinafter.

The pump 15 is driven when master cylinder pressure PU has been generated during vehicle braking. The brake fluid in the first conduit part A1 is moved to the second conduit part A2 by the pump 15. As a result, the master cylinder pressure PU is reduced, and an increase in master cylinder pressure PU is suppressed even when the driver has depressed the pedal 1 still more forcefully. Accordingly, reaction force transmitted to the driver through the pedal 1 is lessened, as the master cylinder pressure PU does not become excessive. Accordingly, the load for generating master cylinder pressure PU by the driver is lessened, and the load applied to the master cylinder 3 to generate the master cylinder pressure PU also is also lessened. The master cylinder pressure PU is thus suppressed as is described above, but the brake fluid pressure applied to the wheel cylinders 4, 5 is simultaneously increased by the pressure amplifying device 10. Therefore, sufficient vehicle braking force can be ensured.

Because pressure amplification of the second conduit part A2 is performed utilizing the brake fluid within the first conduit part Al, the brake fluid quantity returned to the master cylinder 3 from the first conduit A when the driver has released the pedal 1 is equivalent to the brake fluid quantity originally introduced into the first conduit A from the master cylinder 3. Accordingly, return of brake fluid to the master cylinder 3 also can be realized without providing excessive brake fluid to the master cylinder 3.

A specific structure and mode of operation of the above-described holding device 13 will be discussed hereinafter with reference to FIG. 2A through FIG. 5B.

Figure 2A:
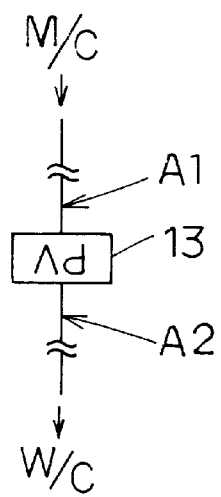
FIG. 2A is a drawing indicating detailed structure of a holding device in the first embodiment.

FIG. 2A is an example of a structure of the holding device 13 utilizing a proportioning control valve (P valve).

As shown in FIG. 2A, the proportioning control valve 13 is connected in reverse relative to the location of the holding device 13 in FIG. 1. The proportioning control valve 13 ordinarily conveys basic pressure of the brake fluid to a downstream side while attenuating the brake fluid pressure with a predetermined attenuation ratio when the brake fluid is flowing in a normal direction.

Figure 2B:
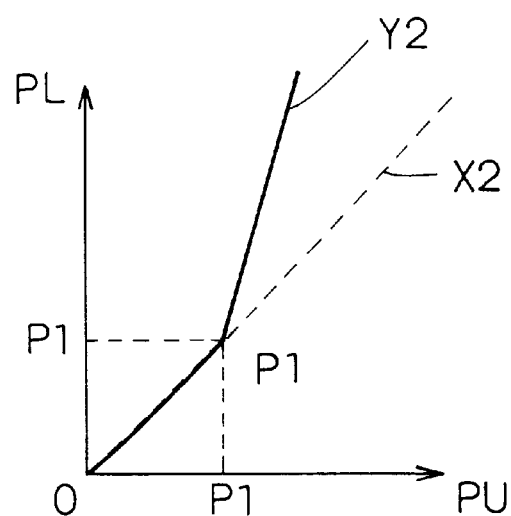
FIG. 2B is a graph illustrating characteristics of the holding device.

Accordingly, when the proportioning control valve 13 is connected in reverse as shown in FIG. 2A, the side of the second conduit part A2 generates the foregoing basic pressure, and the side of the first conduit part A1 becomes the downstream side when the brake fluid flows from the second conduit part A2 to the first conduit part A1 through the proportioning control valve 13. Accordingly, as shown in FIG. 2B, when the brake fluid pressure PL within the second conduit part A2 is greater than or equal to split-point pressure P1 established for the proportioning control valve 13, accompanying an increase in the brake fluid quantity within the second conduit part A2 due to the drive of the pump 15, the second brake fluid pressure PL within the second conduit part A2 is conveyed to the first conduit part A1 in accordance with the slope of line Y2, i.e., the predetermined attenuation ratio.

With the master cylinder pressure PU in the first conduit part A1 as a reference, the second brake fluid pressure PL increased by discharge of the pump 15 due to the proportioning control valve 13 is held in an amplified state in an inverse relationship with the above-described predetermined attenuation ratio. Additionally, because brake fluid pressure corresponding to the second brake fluid pressure PL is held within the first conduit part A1 as well, a suitable master cylinder pressure PU can be assured even if the pump 15 is driven excessively. Accordingly, an abnormal decline in the brake fluid pressure of the first conduit part A1, i.e., the master cylinder pressure PU, and occurrence of an abnormal increase in the stroke of the pedal 1 and a no-load state of pedal reaction force can be prevented.

The master cylinder pressure PU declines when depression of the pedal 1 by the driver has weakened. However, at this time, the second brake fluid pressure PL also declines through the proportioning control valve 13 accompanying the decline in the master cylinder pressure PU. Thus, brake operation corresponding closely to the intention of the driver can be obtained. As is understood from FIG. 2B, when the second brake fluid pressure PL has a smaller brake fluid pressure than the split-point pressure P1 of the proportioning control valve 13, the second brake fluid pressure PL has passed through the proportioning control valve 13 and has been released to the first conduit part side.

Consequently, no differential pressure is established between the first conduit part A1 and the second conduit part A2. Additionally, because the second brake fluid pressure PL is adjusted in accordance with the master cylinder pressure PU when the second brake fluid pressure PL is smaller than the split-point pressure P1, no differential pressure is established between the master cylinder pressure PU and the second brake fluid pressure PL. That is to say, when the master cylinder pressure PU or the second brake fluid pressure PL is smaller than the split-point pressure P1, the master cylinder pressure PU and the second brake fluid pressure PL reach a one-to-one relationship as illustrated by line X2 in FIG. 2B.

Therefore, by increasing the split-point pressure P1 of the proportioning control valve 13, the second brake fluid pressure PL applied to the wheel cylinders 4, 5 is increased in comparison with the master cylinder pressure PU only when high braking force is required and the brake pedal 1 has been forcefully depressed.

When the split-point pressure P1 is established at 0, a differential pressure is ensured so that the second brake fluid pressure PL is increased with respect to the master cylinder pressure PU, and the second brake fluid pressure PL becomes greater than the master cylinder pressure PU when brake fluid is moved by the pump 15.

When brake fluid flows from the first conduit part A1 to the second conduit part A2 through the proportioning control valve 13, brake fluid pressure similar to the basic pressure is conveyed to the downstream side without attenuation of the brake fluid pressure. According to this embodiment, the basic-pressure side of the proportioning control valve 13 is the first conduit part side, and the downstream side is the second conduit part side. Accordingly, when the proportioning control valve 13 is connected in reverse as shown in FIG. 2A, at least the master cylinder pressure PU can be applied to the wheel cylinders 4, 5 even if a situation should occur wherein the master cylinder pressure PU cannot be increased to the second brake fluid pressure PL due to faulty drive of the pump 5.

When the proportioning control valve 13 is utilized as the holding device in this way, not only can a pressure amplifying operation of the brake fluid pressure applied to the wheel cylinders 4, 5 be realized with the mechanical structure, but because the foregoing split-point pressure P1 is may be established as a matter of mechanical design, pressure amplifying operation which accords with the intention of the driver can be realized with substantially no electrical control. For example, pressure amplifying operation is not realized when the master cylinder pressure PU is less than or equal to the split-point pressure P1, even when the pump is started in accompaniment with depression of the brake pedal 1 and the pump 15 is driven constantly during vehicle braking. That is to say, when the value of the split-point pressure P1 is established at a master cylinder pressure PU, where it can be estimated that the brake pedal 1 has been forcefully depressed and the driver requires large braking force, pressure amplifying operation is executed, and brake assistance can be realized, with no electrical control when the master cylinder pressure PU has risen to or above this split-point pressure P1. Furthermore, it is sufficient to utilize a brake switch or the like already ordinarily provided on the vehicle to determine pump drive execution, with no need to add sensor components, complex control, or the like.

A well-known type of load-sensing proportioning valve may be utilized as the proportioning control valve 13. In this case, it is possible to vary the amplifying effect of the second brake fluid pressure, i.e., the split-point pressure P1, in correspondence with varying vehicle weight.

Next, operation of the present invention will be described with reference to FIGS. 3A and 3B when a two-way valve 131 having a port with a differential-pressure valve, and a port to realize a communicated state, are utilized as the holding device of FIG. 1.

Figure 3A:
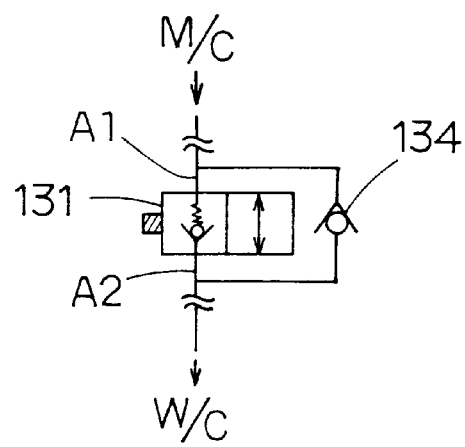
FIG. 3A is a drawing indicating detailed structure of a modification of the holding device.
Figure 3B:
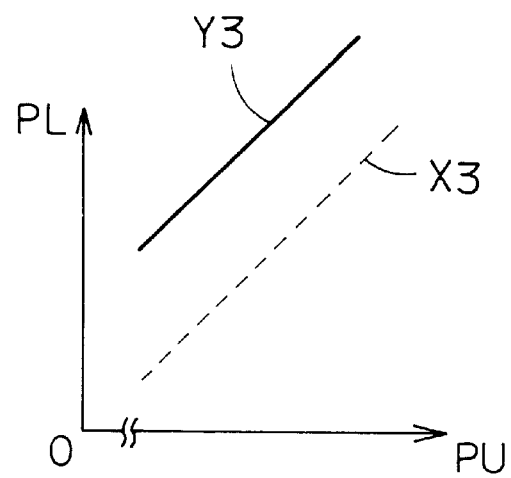
FIG. 3B is a graph illustrating characteristics of the modification of the holding device.

When a needle valve of the two-way valve 131 is moved and the two-way valve 131 takes a position as shown in FIG. 3A as the brake pedal 1 is depressed and the master cylinder pressure PU is generated, brake fluid flow from the first conduit part A1 side to the second conduit part A2 side is prohibited. However, brake fluid flow in the direction from the second conduit part A2 to the first conduit part A1 is permitted when differential pressure of the second brake fluid pressure PL at the second conduit part A2 and the master cylinder pressure PU at the first conduit part A1 has reached a predetermined value. Accordingly, when the pump 15 has been driven, differential pressure between the second brake fluid pressure PL at the second conduit part A2 and the master cylinder pressure PU at the first conduit part A1 is maintained at a predetermined pressure. The second brake fluid pressure PL, which is higher than the master cylinder pressure PU (represented by line X3 in FIG. 3B) by a value corresponding to the predetermined pressure, is applied to the wheel cylinders 4, 5, as represented by line Y3 in FIG. 3B.

When braking is completed, the two-way valve 131 is switched to a communicated state, and brake fluid establishing the second brake fluid pressure PL is released to the master cylinder side.

A check valve 134 is connected in parallel to the two-way valve 131 to allow brake fluid flow from the first conduit part A1 to the second conduit part A2. Accordingly, the second brake fluid pressure PL is maintained, as it is higher than the master cylinder pressure PU even when the second brake fluid pressure PL has been increased with respect to the master cylinder pressure PU. At least the master cylinder pressure PU can be assured to be applied to the wheel cylinders 4, 5 due to the check valve 134 being thus connected, even if the two-way valve 131 is held at the valve position of the differential-pressure valve, or faulty operation of the pump 15 should occur.

Next, operation will be described with reference to FIGS. 4A and 4B where a restrictor 132 is utilized as the holding device 13.

Figure 4A:
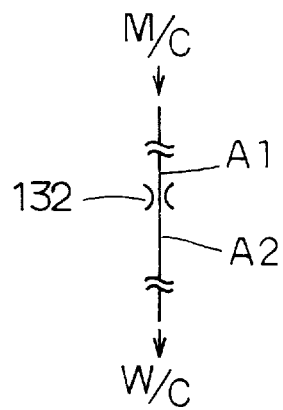
FIG. 4A is a drawing indicating detailed structure of an another modification of the holding device.

When the restrictor 132 is disposed in the first conduit part A1 as shown in FIG. 4A, the brake fluid pressure of the second conduit part A2 can be made higher than the master cylinder pressure PU within the first conduit part A1. This is due to the flow resistance of the restrictor 132 when brake fluid within the first conduit part A1 is moved to the second conduit part A2 by the pump 15.

Figure 4B:
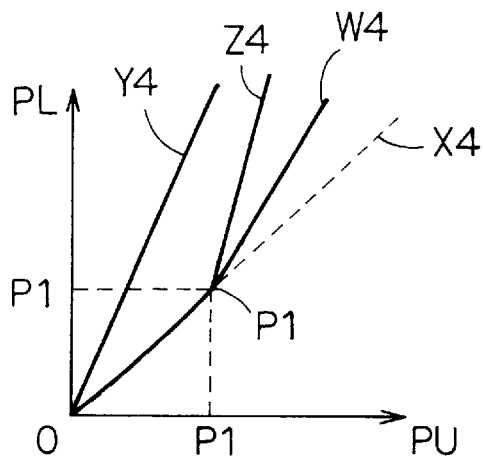
FIG. 4B is a graph illustrating characteristics of the another modification of the holding device.

In this case, it is possible to increase the second brake fluid pressure PL at a certain uniform ratio with respect to the master cylinder pressure PU, as shown by the line Y4 in FIG. 4B, according to the drive method of the pump 15. That is to say, when the pump 15 is driven at a uniform discharge capacity, the characteristic indicated by line Y4 in FIG. 4B is exhibited. Additionally, when the pump 15 is driven after the brake fluid pressure of either the master cylinder pressure PU or the second brake fluid pressure PL has reached a predetermined pressure P1, the characteristic shown by lines Z4 or W4 in FIG. 4B can be obtained without driving the pump 15 until the brake fluid pressure of either the master cylinder pressure PU or the second brake fluid pressure PL becomes the predetermined pressure P1. The characteristic of line Z4 or the characteristic of line W4 can be obtained by varying the discharge capacity of the pump 15.

Figure 5A:
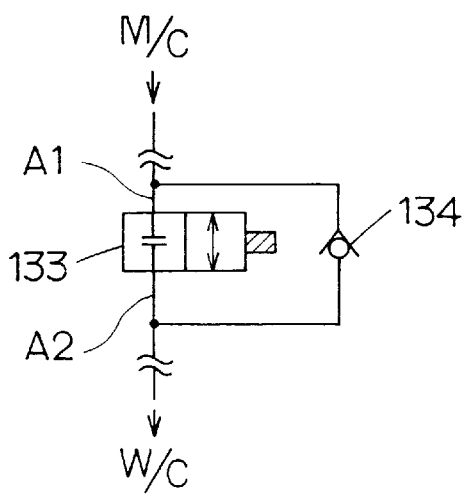
FIG. 5A is a drawing indicating detailed structure of the other modification of the holding device.
Figure 5B:
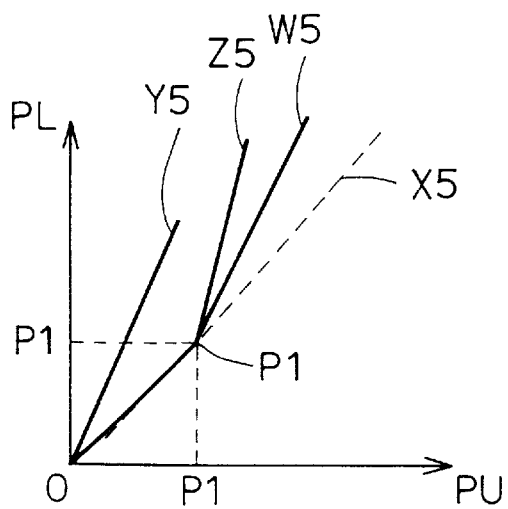
FIG. 5B is a graph illustrating characteristics of the other modification of the holding device.

Next, operation of the present invention will be described when a two-way valve 133 is provided merely with an interrupted position and a communicated position as the holding device 13, as shown in FIGS. 5A and 5B.

When the pump 15 is driven after the master cylinder pressure PU is generated, differential pressure of the second brake fluid pressure PL and the master cylinder pressure PU is realized by interruption of the flow of brake fluid between the first conduit part A1 and the second conduit part A2 by the two-way valve 133 as shown in FIG. 5A. Driving of the pump 15 may be performed at this time so that a uniform discharge capacity is maintained. In such a case, when the interrupted state and the communicated state are variably controlled with a predetermined duty ratio with respect to the valve position of the two-way valve 133, the slope of the relationship between the second brake fluid pressure PL and the master cylinder pressure PU can be varied as is indicated by line Y5 or line Z5 in FIG. 5B.

Further, execution of duty control of the two-way valve 133 may be started in accordance with the master cylinder pressure PU or the second brake fluid pressure PL. In this case, the master cylinder pressure PU and the second brake fluid pressure PL are in a one-to-one relationship until the master cylinder pressure PU and the second brake fluid pressure PL become the predetermined pressure P1 as is indicated by line Z5 or line W5. When the master cylinder pressure PU and the second brake fluid pressure PL are greater than or equal to the predetermined pressure P1, the second brake fluid pressure PL is increased with respect to the master cylinder pressure PU via variable control of the communicated/interrupted state of the two-way valve 133.

Additionally, when execution of communication/interruption control of the two-way valve 133 is started at a uniform duty ratio synchronously with the generation of the master cylinder pressure PU while the pump is being driven at a uniform discharge capacity, an approximately linear pressure-ratio characteristic having a predetermined slope can be obtained, as is indicated by line Y5 in FIG. 5B.

To this point in the description, a characteristic in the relationship of the master cylinder pressure PU and the second brake fluid pressure PL as indicated by line Y5, line Z5, and line W5 was obtained by variably duty-controlling the two-way valve 133 while driving the pump 15 with uniform discharge capacity. However, it is also possible to execute the communication/interruption control of the two-way valve 133 at a uniform duty ratio. In this case, to obtain a characteristic as is indicated in line Y5, line Z5 or line W5, the discharge capacity of the pump 15 is varied. Furthermore, to uniformly or variably control the pump discharge capacity, temperature of the brake fluid or a voltage value or the like for driving the pump may be controlled to adjust pump capacity.

Second Embodiment

Next, a second embodiment further adding an anti-skid system 30 to a brake control apparatus according to the present invention will be described with reference to FIG. 6. Description of structure and operation similar to that of the first embodiment will be omitted.

The structure of the anti-skid system 30 (ABS system) will now be described. Initially, a first pressure-increasing control valve 31 to control an increase in brake fluid pressure to the first wheel cylinder 4, and a second pressure-increasing control valve 32 to control an increase in brake fluid pressure to the second wheel cylinder 5 are disposed in the second conduit part A2. These first and second pressure-increasing control valves 31, 32 are formed by a two-way valve which controls a communicated/interrupted state. Accordingly, when these two-way valves 31, 32 have been controlled in a communicated state, brake fluid pressure due to the master cylinder pressure PU or the brake fluid discharged from the pump 15 can be applied to the wheel cylinders 4, 5.

During normal braking wherein anti-skid control (ABS control) is not executed, these first and second pressure-increasing control valves 31, 32 are constantly controlled to a communicated state.

First and second pressure-reducing control valves 33, 34 are respectively disposed in conduits linking the second conduit part A2 between the above-described first and second pressure-increasing control valves 31, 32 and the wheel cylinders 4, 5, and a second reservoir hole 26 of a reservoir 20. These first and second pressure-reducing control valves 33, 34 remain in an interruption state during normal braking. Communication/interruption control of these first and second pressure-reducing control valves 33, 34 is executed when anti-skid control has started and the first and second pressure-increasing control valves 31, 32 are in an interrupted state. In the state described earlier, when the first or second pressure-reducing control valve 33 or 34 is in an interrupted state, the wheel cylinder pressure of the corresponding wheel cylinder 4 or 5 is maintained. Additionally, when a locking state of a wheel is detected, the first or second pressure-reducing control valve 33 or 34 is caused to be in a communicated state, and the wheel cylinder pressure of the corresponding wheel cylinder 4 or 5 is reduced. At this time, brake fluid which has been applied to the wheel cylinder 4 or 5 passes through the first or second pressure-reducing control valve 33 or 34 and the second reservoir hole 26 and is stored within a reservoir chamber 27. As a result, the several wheel cylinder pressures can be reduced.

Additionally, when it is desired to obtain a locking tendency of the wheel and to increase the wheel cylinder pressure, the wheel cylinder pressure is increased utilizing brake fluid accumulated within the reservoir chamber 27. That is to say, the pump 15 takes in brake fluid from the second reservoir hole 26. The brake fluid discharged from the pump 15 passes through the first or second pressure-increasing control valve 31 or 32, and reaches the wheel cylinder 4 or 5. Thus, brake fluid pressure is applied to the wheel cylinder 4 or 5.

When brake fluid is thus accumulated in the reservoir 20 during anti-skid control, the pump 15 takes in brake fluid from the second reservoir hole 26 and increases the brake fluid pressure applied to the wheel cylinders 4, 5. The reservoir 20 is structured so that the flow of brake fluid between the interior of the reservoir 20 and the first conduit part A1 is interrupted when brake fluid is accumulated within the reservoir 20.

Figure 6:
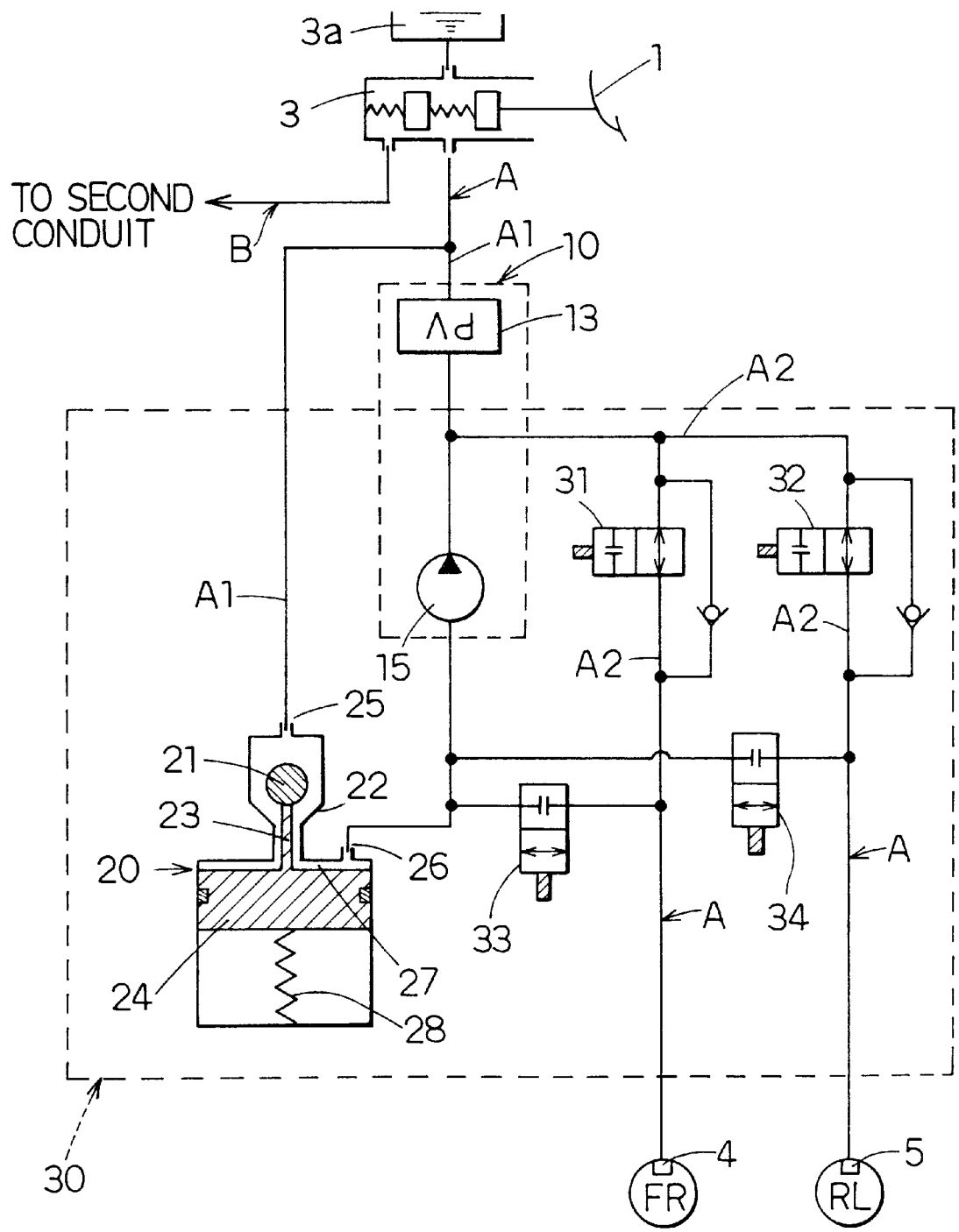
FIG. 6 is a structural view indicating a second embodiment of the present invention.

As shown in FIG. 6, the reservoir 20 is connected between the first conduit part A1 and the brake fluid intake side of the pump 15. This reservoir 20 has a first reservoir hole 25 connected to the first conduit part A1 between the master cylinder 3 and the proportioning control valve 13. The reservoir 20 receives brake fluid from the first conduit part A1 reaches a pressure equivalent to the master cylinder pressure PU. A ball valve 21 is disposed further into the interior of the reservoir 20 than the reservoir hole 25. A rod 23 which has a predetermined stroke to move the ball valve 21 up or down is provided on an underside of the ball valve 21. A piston 24 interlocked with the rod 23 is provided within the reservoir chamber 27. This piston 24 slides downward when brake fluid has flowed from the second reservoir hole 26, accumulating brake fluid within the reservoir chamber 27.

When brake fluid has been accumulated in this way, the piston 24 moves downward. The rod 23 also moves downward in accompaniment thereto, and the ball valve 21 contacts a valve seat 22. Accordingly, when the ball valve 21 contacts the valve seat through the brake fluid accumulated within the reservoir chamber 27, the communication between the intake side of the pump 15 and the first conduit part A1 is interrupted by the ball valve 21 and the valve seat 22. This ball valve 21 and the valve seat 22 constitute a similar mode of operation even in a state of ordinary braking prior to execution of anti-skid control. That is to say, when the master cylinder pressure PU has been generated in an ordinary braking state, brake fluid flows through the first conduit part A1 to the reservoir 20.

However, when an amount of brake fluid corresponding to the stroke of the rod 23 has accumulated within the reservoir 20, the flow of brake fluid is interrupted by the ball valve 21 and the valve seat 22. Accordingly, the reservoir 20 is not filled with brake fluid during ordinary braking, and it is possible to contain brake fluid within the reservoir 20 during pressure-reduction in anti-skid control.

As described above, because the ball valve 21 and the rod 23 are formed separately, a containing capacity within the reservoir 20 during pressure-reduction in anti-skid control can be gained without the stroke of the rod 23 becoming exceedingly long.

When brake fluid within a reservoir chamber 27 has been consumed by the intake of the pump 15 during pressure-increase in anti-skid control, the piston 24 moves to the upper side, and the rod 23 pushes the ball valve 21 to the upper side in accompaniment thereto. Accordingly, the ball valve 21 is separated from the valve seat 22, and the intake side of the pump 15 and the first conduit part A1 are communicated. When communicated in this way, a pressure amplifying device operational mode is executed; namely, the pump 15 takes in brake fluid from the first conduit part A1 and increases the wheel cylinder pressure. Accordingly, there is an immediate transfer to a pressure amplifying operation due to the pressure amplifying device 10, and high braking force can be obtained, even when optimal braking force cannot be obtained by solely the brake fluid quantity within the reservoir 20, for example when the road being traveled changes from a low-friction (low-$\mu$) road to a high-friction (high-$\mu$) road.

A spring 28 which compresses the piston 24 to the upper side and generates an expulsion force for brake fluid within the reservoir chamber 27 is incorporated within the reservoir 20.

When anti-skid control has been completed, brake fluid within the reservoir 20 may return through the proportioning control valve 13 to the master cylinder 3 side by the pump 15 to empty the interior of the reservoir 20. When this is done, sufficient brake fluid can be accumulated within the reservoir 20 when subsequent anti-skid control is executed and wheel cylinder pressure is reduced. When the spring force of the spring 28 is set to be a predetermined value or more, it becomes possible to return brake fluid from the first reservoir hole 25 by this spring force.

When the reservoir 20 structured as described above is utilized, the pump 15 for increasing the second brake fluid pressure in the second conduit part A2 and the pump driven when the wheel cylinder pressure in the anti-skid system is increased or the brake fluid within the reservoir 20 is returned to the master cylinder 3 side can be used in common.

If a three-port two-way valve which can switch a communication mode between a first mode communicating the intake side of the pump 15 and the reservoir 20 and a second mode communicating the intake side of the pump 15 and the first conduit part A1 is provided in the anti-skid system 30, brake fluid accumulated within the reservoir 20 can be controlled to be less than a predetermined quantity. That is to say, when a detector detects the brake fluid quantity more than the predetermined quantity during ordinary braking or during operation of the pressure amplifying device 10, the three-port two-way valve is driven to the first mode to reduce the brake fluid quantity within the reservoir 20. As a result, because the brake fluid quantity within the reservoir 20 is kept to the predetermined quantity or less, when anti-skid control is executed, it is possible to immediately execute pressure-reduction control in anti-skid control.

Third Embodiment

A third embodiment according to the present invention will be described next with reference to FIG. 7 and FIG. 8.

The third embodiment relates to a brake control apparatus including an brake fluid quantity amplifying device 40 in addition to the pressure amplifying device 10 described in the first embodiment.

The brake fluid quantity amplifying device 40 will be described with reference to FIG. 7. The brake fluid quantity amplifying device 40 is provided with an independent reservoir 41 and a brake fluid quantity amplifying pump 42 taking in brake fluid from the reservoir 41 and discharging the pressurized brake fluid to a second pressure chamber 47 within a pressure-proportioning cylinder 45.

In the pressure-proportioning cylinder 45, a first pressure chamber 46 into which the master cylinder pressure PU from the first conduit part A1 is introduced, the second pressure chamber 47, and a third pressure chamber 48 are formed by a piston 49 disposed therein. The reservoir 41 is communicated with the second pressure chamber 47. However, when the brake pedal 1 has been depressed and a predetermined pressure has been generated in the master cylinder 3, the communication between the reservoir 41 and the pressure chamber 47 are interrupted by the piston 49 moving leftward in the drawing. Additionally, accompanying this movement of the piston 49, a discharge port of the brake fluid quantity amplifying pump 42 and the second pressure chamber 47 are communicated. The brake fluid pressure within the second pressure chamber 47 becomes high pressure. When the depression of the brake pedal 1 is weakened, the master cylinder pressure PU falls to a predetermined value, and the piston 49 causes the second pressure chamber 47 and the independent reservoir 41 to communicate as shown in FIG. 7, the brake fluid pressure of the second pressure chamber 47 is released to the reservoir 41 side. At this time, the discharge port of the brake fluid quantity amplifying pump 42 is interrupted by the piston 49 moving rightward in the drawing.

The third pressure chamber 48 and the second pressure chamber 47 are communicated via a brake fluid quantity amplifying proportioning control valve 43. This brake fluid quantity amplifying proportioning control valve 43 attenuates the brake fluid pressure from the second pressure chamber 47 with a predetermined ratio and conveys the attenuated brake fluid pressure to the third pressure chamber 48.

The relationship between the brake fluid pressure introduced in the third pressure chamber 48 through the brake fluid quantity amplifying proportioning control valve 43 and the brake fluid pressure within the second pressure chamber 47 when the brake fluid pressure of the second pressure chamber 47 has been caused to be high pressure by the brake fluid quantity amplifying pump 42 is determined by the attenuation ratio established in the brake fluid quantity amplifying proportioning control valve 43.

The piston 49 is moved laterally by the relationship between the master cylinder pressure PU and the brake fluid pressure in the third pressure chamber 48. When the brake fluid pressure in the third pressure chamber 48 is larger than the master cylinder pressure PU, the second pressure chamber 47 communicates with the reservoir 41 and the communication of brake fluid quantity amplifying pump 42 and the second pressure chamber 47 is prohibited. As a result, the brake fluid pressure in the second pressure chamber 47 is reduced. The brake fluid pressure in the third pressure chamber 48 is also reduced in response to decrease of the brake fluid pressure in the second pressure chamber 47.

However, the brake fluid pressure in the third pressure chamber 48 is lower than the brake fluid pressure in the second pressure chamber 47 by a value corresponding to an attenuation ratio of the brake fluid quantity amplifying proportioning control valve 43. When the brake fluid pressure in the third pressure chamber 48 falls below the master cylinder pressure PU, the piston 49 moves leftward in the drawing. As a result, the brake fluid quantity amplifying pump 42 is communicated with the second pressure chamber 47 and the communication between the second pressure chamber 47 and the reservoir 41 is interrupted. Accordingly, the brake fluid pressure in the second pressure chamber 47 is increased by the pressurized brake fluid discharged from the brake fluid quantity amplifying pump 42. In this way, the brake fluid pressure in the second pressure chamber is kept to the pressure higher than the master cylinder pressure PU by the value corresponding to the attenuation ratio of the brake fluid quantity amplifying proportioning control valve 43.

Communication or interruption of the brake fluid within the second pressure chamber 47 to the second conduit part A2 is controlled by a brake fluid quantity amplifying control valve 44. This brake fluid quantity amplifying control valve 44 is normally in an interrupted state, but is controlled to a communicated state according to vehicle behavior, such as a slippage state. When the brake fluid quantity amplifying control valve 44 is in a communicated state, high-pressure brake fluid flows through the brake fluid quantity amplifying control valve 44 to the wheel cylinders 4, 5. Further, the brake fluid quantity amplifying control valve 44 is not exclusively limited to being controlled according to the vehicle behavior, but may be controlled in accordance with a state of the brake pedal 1. For example, the brake fluid quantity amplifying control valve 44 is controlled to a communicated state when the brake pedal 1 has been depressed and a predetermined period of time has elapsed.

In the brake control apparatus having the brake fluid quantity amplifying device 40, brake fluid pressure even higher than the second brake fluid pressure PL of the second conduit part A2 increased by the pressure amplifying device 10 can be realized. Additionally, brake fluid quantity comes to be amplified with respect to the brake fluid in the second conduit part A2 as a result that brake fluid is supplied to the second conduit part A2 from the independent reservoir 41. When the operation of the brake fluid quantity amplifying device 40 is subsequently started after termination of operation of, for example, the pressure amplifying device 10, still greater braking force can be ensured by the brake fluid quantity amplifying device 40 while maintaining a lowered state of depression force due to the pressure amplifying device 10 and causing only a minimal burden to remain with the driver.

At this time, a suitable reaction force can be caused to remain with pedal feel without further lessening of the reaction force, due to the operation of the pressure amplifying device 10 being terminated. Additionally, when switched from operation of the pressure amplifying device 10 to operation of the brake fluid quantity amplifying device 40, reduction of the brake fluid quantity of the first conduit part A1, i.e., reduction of the brake fluid pressure within the first conduit part A1, by the pressure amplifying device 10 is terminated. The pressure of the second conduit part A2 is increased due to brake fluid quantity amplification, and so it becomes possible to prevent excessive lengthening of the pedal stroke while ensuring braking force.

Amplification of the brake fluid quantity with respect to the second conduit part A2 by the brake fluid quantity amplifying device 40 and movement and pressure-increasing of brake fluid from the first conduit part A1 to the second conduit part A2 by the pressure amplifying device 10 may be alternately switched and controlled or simultaneously executed. In this case, lessening of the reaction force and amplification of the pressure applied to the wheel cylinders 4, 5 by the pressure amplifying device 10 can be realized. At the same time, it is possible to prevent an extremely low reaction force from the brake pedal 1, and to impart an appropriate reaction force to the driver via the pressure amplifying device 10.

Figure 7:
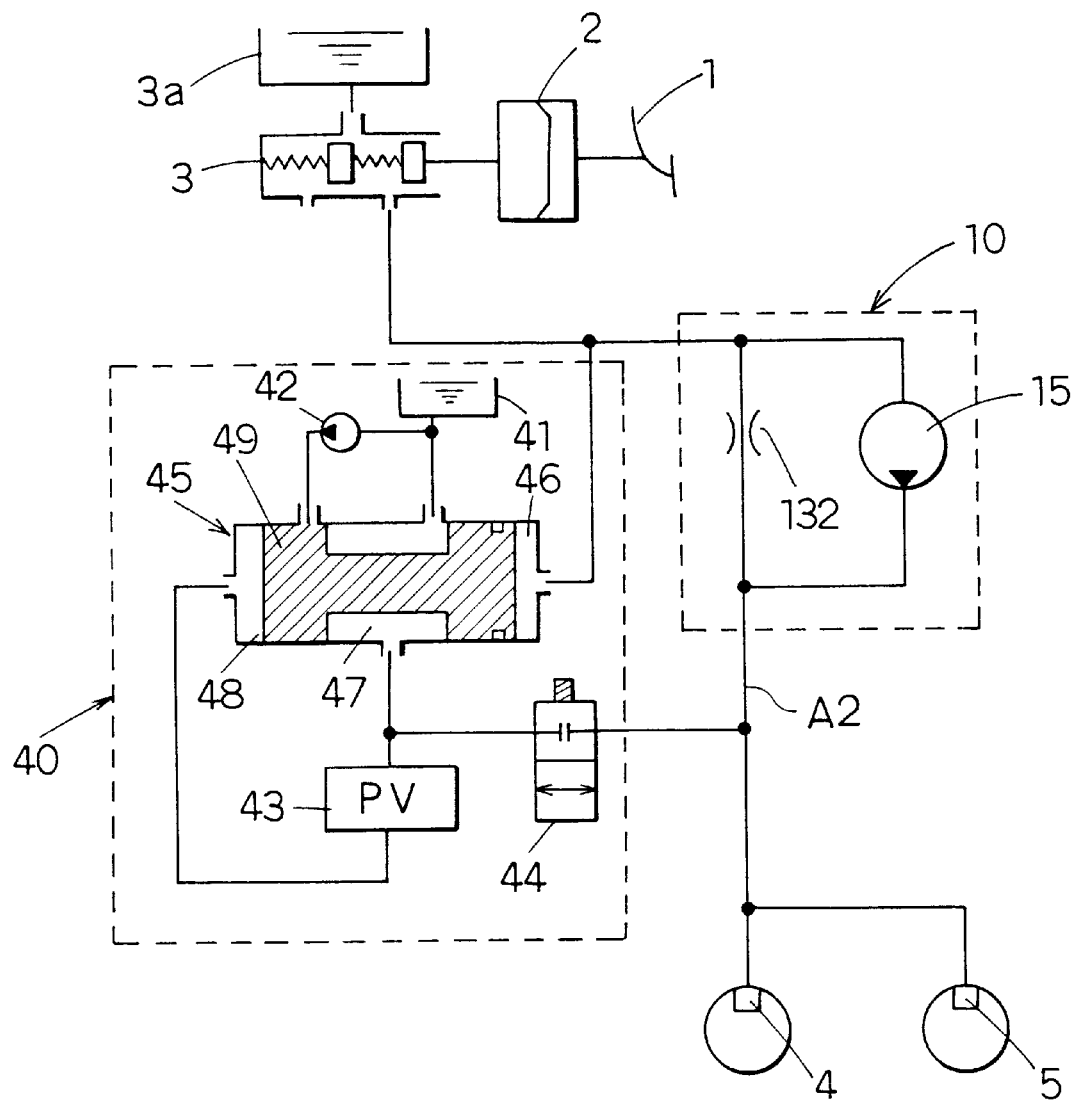
FIG. 7 is a structural view indicating a third embodiment of the present invention.
Figure 8:
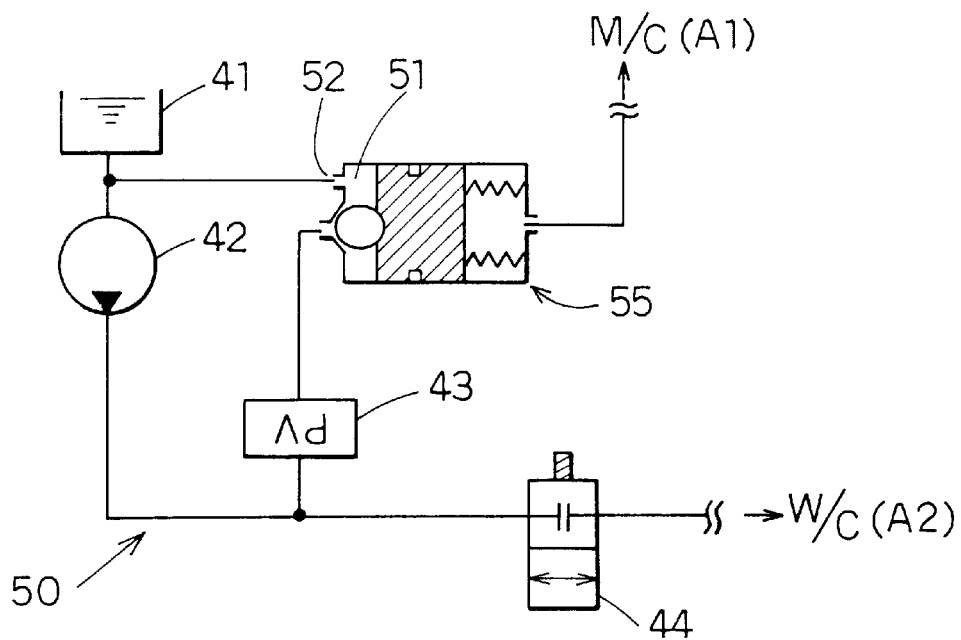
FIG. 8 is a modification of a brake fluid amplifying device in the third embodiment.

FIG. 8 indicates a brake fluid quantity amplifying device 50 which can be substituted for the brake fluid quantity amplifying device 40 in FIG. 7.

This brake fluid quantity amplifying device 50, as with the foregoing third embodiment, is provided with an independent reservoir 41 and a brake fluid quantity amplifying pump 42 which can taken in brake fluid from the reservoir 41 and discharge the brake fluid under high pressure. The discharge line of the brake fluid quantity amplifying pump 42 is connected to the second conduit part A2 via the brake fluid quantity amplifying control valve 44. A brake fluid quantity amplifying proportioning control valve 43, which attenuates the brake fluid pressure with a predetermined attenuation ratio when high-pressure brake fluid from the brake fluid quantity amplifying pump 42 has passed, is connected to a conduit extending from the conduit between the discharge side of the brake fluid quantity amplifying pump 42 and the brake fluid quantity amplifying control valve 44. A check valve 55 is disposed in a conduit connecting the brake fluid quantity amplifying proportioning control valve 43 and the first conduit part A1. This check valve 55 acts so that the master cylinder pressure PU from the first conduit part A1 side and the pressure of the brake fluid existing between the brake fluid quantity amplifying proportioning control valve 43 and the check valve 55 become substantially identical. That is to say, the check valve 50 acts so that the master cylinder pressure PU and the brake fluid pressure attenuated by the brake fluid quantity amplifying proportioning control valve 43 in brake fluid discharged by the brake fluid quantity amplifying pump 42 are substantially identical. More specifically, the check valve 50 compares the master cylinder pressure PU and the brake fluid pressure attenuated by the brake fluid quantity amplifying proportioning control valve 43.

When the brake fluid pressure between the brake fluid quantity amplifying proportioning control valve 43 and the check valve 55 is higher than the master cylinder pressure PU, the brake fluid pressure in a fluid chamber 51 in the check valve 55 is reduced based on the fact that the brake fluid returns to the reservoir 41 via a hole 52. As a result, brake fluid pressure equivalent to the master cylinder pressure PU is obtained in the fluid chamber 51. When the brake fluid pressure in the fluid chamber is less than the master cylinder pressure PU, the brake fluid pressurized by the brake fluid quantity amplifying pump 42 is introduced into the fluid chamber via the brake fluid quantity amplifying proportioning control valve 43. As a result, the brake fluid pressure of the conduit between the brake fluid quantity amplifying control valve 44 and the brake fluid quantity amplifying pump 42, which is increased by the pressurized brake fluid discharged from the brake fluid quantity amplifying pump 42, is adjusted to a pressure value of a predetermined ratio with respect to the master cylinder pressure PU. That is to say, when the master cylinder pressure PU is greater than or equal to the split-point pressure of the brake fluid quantity amplifying proportioning control valve 43, the brake fluid pressure of the conduit between the brake fluid quantity amplifying control valve 44 is increased at a reciprocal multiple of the attenuation ratio established in the brake fluid quantity amplifying proportioning control valve 42, with respect to the master cylinder pressure PU.

Accordingly, when the value of the attenuation ratio established in the brake fluid quantity amplifying proportioning control valve 42 is uniform, the brake fluid pressure of the above conduit is changed, accompanying the increase or reduction in the master cylinder pressure PU, in inverse proportion to the attenuation ratio established in the brake fluid quantity amplifying control valve 44.

Thus, high pressure brake fluid flows to the second conduit part A2 due to communication of the brake fluid quantity amplifying control valve 44. As a result, the brake fluid quantity of the second conduit part A2 is amplified. By performing amplification of the brake fluid quantity in this way, effects similar to the third embodiment can be obtained.

Furthermore, the check valve 55 may cause the brake fluid pressure in the conduit between the brake fluid quantity amplifying proportioning control valve 43 and the check valve 55 not to be identical with the master cylinder pressure PU, but rather to have a predetermined ratio with respect to the master cylinder pressure PU.

Additionally, it is possible to omit the brake fluid quantity amplifying control valve 44. In this case, pressure amplification by the pressure amplifying device 10 with respect to the second conduit part A2 and amplification of the brake fluid quantity by the brake fluid quantity amplifying device 50 are executed simultaneously in accordance with the generation of the master cylinder pressure PU. Accordingly, reduction in reaction force, and increase in pressure due to the movement of brake fluid from the first conduit part A1 to the second conduit part A2 executed by the pressure amplifying device 10 can be realized. Also, an increase in pressure and prevention of an excessive increase in pedal stroke due to the increase in the brake fluid quantity with respect to second conduit part A2 by the brake fluid quantity amplifying device 50 can be realized.

The restrictor 132 in FIG. 7 may be replaced with the proportioning control valve 13 described in the first embodiment. In this case, the split-point pressure in the proportioning control valve 13 and the split-point pressure in the brake fluid quantity amplifying proportioning control valve 43 may be established at differing values. When, for example, the split-point pressure in the brake fluid quantity amplifying proportioning control valve 43 is established to be greater than the split-point pressure in the proportioning control valve 13, the brake fluid quantity is amplified only when the second brake fluid pressure PL in the second conduit part A2 is greater than the split-point pressure established in the proportioning control valve 13, and has become greater than the split-point pressure established in the brake fluid quantity amplifying proportioning control valve 43.

Fourth Embodiment

A fourth embodiment will be described next with reference to FIG. 10. For structure similar to the embodiments described above, description thereof will be omitted.

In the fourth embodiment, the proportioning control valve 13 and the pump 15 are incorporated within the wheel cylinders 4, 5 to generate braking force at the wheels. That is to say, the proportioning control valve 13 and the pump 15 are disposed within components of the wheel cylinders 4, 5. Moreover, a conduit communicating between the proportioning control valve 13 and pump 15 and a wheel piston 63 to generate wheel braking force is also disposed within the components of the wheel cylinders 4, 5.

When the wheel piston 63 receives brake fluid pressure and is moved rightwardly in the drawing, a pad 61 is compressed against a disc rotor 60, and braking force is generated at the wheel. The disc rotor 60 rotates integrally with the wheel, and the wheel is braked by friction between the disc rotor 60 and the pad 61.

The pump 15 in this embodiment receives drive energy from the disc rotor 60 rotating together with the wheel. That is to say, a transmission member 62 interconnecting the interval between the pump 15 and the disc rotor 60, and transmitting the rotational energy of the disc rotor 60 to the pump 15, and a clutch 65 disposed in the transmission member 62 to control an interconnected state between the pump 15 and the disc rotor 62, are provided.

The transmission member 62 may be eccentric by a predetermined quantity from the center of a wheel axle 64, to generate piston motion or scroll motion in the pump 15. In this embodiment, the clutch 65 is located on the rear-wheel side, and is not provided on the front-wheel side. As a result, the front-wheel side is constantly driven by the pump 15 while the wheels are rotating. However, when master cylinder pressure is generated, the proportioning control valve 13 does not exert pressure-holding action. Therefore, brake fluid merely circulates along the conduit, and the pad 61 is not pushed toward the disc rotor 60.

Moreover, because hydraulic pulsation constantly acts upon the wheel piston 63 due to the brake fluid circulating in this way, clearance between the wheel piston 63 and the pad 61 can be maintained at a minimum distance, and initial response at the time of brake pedal depression can be enhanced. That is to say, because force is constantly applied to the wheel piston 63 by the hydraulic pulsation, there is no leftward movement of the wheel piston 63 in the drawing, and no enlargement of clearance due to body vibration or the like. Additionally, when the pump 15 is constantly driven on the front-wheel side, a constant pressure amplifying action is exerted when master cylinder pressure greater than the split-point pressure of the proportioning control valve 13 is generated in the master cylinder 3 when the brake pedal 1 is depressed by the driver.

Furthermore, the rotational speed and discharge pressure of the pump 15 also change in accordance with wheel rotational speed. That is to say, the discharge pressure of the pump 15 becomes small when wheel rotational speed is low, and the discharge pressure of the pump 15 becomes large when wheel rotational speed is high. Even when the master cylinder pressure PU is uniform, a large pressure amplifying action can be exhibited when wheel rotational speed is high, and only a small pressure amplifying action is exhibited when wheel rotational speed is low. As a result, so-called jerky braking can be prevented when vehicle body speed is low. Further, pressure-increase gain of the brake fluid pressure applied to the wheel piston 63 can be increased and short-distance braking can be realized when vehicle body speed is high.

Because a clutch 65 is utilized on the rear-wheel side, the clutch 65 may be connected and pressure amplifying action may be realized after a predetermined time has elapsed subsequent to, for example, brake pedal depression.

An electrical type clutch mechanism may be utilized in the clutch 65, or a mechanical type clutch mechanism may be also utilized. When, for example, an electrical type clutch mechanism is actuated, a brake-switch signal (not illustrated) may be received and the clutch connected; when a mechanical type clutch mechanism is utilized, the clutch may be connected when the master cylinder pressure reaches a predetermined pressure.

In the fourth embodiment, rotational energy of the wheel can be recovered with favorable efficiency and utilized to drive the pump. That is, regenerative braking may be realized.

When the fourth embodiment is applied in an electric vehicle, a large amount of energy can be obtained in comparison with regenerative braking by a retarder of known art. In particular, braking force insufficiency during rapid braking can be avoided.

Figure 10:
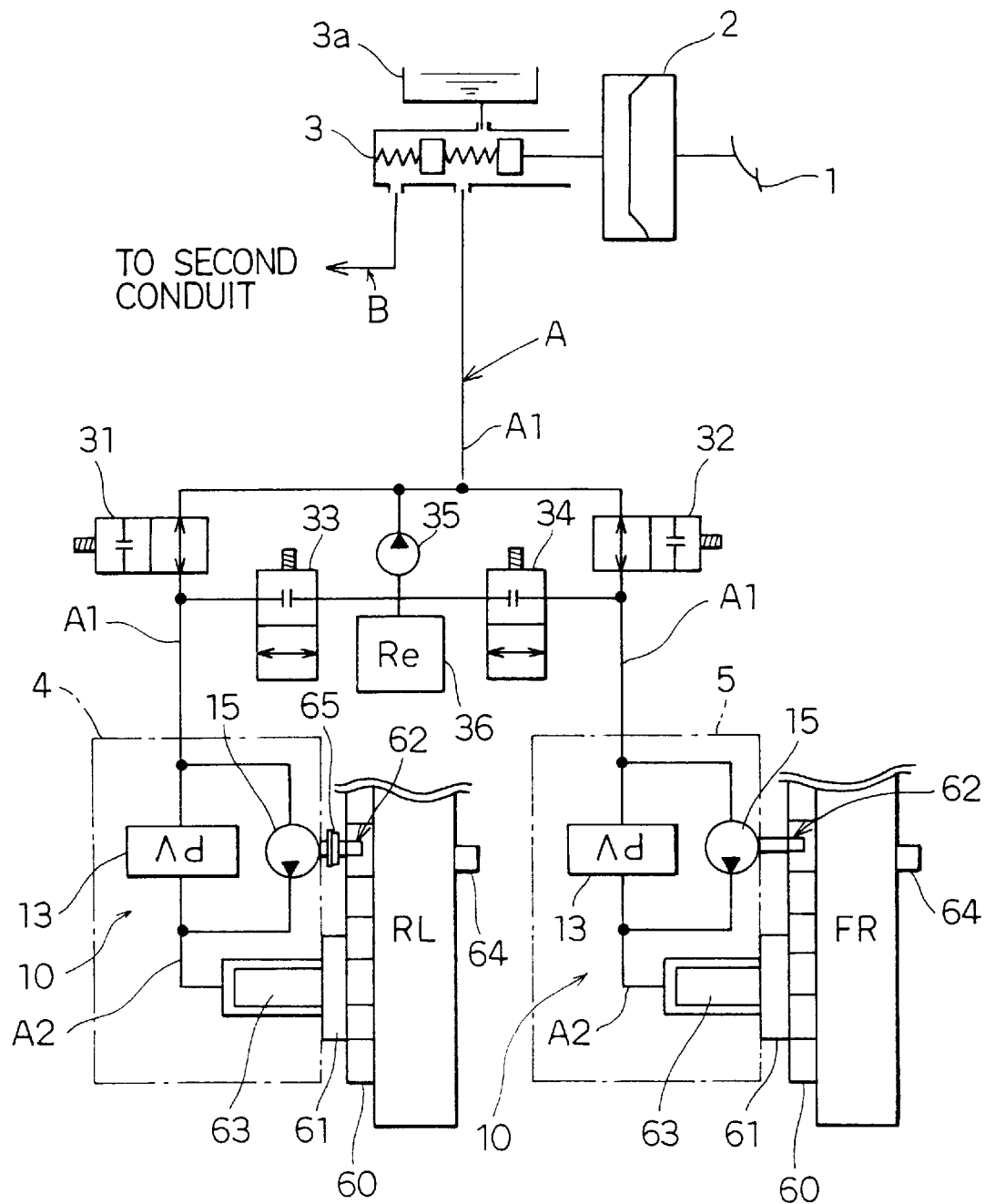
FIG. 10 is a structural view indicating a fourth embodiment of the present invention.

In the fourth embodiment, the pressure-increasing control valves 31, 32 and the pressure-reducing control valves 33, 34 realizing anti-skid control action are disposed between the master cylinder 3 and the wheel cylinders 4, 5 as shown in FIG. 10. Further, an ABS pump 35 to discharge brake fluid accumulated in an ABS reservoir 36, which accumulates brake fluid corresponding to the amount of reduction in wheel cylinder pressure during anti-skid control, is provided. Pressure-increasing and pressure-reducing control is executed within a range of pressure lower than the brake fluid pressure applied to the wheel piston 63 in the interval from the master cylinder 3 to the proportioning control valve 13. Therefore, load applied to the several control valves and the like is lessened.

Fifth Embodiment

Brake piping and an ABS actuator block mounted on a vehicle will be described next as a fifth embodiment, with reference to FIG. 11. For structure similar to the foregoing embodiments, description thereof will be omitted.

Figure 11:
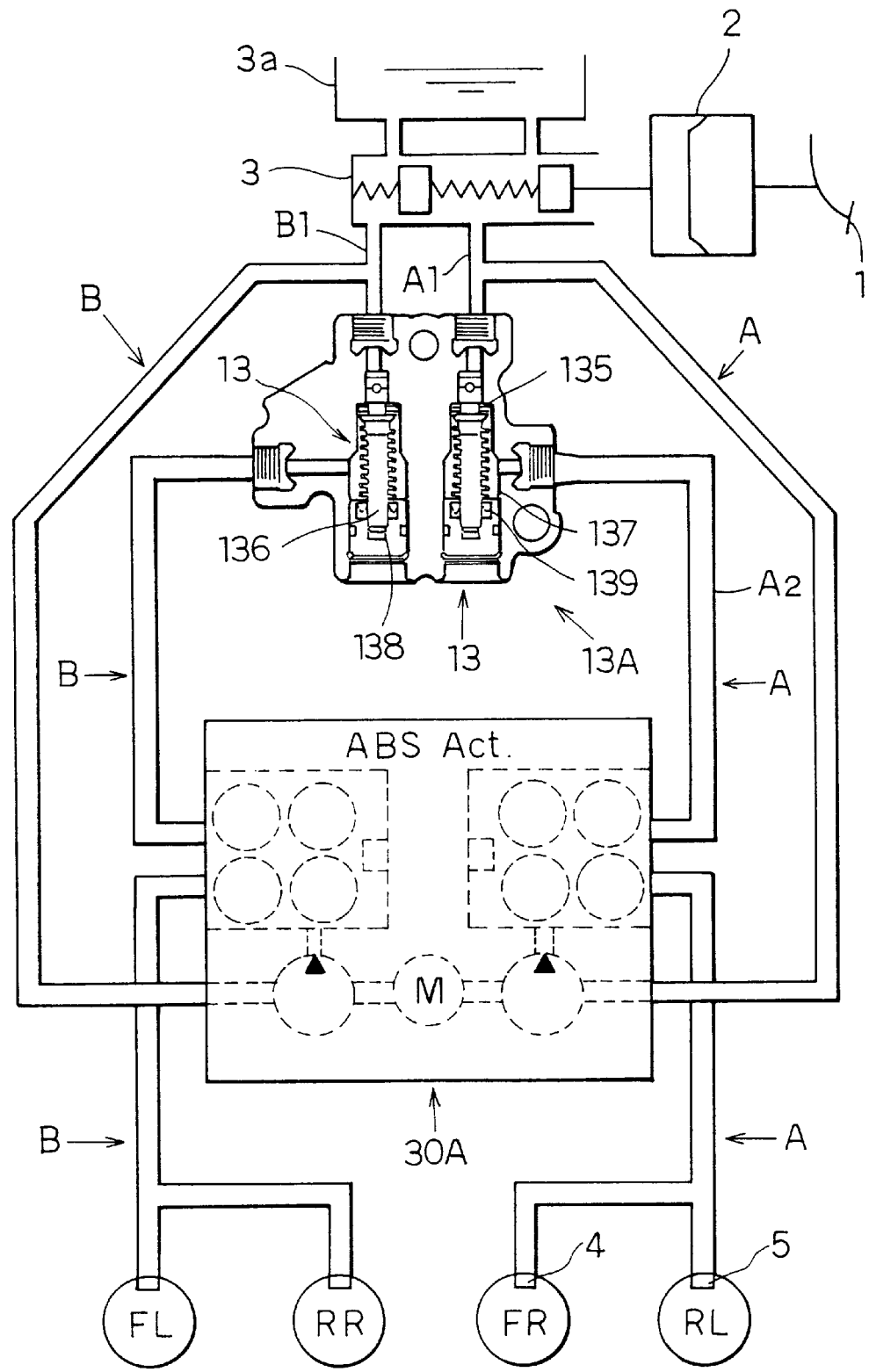
FIG. 11 is a structural view indicating a fifth embodiment of the present invention.

A first conduit A and a second conduit B are illustrated in FIG. 11. Diagonal piping is utilized wherein the wheel cylinder 4 of the front-right wheel FR and the wheel cylinder 5 of the rear-left wheel RL are connected to the first conduit A, and the wheel cylinder of the front-left wheel FL and the wheel cylinder of the rear-right wheel RR are connected to the second conduit B.

In an ABS actuator 30A, four pressure-increasing control valves and four pressure-decreasing control valves, respectively disposed in the first conduit A and the second conduit B, a total of two reservoirs, a total of two pumps, and a motor to drive these pumps are components in a single block.

Proportioning control valves 13 disposed respectively in the first conduit A and the second conduit B are each formed by an integrated proportioning control valve block 13A.

When the ABS actuator 30A and the integrated proportioning control valve block 13A are formed into discrete components connected by the first and second conduits A and B, an ABS actuator 30A, having little need for specification changes according to vehicle type, can be utilized. The proportioning control valves 13, for which there is great need to vary establishment of split points and so on for each of several vehicle types, can alone be provided to have a specification suitable for a particular vehicle type. When an ABS actuator 30A can be utilized for many vehicle types, overall product cost can be reduced.

To describe in detail the structure of the integrated proportioning control valve block 13A, master cylinder pressure PU generated in the master cylinder 3 during ordinary braking is conveyed to second conduit parts A2, B2 through first conduit parts A1, B1 and valve seals 135, with substantially no pressure attenuation. The conveyed brake fluid pressure is applied to the wheel cylinders 4, 5. Thereafter, when brake fluid is taken in from the first conduit parts A1, B1 and discharged to the second conduit parts A2, B2 by the pumps, the brake fluid pressure of the second conduit parts A2, B2 becomes second brake fluid pressure, which is higher than the master cylinder pressure PU.

Accordingly, a proportioning control valve piston 136 is constantly compressed upwardly by a coil spring 137 until the second brake fluid pressure reaches a split-point pressure during ordinary braking. Consequently, a clearance is opened between the valve seal 135 and the proportioning control valve piston 136. The first conduit parts A1, B1 and the second conduit parts A2, B2 assume a state of communication. When the brake fluid pressure in the second conduit parts A2, B2 reaches the split-point pressure due to pump discharge, the force applied to the proportioning control valve piston 136 becomes larger than the spring force of the coil spring 137. The proportioning control valve piston 136 is pressed to the side of an air chamber 138. The valve seal 135 and a shoulder portion of the proportioning control valve piston 136 make contact due to this action, thereby interrupting the communication.

Furthermore, when the brake fluid pressure in the second conduit parts A2, B2 is higher than the split-point pressure, a force is exerted to press the proportioning control valve piston 136 upwardly. The master cylinder pressure is exerted to press the proportioning control valve piston 136 downwardly. Therefore, the action of the proportioning control valve piston 136 causes the two forces to be held in balance.

Therefore, the proportioning control valve piston 136 constantly repeats minute oscillation and reduces pressure conveyed from the second conduit parts A2, B2 to the first conduit parts A1, B1 by a defined pressure when the brake fluid pressure of the second conduit parts A2, B2 is displaced at a higher pressure than the split-point pressure. The pressure of the second conduit parts A2, B2 is maintained by the defined pressure at a level higher than the brake fluid pressure of the first conduit parts A1, B1. The brake fluid pressure of the second conduit parts A2, B2 acts upon an annular cross-sectional area B-A (where B>A), which is a valve seal diameter cross-sectional area B minus a cross-sectional area A of the proportioning control valve piston 136. The master cylinder pressure PU acts upon the valve seal diameter cross-sectional area B. As a result, the brake fluid pressure of the second conduit parts A2, B2 maintains equilibrium in the proportioning valves 13 at a fluid pressure that is high compared with the master cylinder pressure PU. This fluid-pressure equilibrium ratio is, in other words, the attenuation ratio of the brake fluid pressure in the second conduit parts A2, B2. This is determined by the ratio (B/A) of the two pressure-receiving surface areas A, B. When this ratio (B/A) is large, the attenuation ratio is increased, and the pressure-increasing gradient of the brake fluid pressure in the second conduit parts A2, B2 increases.

Accordingly, when the present embodiment is utilized, for example, in front-rear piping, when the ratio (B/A) of the pressure-receiving surface areas A, B of the proportioning control valve 13 on the rear-wheel side is established at a low value and the ratio (B/A) of the pressure-receiving surface areas A, B of the proportioning control valve 13 on the front-wheel side is established at a high value, large brake fluid pressure is applied to the wheel cylinders on the front-wheel side and brake fluid pressure lower than for the front-wheel side is applied to the wheel cylinders on the rear-wheel side when pumps having the same discharge capacity are driven with respect to the front and rear wheels. As a result, front/rear wheel braking force distribution is realized while pressure higher than the master cylinder pressure is applied to the front and rear wheel cylinders. Further, 139 is a cap.

Sixth Embodiment

A sixth embodiment will be described next with reference to FIG. 12. For structure similar to the above-described embodiments, description thereof will be omitted.

Figure 12:
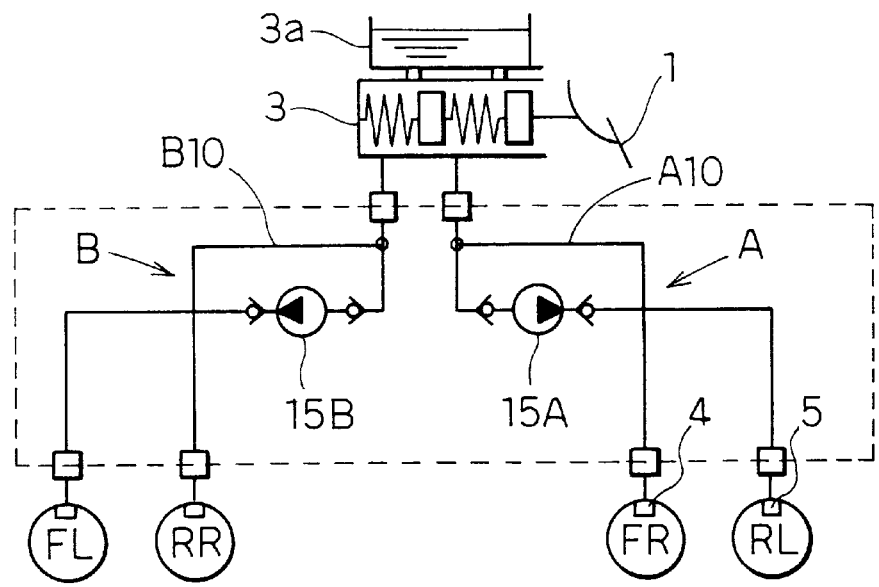
FIG. 12 is a structural view indicating a sixth embodiment of the present invention.

As shown in FIG. 12, a first conduit A and a second conduit B are respectively provided with pumps 15A, 15B to take in brake fluid from the master cylinder side and discharge the brake fluid to the wheel cylinders 4, 5. The pumps 15A, 15B are respectively provided with conduits A10, B10 in parallel, and are formed so that the pumps are operable as reflux devices.

Figure 13:
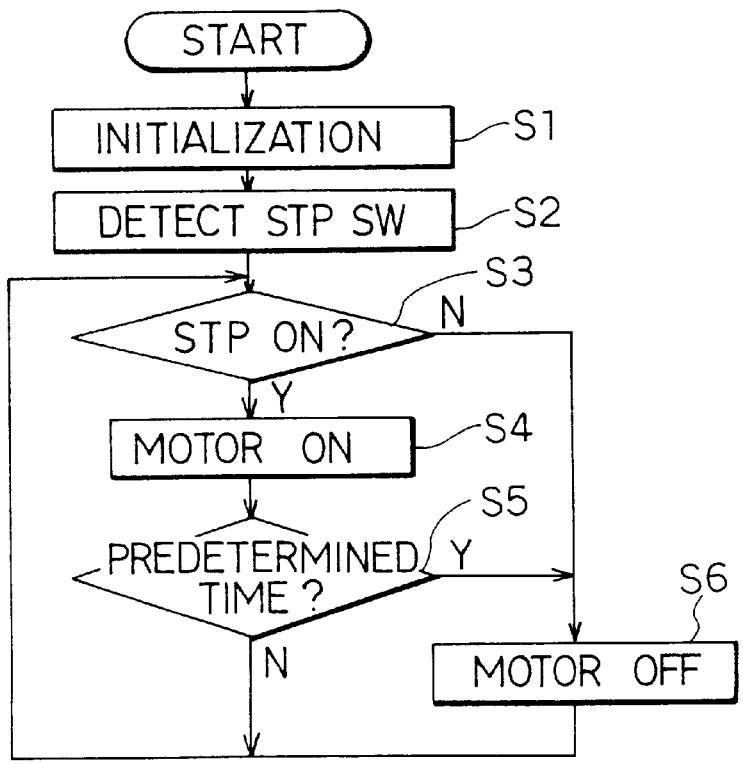
FIG. 13 is a flow diagram indicating control content of the sixth embodiment.

The flow diagram shown in FIG. 13 indicates a drive initiating condition for the pumps 15A, 15B. First, at step S1, several flags are initiated. At step S2, input from a brake switch (not illustrated) is received. This brake switch assumes an "on" state when the brake pedal 1 is depressed by the driver to produce a vehicle-braking state. At step S3, it is determined whether the brake switch is ON. When the determination is affirmative, the process advances to step S4. A motor (not illustrated) to drive the pumps 15A and 15B is enabled, and pump intake and discharge is executed. The process next advances to step S5, where it is determined whether a predetermined time has elapsed since the start, thereby signaling a motor enabling state. When the determination is affirmative, the process advances to step S6; when the determination is negative, the process returns to step S3. At step S6, the motor is switched off. Furthermore, at step S3, the process advances to step S6 when the determination is negative.

Figure 14:
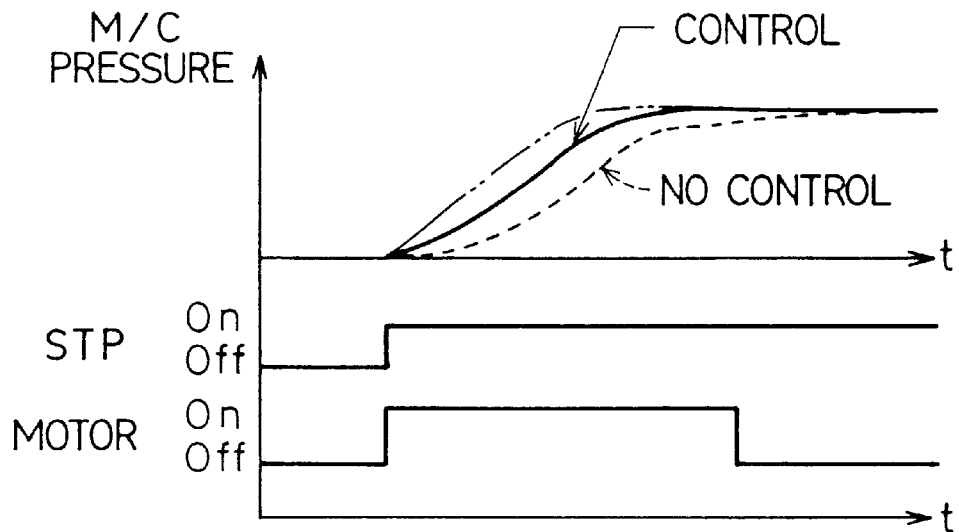
FIG. 14 is a timing diagram illustrating control result according to the sixth embodiment.

Operation of the above embodiment will be described hereinafter with reference to FIG. 14. Change in wheel cylinder pressure is illustrated when the brake switch is in an "on" state, i.e., where a vehicle-braking state is obtained. The solid line in the drawing represents change in wheel cylinder pressure when there is control by the present embodiment and the motor is running. The dotted line represents a change in wheel cylinder pressure when there is no control by the present embodiment. The double-dotted broken line represents change in wheel cylinder pressure when fluid resistance of the brake fluid is assumed to be substantially nonexistent. As is understood from FIG. 14, in the present embodiment, the speed of movement of the brake fluid can be assisted by pump drive and reflux of the brake fluid. Fluid resistance can be lessened, and so wheel cylinder pressure can be enhanced.

Figure 15:
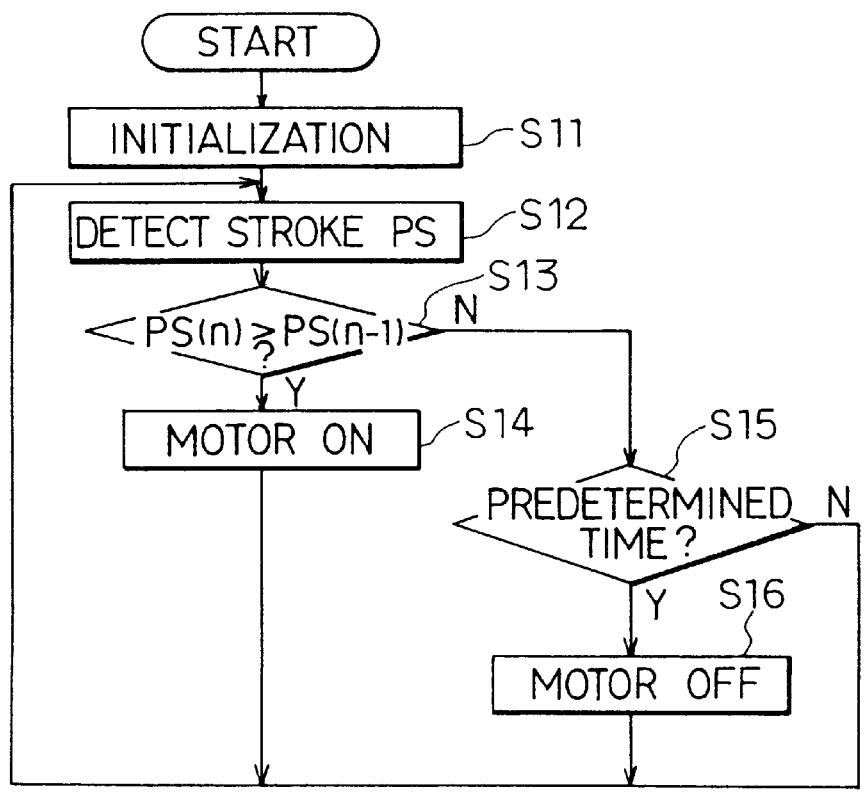
FIG. 15 is a modification of the flow diagram according to the sixth embodiment.

As shown in FIG. 15, pump drive control may be executed in response to change in pedal stroke. That is to say, at step S11, initialization is performed, and at step S12, pedal stroke PS is detected by a stroke sensor (not illustrated). At step S13, it is determined whether present pedal-stroke detected value PS (n) is greater than a previous pedal-stroke detected value PS (n−1). When determined in the affirmative, the motor is enabled at step S14. When the determination is negative, the process advances to step S15. At step S15, it is determined whether a predetermined time has elapsed since the motor was enabled. When the determination is affirmative, the process advances to step S16, and the motor is stopped. When the determination is negative, the process returns to step S12.

In this way, a similar braking effect can be obtained even when brake fluid movement speed is assisted by the pump during a change in pedal stroke. Moreover, because a certain amount of play is present in an ordinary brake pedal, the pump can be driven, even in light of this play, if the pump drive is stated in response to change in brake pedal stroke. As a result, brake fluid flows within the first conduit A while master cylinder pressure PU is actually being generated. Accordingly, it is possible to respond sufficiently even during the initial period of brake pedal depression. Furthermore, master cylinder pressure, depression force, or the like may be detected as a value corresponding to the stroke of the brake pedal, to control pump drive.

A modification of the embodiments hereinabove will be described hereinafter.

Figure 9:
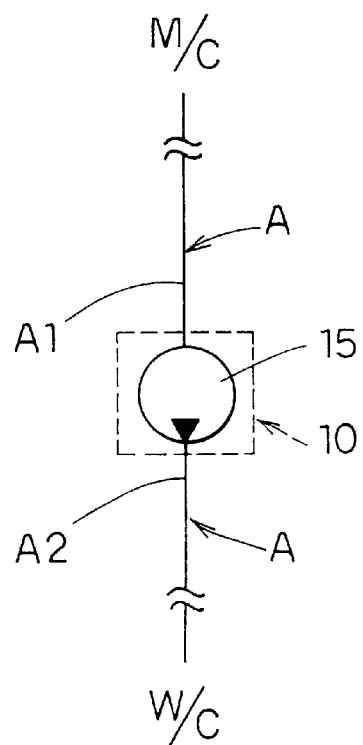
FIG. 9 is a drawing indicating a modification of the pressure amplifying device.

In, for example, the first embodiment described above, the pressure amplifying device 10 includes the pump 15 and the holding device 13. However, the pressure amplifying device 10 is not exclusively restricted thereto, and may utilize a simple structure directly connecting the pump 15 in the first conduit A, as shown in FIG. 9. In this case, movement of brake fluid may be realized by, for example, disposing the pump 15 within the first conduit A and driving the pump 15 in the normal direction in accordance with the operating state of the brake pedal 1, to take in the brake fluid of the first conduit part A1 and discharge the brake fluid to the second conduit part A2. When the pedal depression force has been detected as weakening from the brake pedal state, the pump 15 may be driven in reverse to reduce the brake fluid pressure applied to the wheel cylinders to a normal state. Furthermore, it is preferred that a holding device to cause the pressure in the second conduit part A2 to be greater than or equal to the master cylinder pressure PU be provided in the pump 15 so that at least the master cylinder pressure PU is applied to the wheel cylinders even during pump failure.

In the above embodiments, pressure amplification of the second conduit part A2 by the pressure amplifying device 10 and amplification of brake fluid quantity with respect to the second conduit part A2 by the brake fluid quantity amplifying device 40 were performed with respect to both the front-right wheel FR and the rear-left wheel RL. However, pressure amplification by the pressure amplifying device 10, or amplification of brake fluid quantity with respect to the second conduit part A2 by the brake fluid quantity amplifying device 40, may be performed only at the front-right and front-left wheels. There may be cases wherein assurance of braking force in the rear-right and rear-left wheels cannot be expected due to load movement occurring during vehicle braking. When a large amount of load movement occurs, the rear wheels become prone to slippage when large braking force is applied thereto. In such a case, efficient braking force can be gained by performing pressure amplification only at the front-right and front-left wheels.

The brake fluid quantity amplifying pump 42 is utilized as the brake fluid quantity amplifying device 40 described with reference to FIG. 7 and FIG. 8, to take in brake fluid from the reservoir 41 and discharge high-pressure brake fluid. However, it is also possible to replace this brake fluid quantity amplifying pump 42 and reservoir 41 with a fluid-collecting chamber to collect a predetermined quantity of brake fluid at high pressure. The brake fluid quantity of the second conduit part A2 may be amplified utilizing the high-pressure brake fluid from this fluid-collecting chamber.

In the above-described embodiments, the generation of brake fluid pressure by the brake fluid pressure-generating device was realized by the master cylinder pressure PU being generated in the master cylinder 3 due to the driver operating the brake pedal 1. However, the present invention may be applied in an automatic brake apparatus which actuates a brake when, for example, distance between vehicles has become a predetermined distance or less, irrespectively of brake pedal depression by a driver. In this case, a pump or the like for automatic braking use may be provided as the brake fluid pressure-generating device in substitution for the brake pedal, master cylinder, and so on. Also, the load for generating the first brake fluid pressure in the pump and the like making up the brake fluid pressure-generating device can be lessened when the pressure amplifying device 10 is provided.

Because the second brake fluid pressure can be increased by the pressure amplifying device 10 according to the forgoing embodiments, it is possible to reduce the capacity of the booster 2 provided in the foregoing embodiments and make the booster 2 compact, or even to eliminate the booster 2. That is to say, the load on pedal depression force by the driver can be sufficiently lessened and high braking force can be ensured even when there is no pressure-increasing action on the master cylinder pressure PU by the booster 2.

Furthermore, in the above-described embodiments, this invention was applied in a front-wheel drive vehicle with diagonal piping. However, the present invention can be carried out without restriction to a particular drive format or piping system, and is applicable even in a vehicle provided with, for example, T—T piping of connecting front-right wheel cylinder and front-left wheel cylinder and of connecting rear-right wheel cylinder and rear-left wheel cylinder.

Seventh Embodiment

Figure 16:
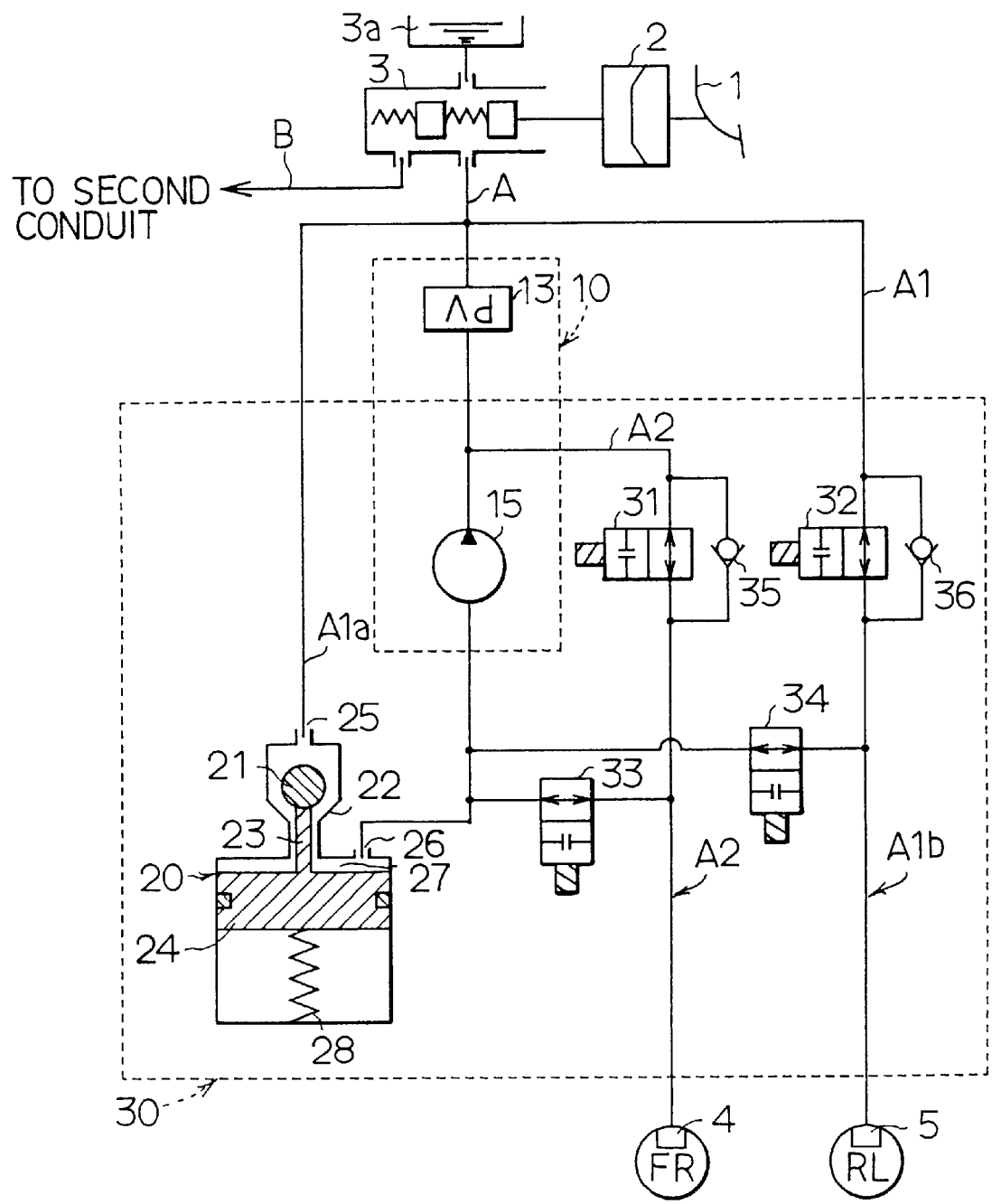
FIG. 16 is a structural view indicating a seventh embodiment of the present invention.

Referring to FIG. 16, a seventh embodiment combines an anti-skid control system with the basic structure of a brake control apparatus. The following description will be of a brake control apparatus according to the present invention that includes diagonal piping provided with respective conduits connecting a front-right wheel cylinder and a rear-left wheel cylinder, and connecting a front-left wheel cylinder and a rear-right wheel cylinder in a front-wheel drive, four-wheeled car.

First, the brake control apparatus will be described with reference to the model diagram indicated in FIG. 16. For structure similar to the above-described embodiments, description thereof will be only briefly provided.

In FIG. 16, a brake pedal 1 is connected to a booster 2, and depression force applied to the pedal 1 and pedal stroke are conveyed to the booster 2.

A master cylinder 3 imparts brake fluid pressure boosted by the booster 2 to the entirety of a brake conduit. The master cylinder 3 includes an independent master reservoir 3a to supply brake fluid to the master cylinder 3, or to accumulate excess brake fluid from the master cylinder 3.

The pressure PU generated in the master cylinder 3 is conveyed to brake fluid within a first conduit A. The first conduit A links the master cylinder 3 and a first wheel cylinder (WIC) 4 disposed in the front-right wheel FR to impart braking force to the wheel FR, and the master cylinder 3 and a second wheel cylinder 5 disposed in the rear-left wheel RL to impart braking force to the wheel RL. The master cylinder pressure PU is similarly conveyed to a second conduit B linking respective wheel cylinders disposed in the front-left wheel and the rear-right wheel to the master cylinder 3.

The first conduit A includes two parts separated by a pressure amplifying device 10 disposed in this first conduit A. That is to say, the first conduit A has a first conduit part A1 to receive the master cylinder pressure PU in the interval from the master cylinder 3 to the pressure amplifying device 10, and a second conduit part A2 in the interval from the pressure amplifying device 10 to the first wheel cylinder 4. Furthermore, the foregoing first conduit part A1 includes a first branching conduit part A1a from the master cylinder 3 via a reservoir 20 to a pump 15, and a second branching conduit part A1b from the master cylinder 3 to the second wheel cylinder 5.

The pressure amplifying device 10 moves brake fluid of the first conduit part A1 to the second conduit part A2 and holds the pressure at the second conduit part A2 at second brake fluid pressure PL when the brake pedal 1 is depressed and the master cylinder pressure PU is generated within the first conduit A. According to the seventh embodiment, this pressure amplifying device 10 includes a proportioning control valve (PV) 13 and a pump 15.

The pump 15 is connected to the first conduit A in series with the proportioning control valve 13, and takes in brake fluid from the first branching conduit part A1a and discharges brake fluid to the second conduit part A2 during generation of the master cylinder pressure PU.

When brake fluid is removed from the first branching conduit part A1 to the second conduit part A2 by the pump 15, and the brake fluid pressure of the second conduit part A2 increases to the second brake fluid pressure PL, which is greater than the master cylinder pressure PU, the proportioning control valve 13 maintains this differential pressure (PL–PU).

In this way, the pressure amplifying device 10 provided with the pump 15 and the proportioning control valve 13 moves the brake fluid of the first conduit part A1, which generates the master cylinder pressure PU accompanying depression of the brake pedal 1, to the second conduit part A2. As a result, the brake fluid pressure within the first conduit location A1, i.e., the master cylinder pressure, is reduced. Simultaneously, the differential pressure of the second brake fluid pressure PL is amplified within the second conduit part A2, and the master cylinder pressure PU is maintained. In this way, the pressure amplifying device 10 performs pressure amplification.

Consequently, the second brake fluid pressure PL is applied via the second conduit part A2 to the first wheel cylinder 4, and so high braking force is imparted to the front-wheel side (i.e., to the front-right wheel FR). Meanwhile, the master cylinder pressure PU is applied via the second branching conduit part A1b to the second wheel cylinder 5. Accordingly, braking force lower than on the front-wheel side is imparted to the rear-wheel side (i.e., to the rear-left wheel RL).

Anti-skid control and pressure amplifying control (i.e., control by the pressure amplifying device 10) which causes brake fluid to be moved from the master cylinder side to the side of the wheel cylinder 4 to increase braking force, are performed by an electronic control unit (ECU) (not illustrated). This ECU is structured as a microcomputer provided with a CPU, a ROM, a RAM, an input/output portion, a bus line, and the like of known art.

According to the seventh embodiment, the first conduit part A1 of the low-pressure side and the second conduit part A2 of the high-pressure side are structured by disposing the pressure amplifying device 10 in the first conduit A and connecting the proportioning control valve 13 in a reverse direction. Further, the first conduit part A1 includes the first branching conduit part A1a extending from the master cylinder 3 via the reservoir 20 to the pump 15, and the second branching conduit part A1b extending from the master cylinder 3 to the second wheel cylinder 5. Therefore, the high-pressure second brake fluid pressure PL is applied to the first wheel cylinder 4, and the master cylinder pressure PU is applied to the second wheel cylinder 5.

Consequently, because the second brake fluid pressure PL is applied to the first wheel cylinder 4, high pressure is imparted to the front-wheel side (i.e., to the front-right wheel FR) and high braking force is achievable. Meanwhile, because the master cylinder pressure PU is applied to the rear-wheel side (i.e., to the rear-left wheel RL), susceptibility to the occurrence of locking is reduced.

Figure 17A:
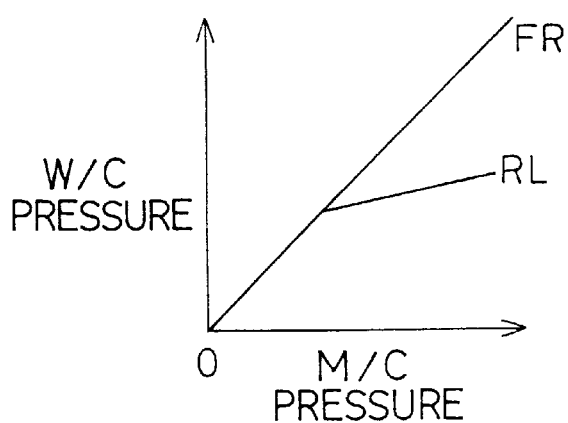
FIGS. 17A and 17B are explanatory diagrams indicating states of pressure applied to wheel cylinders.
Figure 17B:
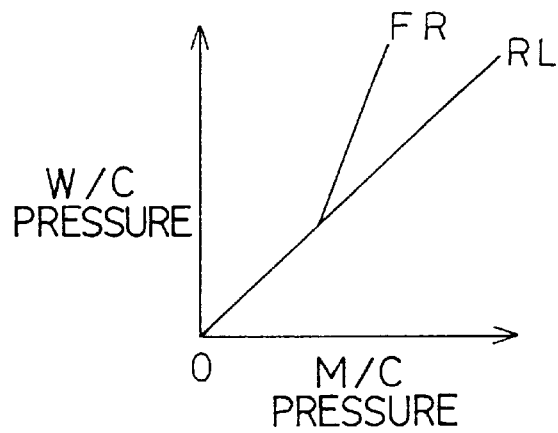

This state is indicated in FIGS. 17A and 17B. In an example wherein a pressure amplifying device according to the present embodiment is absent and a proportioning control valve is connected in the normal direction with respect to the rear-left wheel RL, the state of pressure of the front-right wheel FR and the rear-left wheel RL is such that both are suppressed to a level less than or equal to the wheel cylinder pressure PU (W/C pressure), as shown in FIG. 17A. However, according to the seventh embodiment, the state of pressure of the front-right wheel FR and the rear-left wheel RL is such that both are established at higher levels compared with the prior art, as shown in FIG. 17B.

That is to say, due to its structure, ideal braking force distribution at the front and rear wheels is obtained. Thus, the brake fluid pressure applied to the wheel cylinder 4 on the front-wheel side is greater than the brake fluid pressure applied to the wheel cylinder 5 on the rear-wheel side, and brake fluid pressure can be established at a high value. Therefore, overall braking force can be enhanced while the pedal depression force can be lessened.

Additionally, because brake fluid pressure higher than the master cylinder pressure PU is applied to the front-wheel side, and master cylinder pressure PU is applied as-is to the rear-wheel side, the wheel cylinder pressure can be increased with maximum efficiency without causing any loss in the master cylinder pressure PU.

Furthermore, because an anti-skid control system 30 is provided in this embodiment, locking of the wheels does not occur even when the brake fluid pressure applied to the wheel cylinder 4 on the front-wheel side becomes greater than the brake fluid pressure PU applied to the wheel cylinder 5 on the rear-wheel side. As a result, the brake fluid pressure is established at a high level overall, thereby enhancing brake system performance.

In this embodiment, a proportioning control valve is not disposed within a conduit connected to the second wheel cylinder 5. However, a proportioning control valve may be connected in the normal direction as in the prior art. In this case, the difference between the brake fluid pressure of the second wheel cylinder 5 and the brake fluid pressure of the first wheel cylinder 4 can be further increased.

Figure 59:
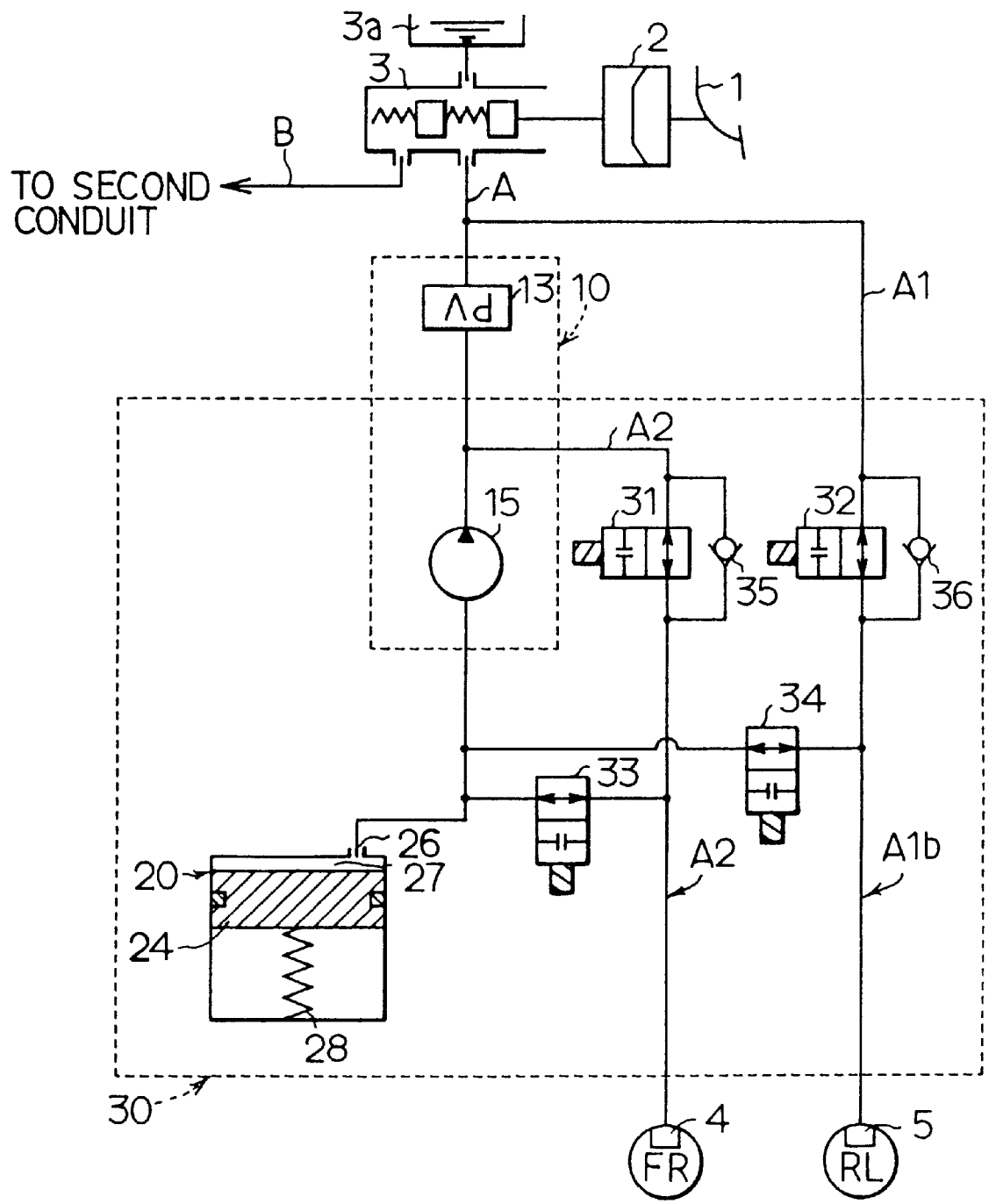
FIG. 59 is a structural view indicating a modification of the seventeenth embodiment.

It is to be noted that the conduit A1a connecting the master cylinder side and the reservoir 20 may be deleted, and the reservoir 20 may be structured as a normal reservoir used in an anti-skid system, as shown in FIG. 59. In this modification, to establish wheel cylinder pressure higher than master cylinder pressure, the ECU executes control as described below.

First, a well-known anti-skid control method is executed with respect to the front and rear wheels FR, RL. In this anti-skid control method, when the locking tendency (slip ratio) of the rear wheel RL becomes large, the pressure-increasing control valve 32 is interrupted, and the pressure-decreasing control valve 34 is communicated to reduce the brake fluid pressure applied to the wheel cylinder 5. The pump 15 then inputs the brake fluid discharged from the wheel cylinder 5 and outputs it to the second conduit part A2. Therefore, due to the pressure-holding function of the proportioning control valve 13, the brake fluid pressure applied to the wheel cylinder 4 of the front wheel FR is increased to a level higher than that of the master cylinder pressure.

Thus, even if the conduit A1a is deleted, the wheel braking force exhibited by the front wheel FR can be increased in accompaniment with anti-skid control.

When the above-described control is executed, it is preferable that the braking force is distributed to the front wheel FR and the rear wheel RL so that the rear wheel RL locks prior to the front wheel FR in correspondence with urgent braking. As a result, when anti-skid control is executed with respect to the rear wheel RL, and the brake fluid pressure of the wheel cylinder 5 is reduced during urgent braking, the brake fluid pressure in the wheel cylinder 4 of the front wheel FR is increased to a pressure higher than the master cylinder pressure by effectively utilizing the brake fluid discharged from the wheel cylinder 5. Therefore, because the front wheel FR can be immediately controlled to an optimal slip state, the braking distance can be shortened compared to normal anti-skid control.

Figure 19:
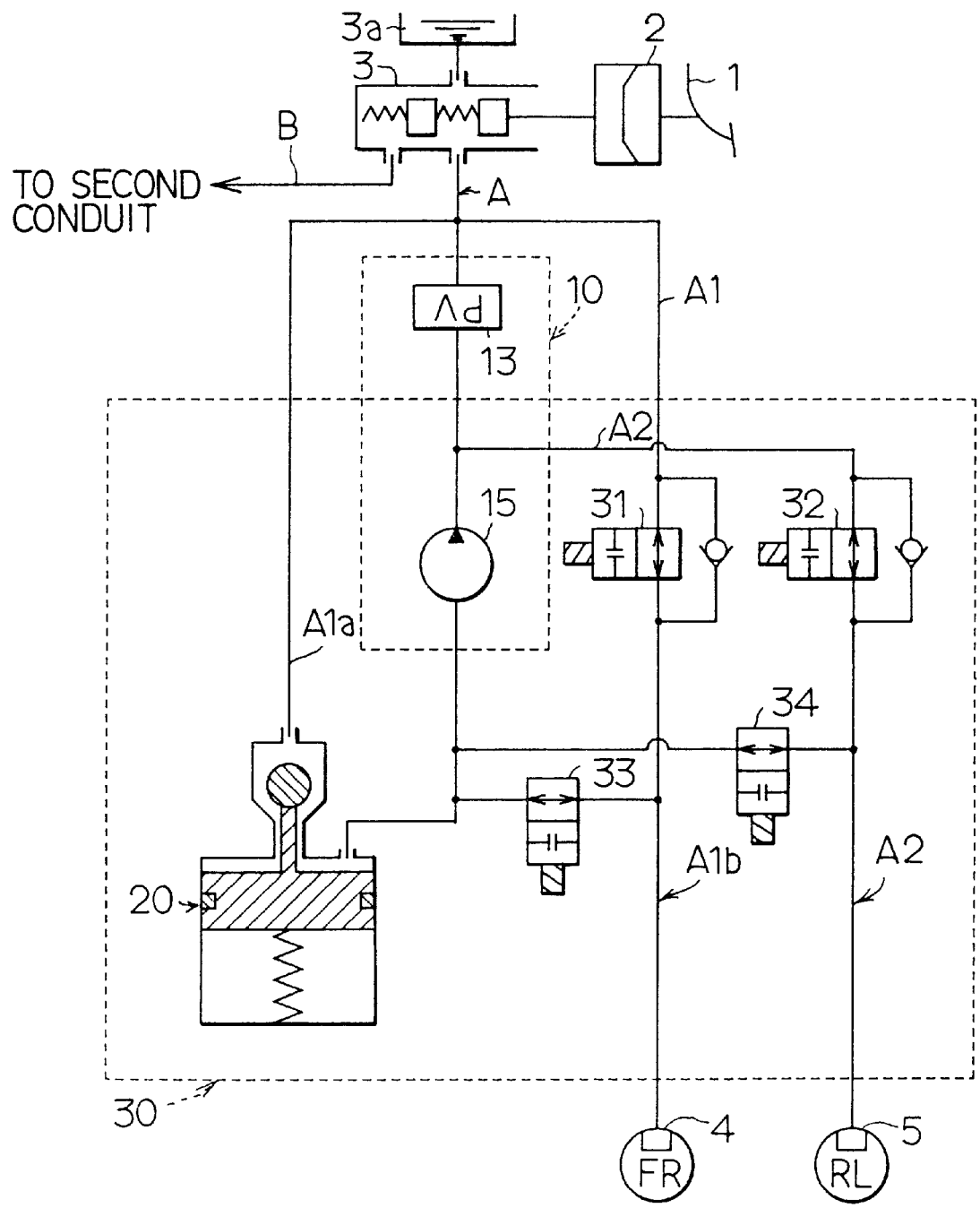
FIG. 19 is a structural view indicating a ninth embodiment of the present invention.

The structure described above can be adapted to a brake control apparatus shown in FIG. 19. In this case, the front and rear wheels have a reverse brake fluid pressure relationship compared to the brake control apparatus shown in FIG. 59.

Further, a two-way, two-port valve can substituted for the proportioning control valve 13. Moreover, the structure described above can be applied to a brake control apparatus in which wheel cylinders of a front-right wheel and front-left wheel are connected by a conduit. In this case, for example, when a driver brakes the vehicle during turning, the same effect as described above can be obtained by brake fluid movement from the wheel cylinder of an inner side wheel to the wheel cylinder of an outer side wheel.

Eighth Embodiment

An eighth embodiment will be described next, with description of portions similar to the embodiments described above being simplified.

The eighth embodiment provides an anti-skid control system which differs from the foregoing seventh embodiment.

First, basic structure of the brake control apparatus will be described with reference to the model diagram in FIG. 18.

Figure 18:
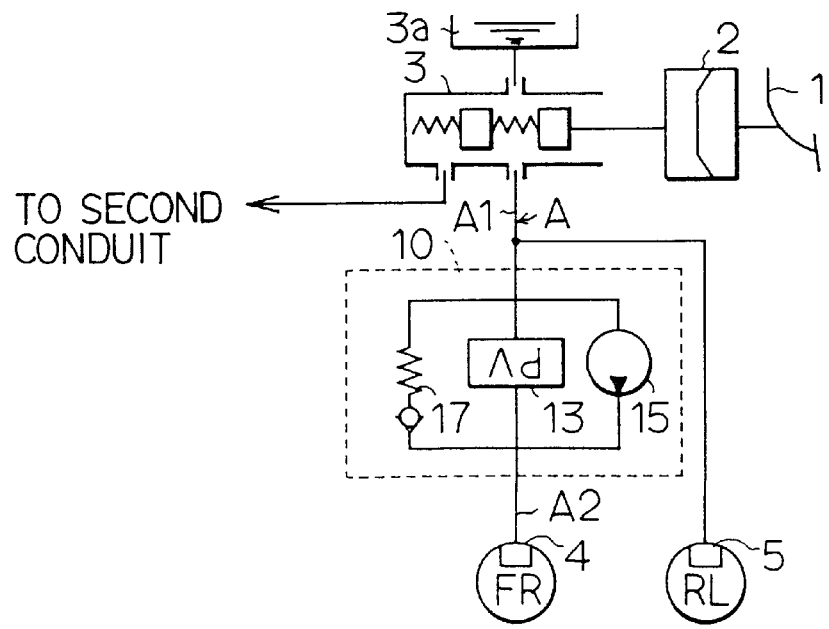
FIG. 18 is a structural view indicating an eighth embodiment of the present invention.

In FIG. 18, a brake pedal 1 is connected to a booster 2, and a master cylinder 3 is provided with a master reservoir 3a. Brake fluid conveys master cylinder pressure PU within a first conduit A extending from the master cylinder 3 to first and second wheel cylinders 4, 5. The master cylinder pressure PU is similarly conveyed to a second conduit. However, because structure similar to the first conduit A is utilized, a detailed description is omitted.

The first conduit A includes two parts separated by a pressure amplifying device 10. Namely, the first conduit A has a first conduit part A1 to receive the master cylinder pressure PU in the interval from the master cylinder 3 to the pressure amplifying device 10. The first conduit part A1 extends from the master cylinder 3 to the second wheel cylinder 5, and has a second conduit part A2 from the pressure amplifying device 10 to the first wheel cylinder 4.

The pressure amplifying device 10 moves brake fluid of the first conduit part A1 to the second conduit part A2. The device holds the pressure at the second conduit part A2 at the second brake fluid pressure PL when the brake pedal 1 is depressed and the master cylinder pressure PU is generated within the first conduit A. According to this embodiment, this pressure amplifying device 10 includes a proportioning control valve (PV) 13 and a pump 15.

The pump 15 is connected to the first conduit A in parallel with the proportioning control valve 13, and takes in brake fluid from the first conduit part A1 and discharges brake fluid to the second conduit part A2 during generation of the master cylinder pressure PU.

The proportioning control valve 13 is connected to the first conduit A in a reverse direction. When brake fluid from the first conduit part A1 is moved to the second conduit part A2 by the pump 15 and the brake fluid pressure of the second conduit part A2 increases to the second brake fluid pressure PL, which is greater than the master cylinder pressure PU, the proportioning control valve 13 maintains this differential pressure (PL–PU). Additionally, a relief valve 17 is provided in parallel with the proportioning control valve 13.

This embodiment does not include an anti-skid control system. However, by disposing of the pressure amplifying device 10 in the first conduit A, and connecting the proportioning control valve 13 in the reverse direction, the first conduit part A1 on the low-pressure side and the second conduit part A2 on the high-pressure side are configured.

Consequently, because the second brake fluid pressure PL of the second conduit part A2, which is higher in pressure than the master cylinder pressure PU, is applied to the first wheel cylinder 4, high pressure is imparted to the front-wheel side (i.e., to the front-right wheel FR) and high braking force can be achieved. Meanwhile, because the master cylinder pressure PU of the first conduit part A1, which is lower in pressure than on the front-wheel side, is applied to the rear-wheel side (i.e., to the rear-left wheel RL), susceptibility to the occurrence of locking is reduced.

That is to say, as with the above-described seventh embodiment, ideal braking force distribution at the front and rear wheels is obtained. In other words, the brake fluid pressure applied to the wheel cylinder 4 on the front-wheel side is greater than the brake fluid pressure applied to the wheel cylinder 5 on the rear-wheel side, and brake fluid pressure can be established at a high overall level. Therefore, overall braking force for the vehicle is enhanced, while pedal depression force is decreased.

Additionally, because brake fluid pressure higher than the master cylinder pressure PU is applied to the front-wheel side, and master cylinder pressure PU is applied as-is to the rear-wheel side, the wheel cylinder pressure can be increased with maximum efficiency without causing any loss in the master cylinder pressure PU.

In the present embodiment, a proportioning control valve is not included with the second wheel cylinder 5. However, a proportioning control valve may be connected to the second wheel cylinder 5 in the normal direction as in the prior art. In this case, the difference between the brake fluid pressure of the second wheel cylinder 5 and the brake fluid pressure of the first wheel cylinder 4 can be further increased.

Ninth Embodiment

A ninth embodiment will be described next, with description of portions similar to the embodiments described being simplified.

This embodiment provides the basic structure of a brake control apparatus and an anti-skid control system, similar to the above-described seventh embodiment. However, a characteristic of the brake fluid pressure applied to the first and second wheel cylinders 4, 5 is opposite that of the foregoing seventh embodiment at the front-wheel side and the rear-wheel side.

First, a basic structure of the brake control apparatus will be described with reference to the model diagram in FIG. 19.

A brake pedal 1 is connected to a booster 2, and a master cylinder 3 is provided with a master reservoir 3a.

Master cylinder pressure PU is conveyed by brake fluid within a first conduit A from the master cylinder 3 to first and second wheel cylinders 4, 5. The master cylinder pressure PU is similarly conveyed to a second conduit B that is similar to the first conduit.

The first conduit A includes two parts separated by a pressure amplifying device 10. That is to say, the first conduit A has a first conduit part A1 to receive the master cylinder pressure PU from the master cylinder 3 to the pressure amplifying device 10 and a second conduit part A2 from the pressure amplifying device 10 to the second wheel cylinder 5. Furthermore, the first conduit part A1 is provided with a first branching conduit part A1a from the master cylinder 3 via a reservoir 20 to a pump 15, and a second branching conduit part A1b from the master cylinder 3 to the first wheel cylinder 4.

The pressure amplifying device 10 moves brake fluid of the first conduit part A1 to the second conduit part A2 and holds the pressure in the second conduit part A2 at second brake fluid pressure PL when the brake pedal 1 is depressed and the master cylinder pressure PU is generated within the first conduit A. According to the present embodiment, the pressure amplifying device 10, as with the foregoing seventh embodiment, includes the proportioning control valve (PV) 13 and the pump 15.

Additionally, components such as the reservoir 20, first and second pressure-increasing control valves 31, 32, first and second pressure-reducing control valves 33, 34, and so on are also similar to the seventh embodiment.

According to this embodiment, the first conduit part A1 of the low-pressure side and the second conduit part A2 of the high-pressure side dispose the pressure amplifying device 10 in the first conduit A and connect the proportioning control valve 13 in the reverse direction. Further, the first conduit part A1 includes the first branching conduit part A1a extending from the master cylinder 3 via the reservoir 20 to the pump 15, and the second branching conduit part A1b extending from the master cylinder 3 to the first wheel cylinder 4.

That is to say, opposite to the foregoing seventh embodiment, the high-pressure second brake fluid pressure PL is applied to the second wheel cylinder 5, and the master cylinder pressure PU lower than the second brake fluid pressure PL is applied to the first wheel cylinder 4.

Consequently, because the second brake fluid pressure PL is applied to the second wheel cylinder 5, high pressure is imparted to the rear-wheel side (i.e., to the rear-left wheel RL). Meanwhile, the master cylinder pressure PU is applied to the front-wheel side (i.e., to the front-right wheel FR). This state is indicated in FIGS. 20A and 20B.

Figure 20A:
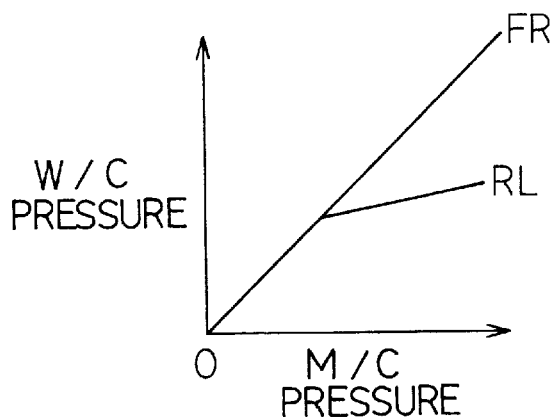
FIGS. 20A and 20B are explanatory diagrams indicating states of pressure applied to wheel cylinders.
Figure 20B:
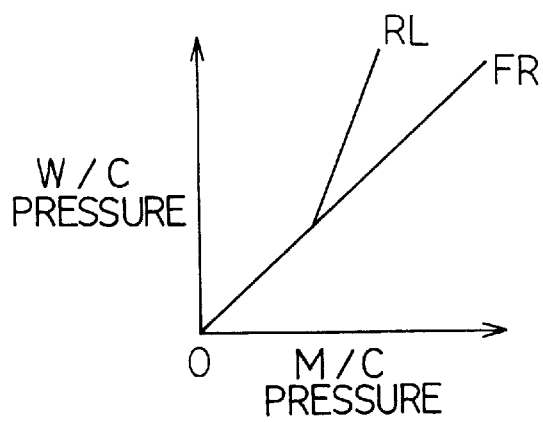

In an example wherein a pressure amplifying device 10 according to the present embodiment is absent and a proportioning control valve is connected in the normal direction with respect to the rear-left wheel RL, the state of pressure of the front-right wheel FR and the rear-left wheel RL is such that both are suppressed to a level equal to or lower than the level of the master cylinder pressure PU, as shown in FIG. 20A. Meanwhile, according to the present embodiment, the state of pressure of the front-right wheel FR and the rear-left wheel RL is such that, conversely to the case of the first embodiment indicated in FIG. 1, the pressure at the rear-left wheel RL is established at a higher level, while the brake fluid pressure in the first wheel cylinder 4 is maintained at the master cylinder pressure PU, as shown in FIG. 20B.

Because the brake fluid pressure applied to the wheel cylinder 5 on the rear-wheel side is caused to be greater than the brake fluid pressure applied to the wheel cylinder 4 on the front-wheel side, brake fluid pressure can be established at a high value overall, and so the braking force for the vehicle overall can be enhanced while pedal depression force is lessened.

Particularly in a case of, for example, a large amount of cargo, load movement is small and large load weight is placed on the rear-wheel side during braking. According to this embodiment, the brake fluid pressure of the wheel cylinder 5 on the rear-wheel side is increased, and the braking force on the rear-wheel side can be increased. Therefore, braking performance can be enhanced when the vehicle includes a large amount of cargo.

Moreover, the braking force on the front-wheel side is actually established to be greater than the braking force on the rear-wheel side due to the structure of the brake pads and the like, even when the brake fluid pressure applied to the wheel cylinder 5 on the rear-wheel side is larger than the brake fluid pressure applied to the wheel cylinder 4 on the front-wheel side, as in this embodiment. Therefore, the rear-wheel pressure can be prevented from falling into a locking state prior to the front-wheel even when load movement or the like has occurred during vehicle braking.

The present embodiment was described as being implemented with an anti-skid control system. However, this embodiment can also be implemented without an anti-skid control system, as in the above-described first embodiment. In this case, the brake fluid pressure applied to the wheel cylinder on the rear-wheel side is greater than the brake fluid pressure applied to the wheel cylinder on the front-wheel side, and therefore differs from the foregoing first embodiment.

Tenth Embodiment

Figure 21:
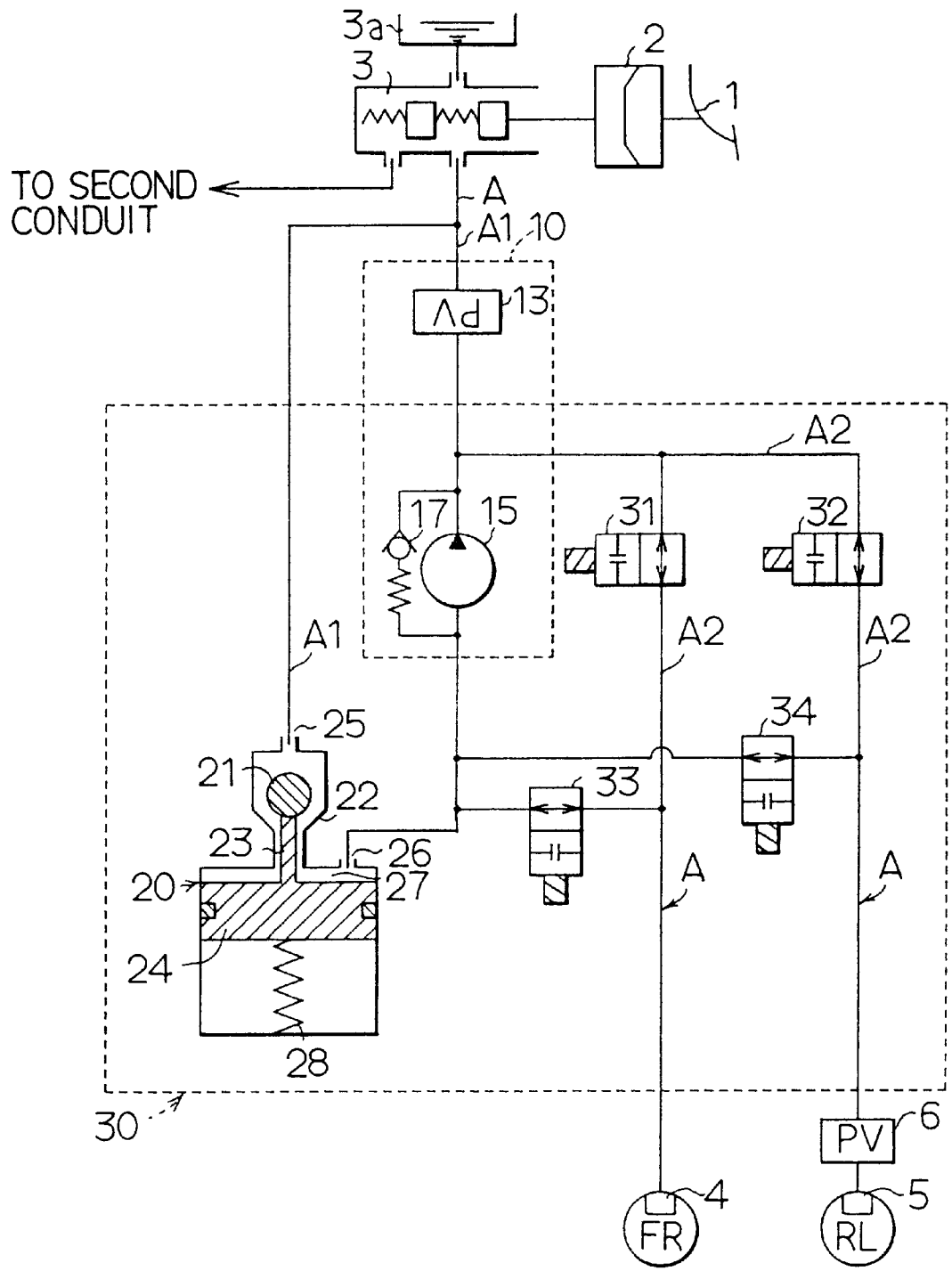
FIG. 21 is a structural view indicating a tenth embodiment of the present invention.

A tenth embodiment of the present invention will be described next with reference to FIG. 21.

The tenth embodiment combines an anti-skid control system with the basic structure of a brake control apparatus. The present invention may be applied along with a diagonal piping configuration provided with conduits connecting a front-right wheel cylinder and a rear-left wheel cylinder, and connecting a front-left wheel cylinder and a rear-right wheel cylinder in a front-wheel drive, four-wheeled vehicle.

First, the basic structure of the brake control apparatus will be described with reference to the model diagram indicated in FIG. 21. Detailed description of structure similar to that in the foregoing embodiments will be simplified or omitted.

A first conduit A includes two parts separated by a pressure amplifying device 10. Namely, the first conduit A has a first conduit part A1 to receive master cylinder pressure PU in the interval from a master cylinder 3 to the pressure amplifying device 10, and a second conduit part A2 in the interval from the pressure amplifying device 10 to respective wheel cylinders 4, 5.

The pressure amplifying device 10 functions as a power brake to perform brake assist. The pressure amplifying device 10 moves brake fluid of the first conduit part A1 to the second conduit part A2 and holds the pressure at the second conduit part A2 at second brake fluid pressure PL when the brake pedal 1 is depressed and the master cylinder pressure PU is generated within the first conduit A.

According to the tenth embodiment, the pressure amplifying device 10 includes a proportioning control valve (PV) 13 and a pump 15. In the structure of the first conduit A, the first conduit part A1 is formed between the proportioning control valve 13 and the master cylinder 3, and the second conduit part A2 is formed from the respective wheel cylinders 4, 5 to the proportioning control valve 13 and the pump 15.

The pressure amplifying device 10 moves the brake fluid of the first conduit part A1 to the second conduit part A2 upon depression of the brake pedal, thereby reducing the brake fluid pressure within the first conduit part A1. The device also maintains a differential pressure of the second brake fluid pressure PL within the second conduit part A2 and the master cylinder pressure PU with the proportioning control valve 13. In this way, the pressure amplifying device 10 performs pressure amplification.

The second brake fluid pressure PL, which is greater than the master cylinder pressure PU, is applied to the respective wheel cylinders 4, 5 to ensure high braking force.

In particular, according to the tenth embodiment, a relative pressure relief valve 17 is disposed in parallel to the pump 15. This relative pressure relief valve 17 opens when brake fluid pressure of a conduit between the proportioning control valve 13 and the pump 15 increases by a predetermined value over brake fluid pressure of a conduit between the reservoir 20 and the pump 15. That is to say, when the brake fluid pressure of the second conduit part A2 increases by a predetermined value over the brake fluid pressure of the first conduit part A1, the relative pressure relief valve 17 allows the brake fluid within the second conduit parts A2 to escape to the first conduit part A1, thereby reducing brake fluid pressure within the second conduit part A2.

The brake fluid pressure within the second conduit part A2 no longer increases to or above a predetermined value above the brake fluid pressure of the first conduit part A1.

In this way, this embodiment utilizes a structure wherein an anti-skid control system is combined with the basic structure of the brake control apparatus. The relative pressure relief valve 17 is disposed in parallel with the pump 15.

When the brake fluid pressure of the second conduit part A2 has increased to or above the predetermined value that is higher than the brake fluid pressure of the first conduit part A1, the brake fluid within the second conduit part A2 is allowed to escape to the first conduit part A1 due to opening of the relative pressure relief valve 17. The brake fluid pressure within the second conduit part A2 can therefore be reduced.

When the brake fluid pressure within the second conduit part A2 is reduced through the relative pressure relief valve 17, the relative pressure relief valve 17 functions as a relative pressure relief valve subsequent to reduction of the brake fluid pressure. That is, when a differential pressure between the brake fluid pressures of the first and second conduit parts A1, A2 is at or above the predetermined value, the relative pressure relief valve opens. But thereafter, when a piston 24 of the reservoir 20 is pressed downwardly and the first conduit part A1 and an intake port of the pump 15 are interrupted by a ball valve 21, brake fluid pressure is released by the spring 28 into a reservoir chamber 27 having only approximately several atmospheres of pressure. Therefore, the function of the relative pressure relief valve 17 approaches that of an absolute-pressure relief valve.

Figure 22:
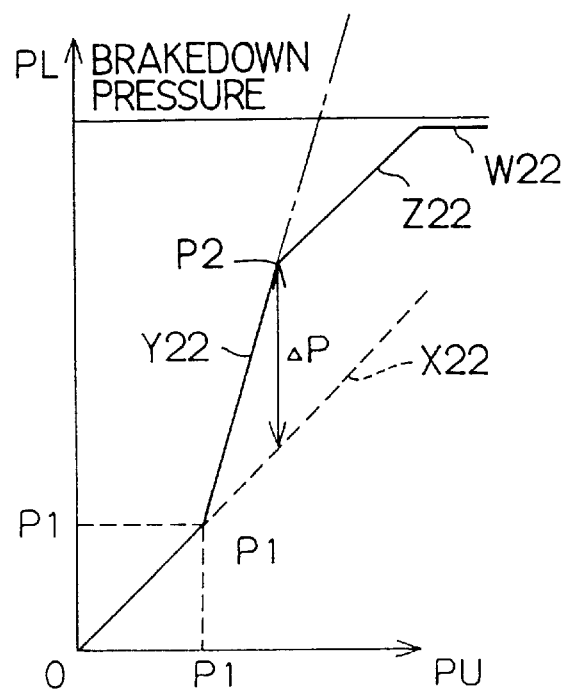
FIG. 22 is a graph indicating change in brake fluid pressure according to the tenth embodiment.

This situation is exemplified in FIG. 22. When, for example, there is no relative pressure relief valve 17, the brake fluid pressure (wheel cylinder pressure PL) of the second conduit part A2 increases rapidly, as shown by line Y22 in FIG. 22. This brake fluid pressure rapidly approaches the breakdown pressure of the second conduit part A2, as shown by the dotted line. However, when the relative pressure relief valve 17 is present, as in this embodiment, the relative pressure relief valve 17 opens at a time when differential pressure between the wheel cylinder pressure PL and the master cylinder pressure PU is greater than or equal to the predetermined pressure, the brake fluid is allowed to escape from the high-pressure side (i.e., the second conduit part A2) to the low-pressure side (i.e., the first conduit part A1). Therefore, the differential pressure of the wheel cylinder pressure PL and the master cylinder pressure PU is regulated to fall below a predetermined value, as shown by line Z22 in FIG. 22.

When reduction of the brake fluid pressure within the second conduit part A2 is performed, and the first conduit part A1 and the intake port of the pump 15 are interrupted by the ball valve 21 as described above, the relative pressure relief valve 17 functions in the manner of an absolute-pressure relief valve, as shown by line W22 in FIG. 22.

The extent of increase in the wheel cylinder pressure PL becomes less drastic, and so the wheel cylinder pressure PL becomes less prone to reaching the conduit breakdown pressure. Consequently, the brake fluid pressure in the second conduit part A2 can be prevented from reaching a breakdown pressure by utilizing a relative pressure relief valve 17. Therefore, durability of the brake control apparatus is increased, and failure becomes less frequent.

Additionally, according to this embodiment, an extreme degree of breakdown-pressure performance is not required for the brake fluid conduit, and so breakdown-pressure of the brake fluid conduit also can be reduced, resulting in lower apparatus cost.

Furthermore, because the present embodiment makes it difficult for the brake fluid pressure to reach the conduit breakdown pressure, no sensors are utilized. Rather, the circuit structure itself is utilized, so that apparatus safety is extremely high, and is unaffected by sensor.

Eleventh Embodiment

An eleventh embodiment will be described next with reference to FIG. 23, with description of portions similar to the above-described first embodiment being simplified or omitted.

This embodiment combines an anti-skid control system with the basic structure of a brake control apparatus, as with the above-described tenth embodiment, but is characterized in utilizing not merely the foregoing relative pressure relief valve, but also an absolute-pressure relief valve.

Figure 23:
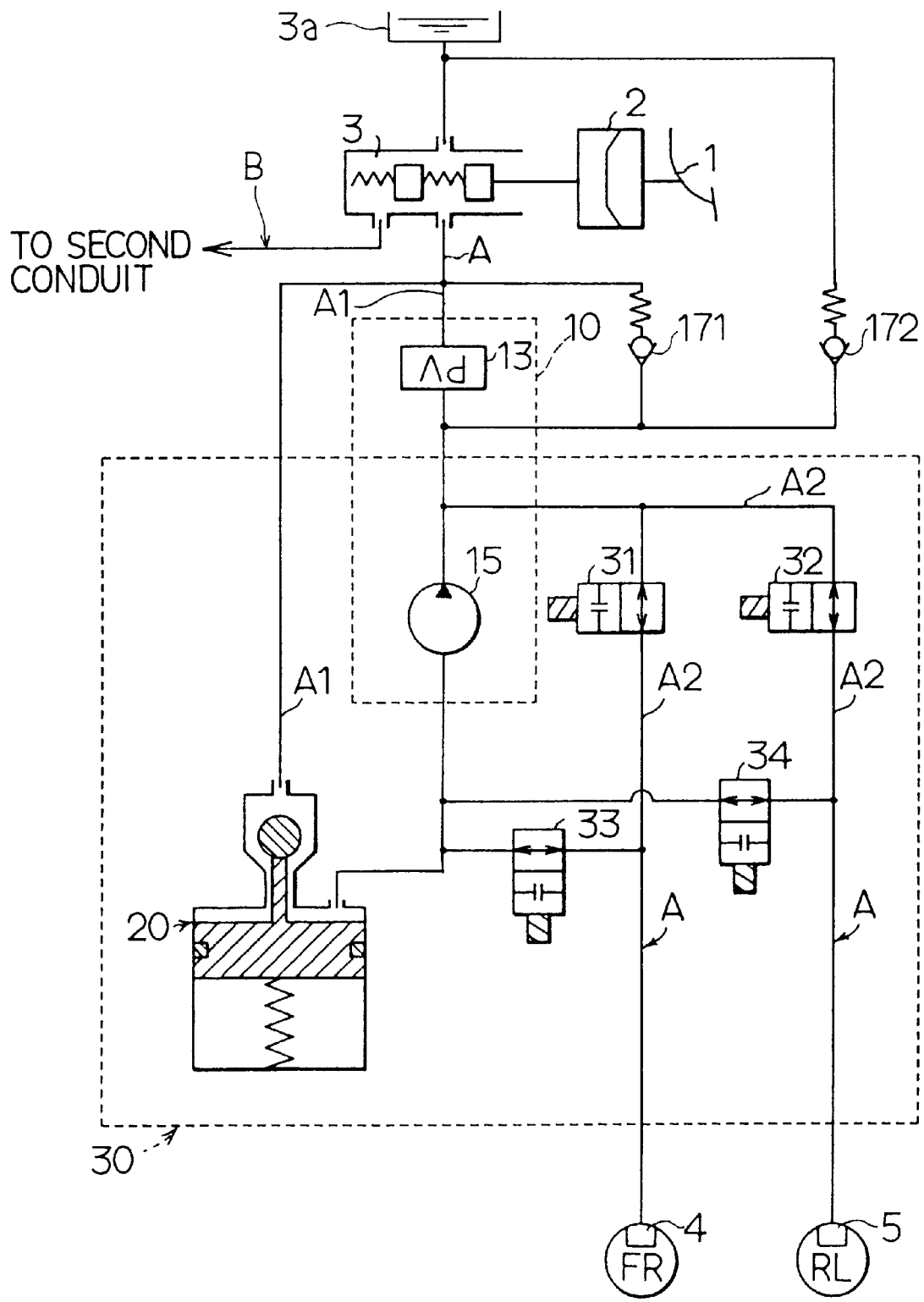
FIG. 23 is a structural view indicating an eleventh embodiment of the present invention.

In FIG. 23, master cylinder pressure PU is conveyed by brake fluid within a first conduit A extending to first and second wheel cylinders 4, 5. The master cylinder pressure PU is conveyed to a second conduit B as well. Because structure similar to the first conduit A can be utilized, detailed description will be omitted.

In particular, according to this embodiment, a relative pressure relief valve 171 is disposed in parallel to a proportioning control valve 13. This relative pressure relief valve 171 opens when brake fluid pressure of a conduit between the proportioning control valve 13 and a pump 15 is greater than or equal to a predetermined value that is higher than brake fluid pressure of a conduit between the proportioning control valve 13 and the master cylinder 3. That is to say, when the brake fluid pressure of the second conduit part A2 is greater than or equal to a predetermined value that is higher than the brake fluid pressure of the first conduit part A1, the relative pressure relief valve 171 allows the brake fluid within the second conduit part A2 to escape to the first conduit part A1, and thereby reduces the brake fluid pressure within the second conduit part A2.

The brake fluid pressure within the second conduit part A2 no longer rises to a predetermined value or more beyond the brake fluid pressure of the first conduit part A1.

Furthermore, an absolute-pressure relief valve 172 is provided in addition to the foregoing relative pressure relief valve 171. This absolute-pressure relief valve 172 is located in a conduit connecting the second conduit part A2 and a master reservoir 3a. When the brake fluid pressure of the second conduit part A2 has increased by a predetermined value or more above the brake fluid pressure (substantially atmospheric pressure) within the master reservoir 3a, the absolute-pressure relief valve 172 opens. Accordingly, the brake fluid within the second conduit part A2 escapes to the master reservoir 3a, and the brake fluid pressure within the second conduit part A2 is reduced.

The brake fluid pressure within the second conduit part A2 no longer rises to or above the predetermined value beyond a predetermined pressure.

As this embodiment is provided with the above-described relative pressure relief valve 171 and absolute-pressure relief valve 172, a structure exhibiting greater safety than the foregoing first embodiment is obtained.

Figure 24:
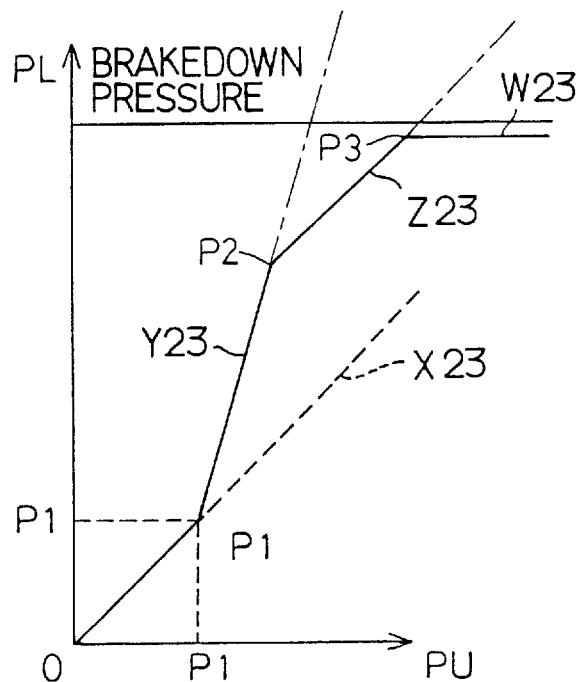
FIG. 24 is a graph indicating change in brake fluid pressure according to the eleventh embodiment.

This situation is exemplified in FIG. 24. When, for example, a relative pressure relief valve 171 is present with no absolute-pressure relief valve 172, the brake fluid pressure (wheel cylinder pressure PL) of the second conduit part A2 increases rapidly, as shown by line Y23 in FIG. 24. Thereafter, the brake fluid pressure within the second conduit part A2 changes from split-point pressure P2 and gradually approaches the breakdown pressure of the conduit, as shown by gradually sloping line Z23 in FIG.24.

If this state continues without change, the brake fluid pressure PL will reach the breakdown pressure as indicated by the dotted line. However, when the absolute-pressure relief valve 172 is present, as in this embodiment, the absolute-pressure relief valve 172 opens when the absolute pressure at split-point pressure P3 is reached, even when the wheel cylinder pressure PL increases as in line Z23. Consequently, the brake fluid is allowed to escape from the high-pressure side to the low-pressure side, and the conduit brake fluid pressure is regulated as shown by line W23 in FIG. 24 so that the breakdown voltage is not exceeded.

The wheel cylinder pressure PL never reaches the breakdown pressure, and so adverse effects on the brake control apparatus due to excessive rise in brake fluid pressure can be prevented. That is to say, the present invention reliably prevents excessive rise in brake fluid pressure in comparison with a case of solely the relative pressure relief valve 171.

Twelfth Embodiment

A twelfth embodiment will be described next, but description of portions similar to the above-described tenth embodiment will be simplified or omitted.

This embodiment combines an anti-skid control system with the basic structure of a brake control apparatus, as with the foregoing tenth embodiment. However, the present embodiment utilizes a structure to control operation of the pump alternative to the above-mentioned relative pressure relief valve.

Figure 25:
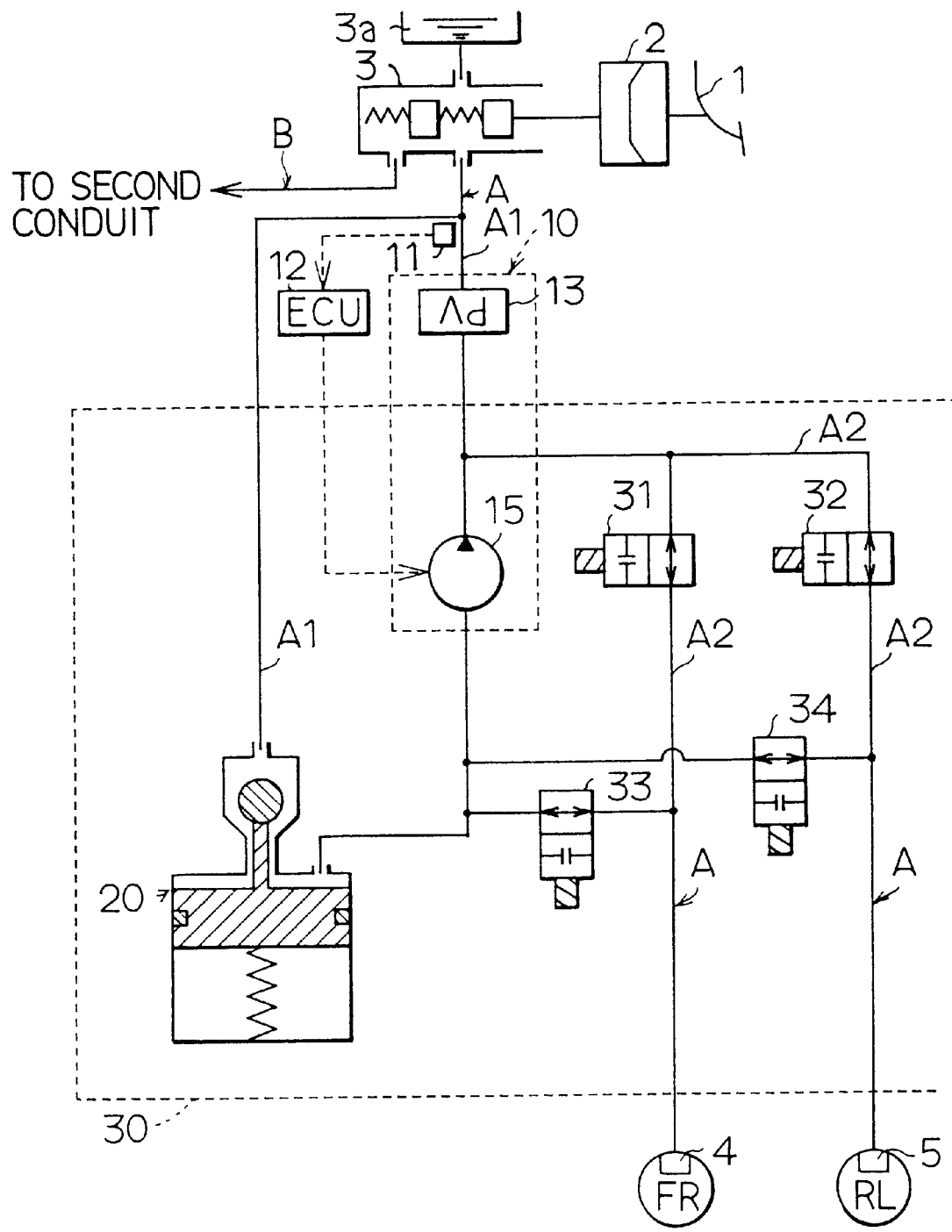
FIG. 25 is a structural view indicating a twelfth embodiment of the present invention.

First, the basic structure of the brake control apparatus will be described with reference to the diagram of FIG. 25.

According to this embodiment, a pressure sensor 11 for detecting brake fluid pressure of a first conduit part A1 is provided between a proportioning control valve 13 and a master cylinder 3. Accordingly, the signal of this pressure sensor 11 is scanned by an ECU 12 and a control signal is sent from the ECU 12 to a pump 15.

Figure 26:
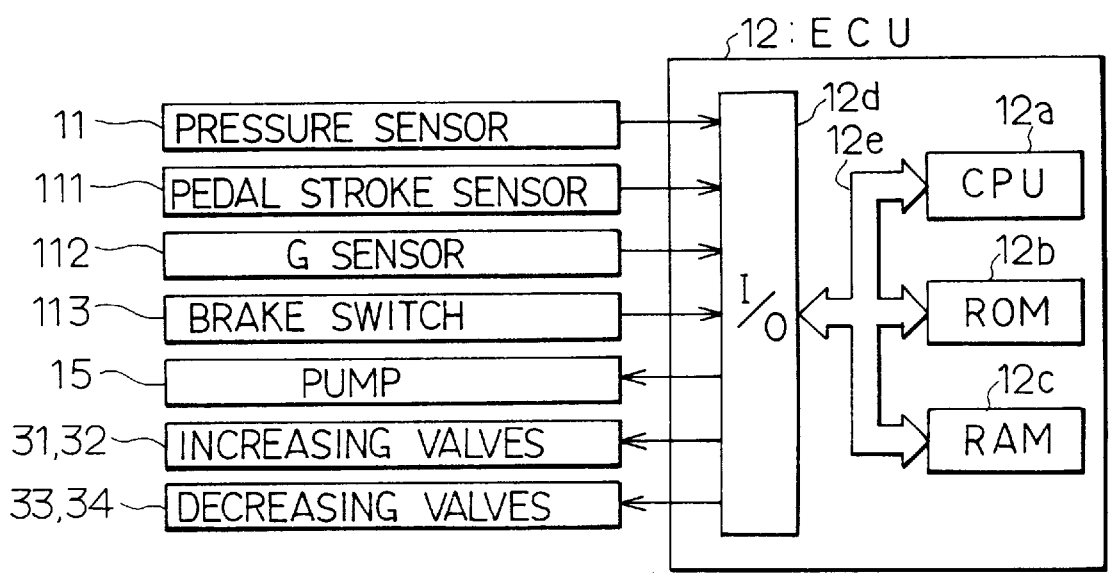
FIG. 26 is a block diagram indicating an electrical control unit of the twelfth embodiment.

The ECU 12 is provided with a CPU 12a, a ROM 12b, a RAM 12c, an input/output portion 12d, a bus line 12e, and the like of known art, as shown in FIG. 26. In addition to the pressure sensor 11, a pedal-stroke sensor 111 to detect the amount of depression of the brake pedal 1, a G sensor 112 to detect deceleration and acceleration of the vehicle, a brake switch 113 to detect depression of the brake pedal, and the like are connected to the input/output portion 14d. Further, first and second pressure-increasing control valves 31, 32, and first and second pressure-reducing control valves 33, 34 are also connected to the input/output portion 14d.

Data on brake fluid pressure obtained by the pressure sensor 11 represents the brake fluid pressure in the first conduit part A1. However, because a predetermined proportional relationship exists between the brake fluid pressure of the first conduit part A1 and the brake fluid pressure of the second conduit part A2, the brake fluid pressure of the second conduit part A2 can be calculated by converting the value detected by the pressure sensor 11 to the pressure of the second conduit part A2 using a map or the like. Alternatively, because the above-mentioned proportional relationship exists, the unchanged brake fluid pressure of the first conduit part A1 also can be used as a value representing the brake fluid pressure of the second conduit part A2.

Control processing performed by the ECU 12 in this embodiment will be described hereinafter, with reference to the flow diagram of FIG. 27. This processing is started when an ignition switch is switched on.

Figure 27:
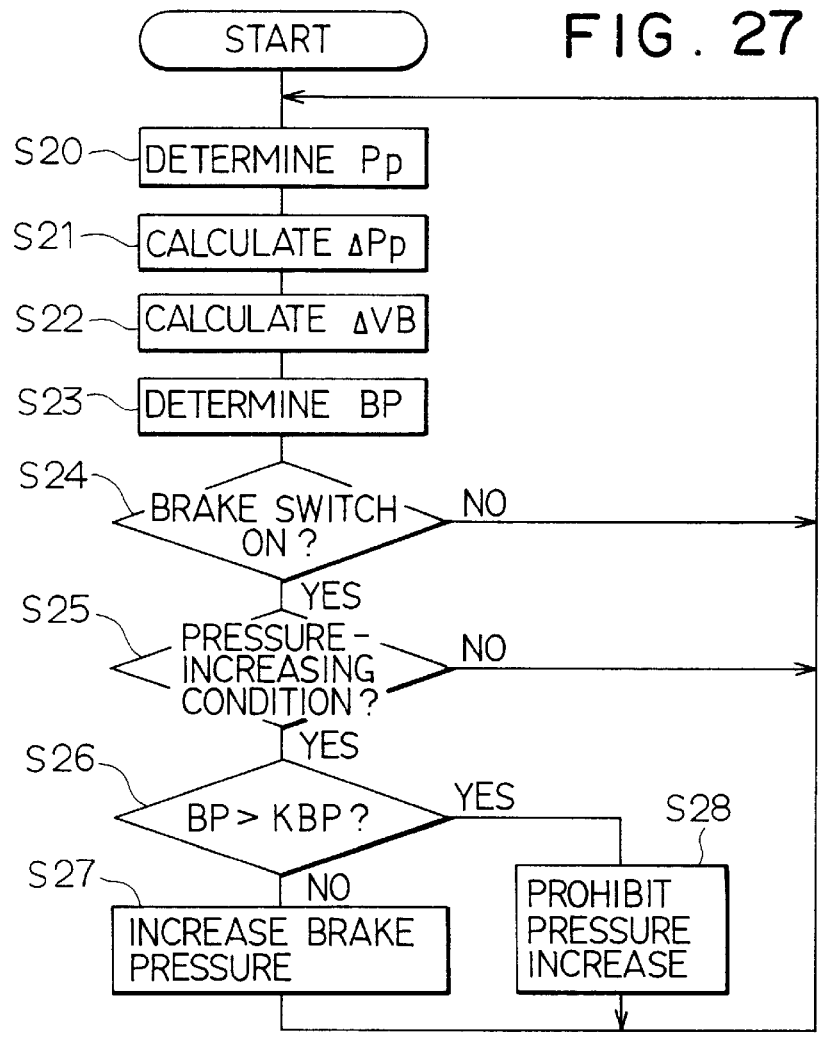
FIG. 27 is a flow diagram indicating control processing of the twelfth embodiment.

At step S20 to step S23 in FIG. 27, computation is performed for conditions which permit pressure amplification by the pump 15 (i.e., pressure-increasing execution conditions).

Namely, at step S20, pedal-stroke quantity Pp is determined based on signals from the pedal-stroke sensor 111.

At step S21, pedal-stroke change quantity $\Delta$Pp is computed from the pedal-stroke quantity Pp determined at the foregoing step S20. Next, at step S22, the signal from the G sensor 112 is read and the vehicle deceleration or acceleration $\Delta$VB is calculated. At step S23, brake fluid pressure BP in the first conduit part A1 is determined based on signals from the pressure sensor 11. Subsequently, at step S24, it is determined whether the brake pedal 1 has been depressed by determining whether the brake switch 113 is on. When an affirmative determination is made, the processing advances to step S25; when a negative determination is made, the processing returns to the foregoing step S20.

At step S25, it is determined whether even one of the conditions is satisfied by the values calculated in the foregoing step 20, step 21, and step 22. That is to say, the values already calculated in the forgoing steps are compared with predetermined reference values, and it is determined whether even one of calculated values exceeds the compared reference value. When an affirmative determination is made herein, the processing advances to step S26; when a negative determination is made, the processing returns to the foregoing step S20.

At step S26, it is determined whether the detected brake fluid pressure BP in the first conduit part A1 surpasses a predetermined reference value KBP. Here, the brake fluid pressure BP of the first conduit part A1 is not converted to the brake fluid pressure of the second conduit part A2. Rather the reference value KBP for the brake fluid pressure BP of the first conduit part A1 is established so that the brake fluid pressure of the second conduit part A2 does not exceed the conduit breakdown pressure. When an affirmative determination is made herein, the processing advances to step S27; when a negative determination is made, the processing advances to step S28.

At step S27, because pressure increase has been permitted, the pump 15 is driven, and the brake fluid pressure of the second conduit part A2 is increased.

Additionally, at step S28, pressure increase has been prohibited. That is, drive of the pump 15 is stopped, an increase in the brake fluid pressure of the second conduit part A2 is prohibited, and the processing returns to step 20.

According to this embodiment, driving of the pump 15 is prohibited when none of the predetermined pressure-increasing execution conditions is satisfied, or when the brake fluid pressure BP of the first conduit part A1 (which suggests the brake fluid pressure of the second conduit part A2) exceeds the reference value KBP, even when the brake pedal 1 has been depressed. Accordingly, the brake fluid pressure of the second conduit part A2 can be prevented from reaching the conduit's breakdown pressure.

According to this embodiment, the pressure sensor 11 is disposed in the first conduit part A1. However, the pressure sensor 11 may alternatively be disposed in the second conduit part A2. In this case, the brake fluid pressure of the second conduit part A2 can be directly detected. Therefore, appropriate action based on more accurate brake fluid pressure can be undertaken, and computational processing can also be reduced.

Thirteenth Embodiment

A thirteenth embodiment will be described next. Description of portions similar to the above-described twelfth embodiment will be simplified or omitted.

Figure 28:
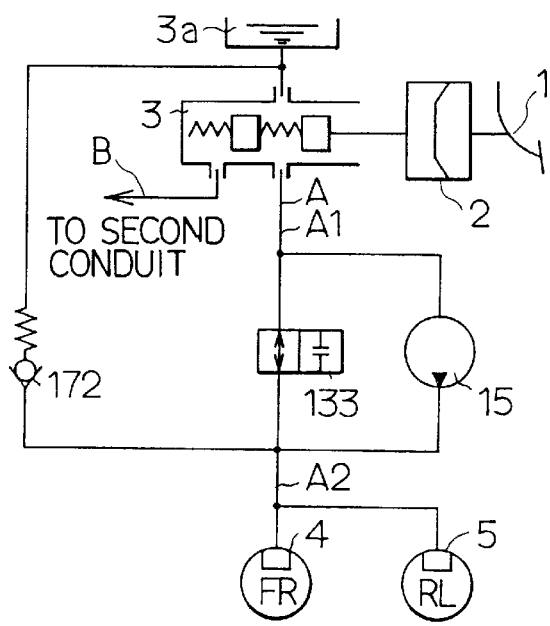
FIG. 28 is a structural view indicating a thirteenth embodiment of the present invention.

According to this embodiment, as shown in FIG. 28, a two-way valve 133, which is not a proportioning control valve, is provided in a first conduit A between a master cylinder 3 and wheel cylinders 4, 5.

A pump 15 is also disposed in parallel with this two-way valve 133. The pump 15 sends brake fluid under pressure from a first conduit part A1 to a second conduit part A2, and increases the brake fluid pressure of the second conduit part A2 to a level higher than the brake fluid pressure of the first conduit part A1.

Furthermore, an absolute-pressure relief valve 172 is provided in the interval between a master reservoir 3a and a conduit (second conduit location A2) between the two-way valve 133 and the wheel cylinders 4, 5. This absolute-pressure relief valve 172 is opened if the brake fluid pressure of the second conduit part A2 reaches a predetermined value (i.e., an absolute pressure) or more. The absolute-pressure relief valve 172 allows brake fluid to escape from a high-pressure side to a low-pressure side (the master reservoir 3a side: atmospheric pressure).

Consequently, in this embodiment, the brake fluid pressure of the second conduit part A2 can reliably be prevented from rising to the conduit's breakdown pressure, similarly to a case where the absolute-pressure relief valve of the above-described embodiments was utilized.

Fourteenth Embodiment

Figure 29:
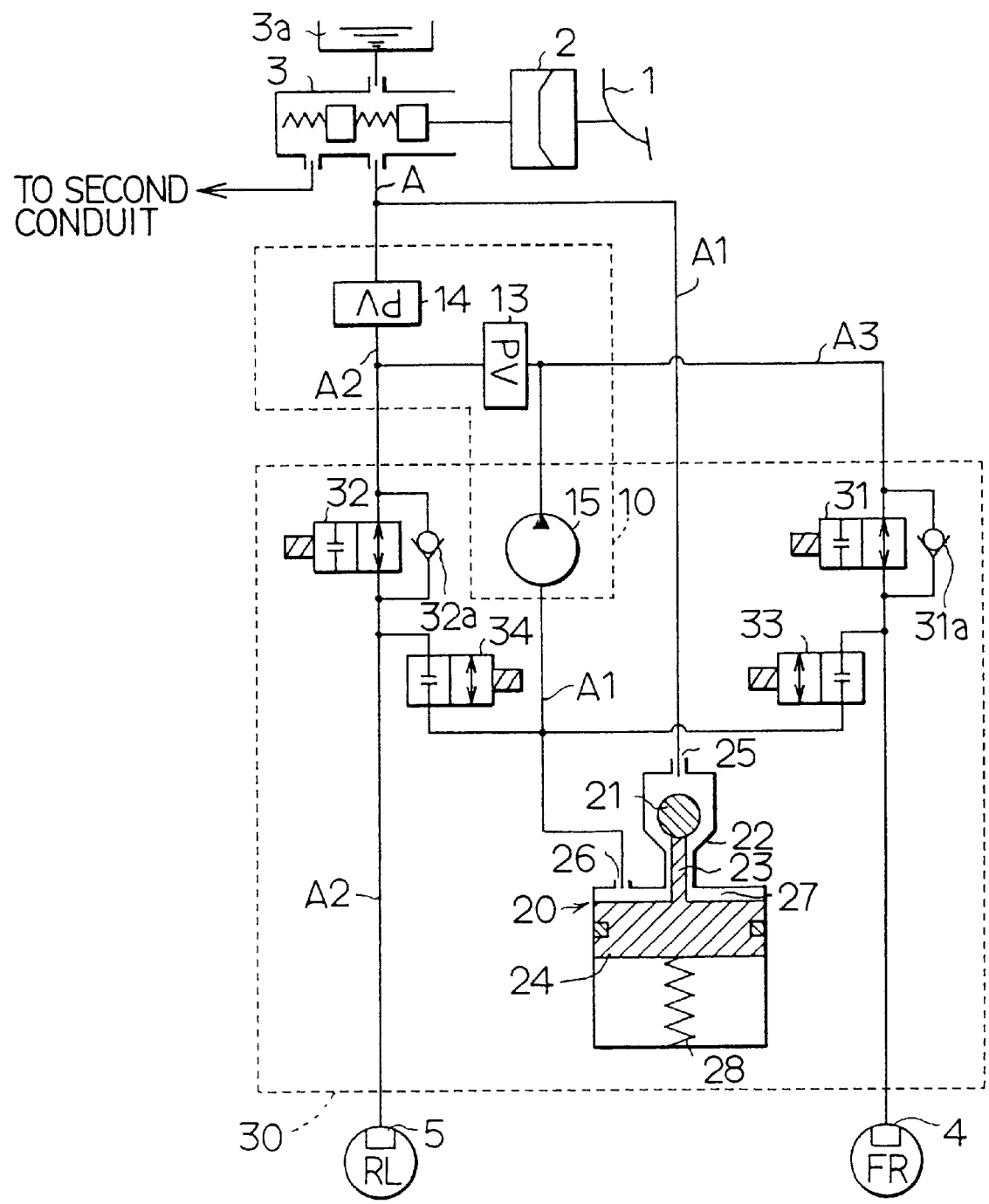
FIG. 29 is a structural view indicating the fourteenth embodiment of the present invention.

A fourteenth embodiment will be described next with reference to FIG. 29.

First, basic structure of the brake control apparatus will be described. As shown in FIG. 29, a first conduit A includes three parts separated by a first proportioning control valve (PV) 14, a second proportioning control valve 13, and a pump 15 disposed in the first conduit A.

That is to say, the first conduit A has a first conduit part A1 to receive master cylinder pressure PU in the interval from a master cylinder 3 to the first proportioning control valve 14 and the intake side of the pump 15 (via a reservoir 20), a second conduit part A2 in the interval from the first proportioning control valve 14 to the second proportioning control valve 13 and a second wheel cylinder 5, and a third conduit part A3 in the interval from the discharge side of the pump 15 to the second proportioning control valve 13 and a first wheel cylinder 4.

Additionally, the first proportioning control valve 14 is disposed in a reverse direction within a conduit between the master cylinder 3 and the second conduit part A2, and the second proportioning control valve 13 is disposed in a reverse direction within a conduit between the second conduit part A2 and the third conduit part A3. The pump 15 is disposed in a conduit between the reservoir 20 and the third conduit part A3, takes in brake fluid from the first conduit part A1, and discharges brake fluid to the third conduit part A3 during generation of the master cylinder pressure PU. According to this embodiment, a pressure amplifying device 10 is structured by the first and second proportioning control valves 14, 13 and the pump 15.

Consequently, when the pump 15 is driven at a time when the brake pedal 1 is depressed and the master cylinder pressure PU is generated within the first conduit part A1, brake fluid in the first conduit part A1 is moved to the third conduit part A3. Therefore, the brake fluid pressure of the third conduit part A3 is increased and held at an increased third brake fluid pressure BP3 by the second proportioning control valve 13. At this time, a second brake fluid pressure BP2 of the second conduit part A2 is established to be lower than the third brake fluid pressure BP3 by pressure in accordance with a predetermined attenuating ratio due to the action of this second proportioning control valve 13. Accordingly, the relationship of the first through third conduit parts A1 to A3 becomes: master cylinder pressure PU (first brake fluid pressure BP1) <second brake fluid pressure BP2 <third brake fluid pressure BP3.

For this reason, the second brake fluid pressure BP2 which is higher than the master cylinder pressure PU is applied to the second wheel cylinder 5. Thus, pressure that is, to a certain extent, high is applied to the rear-wheel side (i.e., to the rear-left wheel RL) to ensure braking force. Furthermore, the third brake fluid pressure BP3 which is higher than the second brake fluid pressure BP2 is applied to the first wheel cylinder 4. Accordingly, pressure higher than that for the rear-wheel side is applied to the front-wheel side (i.e., to the front-right wheel FR) and higher braking force is ensured.

Thus, according to this embodiment, the first proportioning control valve 14 is disposed in the reverse direction within the conduit between the master cylinder 3 and the second conduit part A2. The second proportioning control valve 13 is also disposed in the reverse direction by the conduit between the second conduit part A2 and the third conduit part A3. Also, the pump 15 is disposed in the conduit between the reservoir 20 and the third conduit part A3 and is structured to take in brake fluid from the first conduit part A1 and discharge brake fluid to the third conduit part A3.

Consequently, when the pump 15 is driven at a time when the brake pedal 1 is depressed and the master cylinder pressure PU is generated within the first conduit part A1, the master cylinder pressure PU of the first conduit part A1 becomes less than the second brake fluid pressure BP2 of the second conduit part A2, which in turn becomes less than the third brake fluid pressure BP3 of the third conduit part A3.

Therefore, the third brake fluid pressure BP3 having the highest pressure is applied to the first wheel cylinder 4, and so high pressure is imparted to the front-wheel side (i.e., to the front-right wheel FR). High braking force is thus demonstrated. Meanwhile, the second brake fluid pressure BP2, which is lower than the third brake fluid pressure BP3, is applied to the second wheel cylinder 5, and the rear-wheel side (i.e., to the rear-left wheel RL) becomes less susceptible to locking than the front-wheel side.

Due to the structure as described above, ideal braking force distribution at the front and rear wheels is obtained. That is, the brake fluid pressure applied to the wheel cylinder 4 on the front-wheel side is greater than the brake fluid pressure applied to the wheel cylinder 5 on the rear-wheel side, and brake fluid pressure can be established at a high value overall. As a result, overall braking force for the vehicle can be enhanced with less requisite depression force.

Additionally, the respective proportioning control valves 13, 14 may be caused not merely to differ in split-point pressure, but, for example, also may be caused to differ in pressure-receiving surface-area ratios, as was described in detail in FIG. 11. Due to the difference in the pressure-receiving surface-area ratios, when the pressure-increasing gradient of the proportioning control valve 13 is established to be greater than the pressure-increasing gradient of the proportioning control valve 14, ideal brake fluid-force distribution can be approached yet more closely. That is to say, the attenuation ratio of the proportioning control valve 13 may be established to be greater than the attenuation ratio of the proportioning control valve 14.

Fifteenth Embodiment

A fifteenth embodiment will be described next, with description of portions similar to the above-described fourteenth embodiment being simplified or omitted.

This embodiment provides the basic structure of a brake control apparatus and an anti-skid control system, similarly to the above-described fourteenth embodiment, but in a state wherein pressure is applied opposite the foregoing fourteenth embodiment with respect to the front-wheel side and the rear-wheel side.

Figure 30:
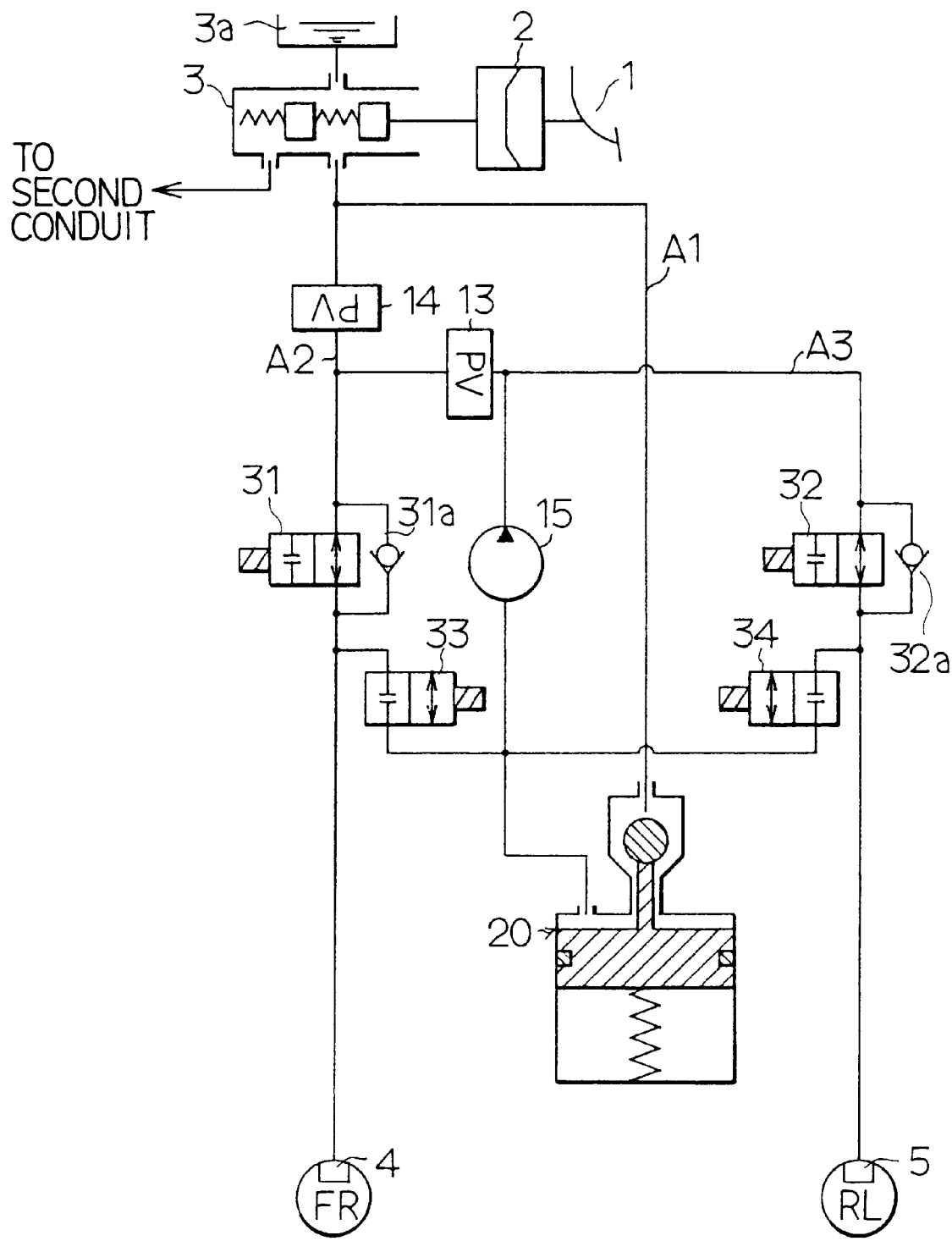
FIG. 30 is a structural view indicating the fifteenth embodiment of the present invention.

As shown in FIG. 30, according to this embodiment, structure of first and second proportioning control valves 14, 13, a pump 15, first through third conduit parts A1 to A3, a reservoir 20, and so on is similar to the above-described fourteenth embodiment. However, this embodiment differs from the foregoing fourteenth embodiment in that a first wheel cylinder 4 performing braking of the front-right wheel FR is connected to the second conduit part A2, and a second wheel cylinder 5 performing braking of the rear-left wheel RL is connected to the third conduit part A3.

Consequently, brake fluid pressure which is small (but which is larger than master cylinder pressure PU) is applied to a first wheel cylinder 4 of the front-right wheel FR, and brake fluid pressure larger than the first wheel cylinder 4 is applied to a second wheel cylinder 5 of the rear-left wheel RL.

Due to structure such as this, the brake fluid pressure applied to the second wheel cylinder 5 on the rear-wheel side is greater than the brake fluid pressure applied to the first wheel cylinder 4 on the front-wheel side. Brake fluid pressure can be established at a high value overall, and so braking force for the vehicle overall can be enhanced with less depression force.

Particularly in a case of, for example, a large amount of cargo, load movement of the vehicle is small, and a large load weight is placed on the rear-wheel side during braking. According to this embodiment, the brake fluid pressure of the second wheel cylinder 5 on the rear-wheel side is increased, and the braking force on the rear-wheel side can be increased. Therefore, braking performance can be enhanced in a case of a large amount of cargo.

Moreover, the braking force on the front-wheel side is actually established to be greater than the braking force on the rear-wheel side due to the structure of the brake pads and the like, even when the brake fluid pressure applied to the second wheel cylinder 5 on the rear-wheel side is larger than the brake fluid pressure applied to the first wheel cylinder 4 on the front-wheel side, as in this embodiment. Because of this, the rear-wheel side can be prevented from falling into a locking state prior to the front-wheel side when load movement has occurred during vehicle braking.

Furthermore, a similar mode of operation can be expected even when one or both of the first and second proportioning control valves 14, 13 is replaced with a two-way valve or an aperture.

Sixteenth Embodiment

A sixteenth embodiment will be described next. Description of portions similar to the embodiments described above will be simplified or omitted.

First, basic structure of the brake control apparatus will be described with reference to the model diagram in FIG. 31.

Figure 31:
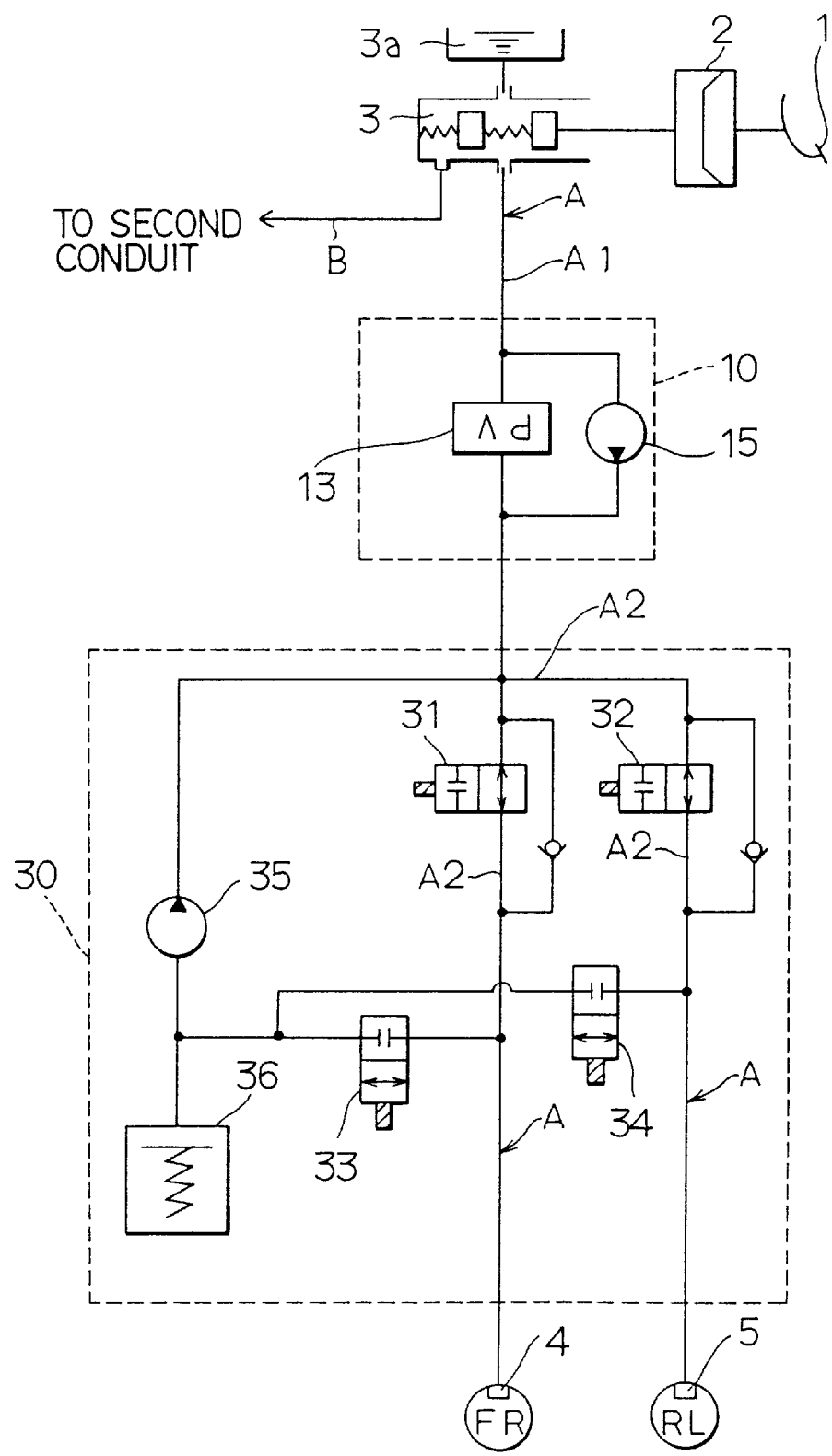
FIG. 31 is a structural view indicating the sixteenth embodiment of the present invention.

In FIG. 31, a brake pedal 1 is connected to a booster 2, and master cylinder 3 is provided with a master reservoir 3a.

Master cylinder pressure PU is conveyed by brake fluid within a first conduit A extending to first and second wheel cylinders 4, 5. The master cylinder pressure PU is similarly conveyed to a second conduit, but, because structure similar to the first conduit A can be utilized, detailed description will be omitted.

The first conduit A includes two parts separated by a pressure amplifying device 10. The first conduit A has a first conduit part A1 to receive the master cylinder pressure PU in the interval from the master cylinder 3 to the pressure amplifying device 10, and a second conduit part A2 in the interval from the pressure amplifying device 10 to the wheel cylinders 4, 5.

The pressure amplifying device 10 moves brake fluid of the first conduit part A1 to the second conduit part A2 and holds the pressure at the second conduit part A2 at second brake fluid pressure PL when the brake pedal 1 is depressed and the master cylinder pressure PU is generated within the first conduit A.

According to this embodiment, the pressure amplifying device 10 includes a proportioning control valve (PV) 13 and a pump 15 as a device for holding pressure.

The pump 15 is connected to the first conduit A in parallel with the proportioning control valve 13, and takes in brake fluid from the first conduit part A1 and discharges brake fluid to the second conduit part A2 during generation of the master cylinder pressure PU.

The proportioning control valve 13 is disposed in the first conduit A in reverse, similarly to the foregoing first embodiment. When brake fluid from the first conduit part A1 has been moved to the second conduit part A2 by the pump 15 and the brake fluid pressure of the second conduit part A2 has become the second brake fluid pressure PL, which is greater than the master cylinder pressure PU, the proportioning control valve 13 acts to maintain this differential pressure (PL–PU).

Additionally, according to this embodiment, an anti-skid system 30 is disposed in the second conduit part, and includes an independent ABS pump 35. Moreover, an ABS reservoir 36 is not disposed in the intake passage of the pump 15. That is, the pressure amplifying device 10 is not part of the structure of the anti-skid system 30.

Figure 32:
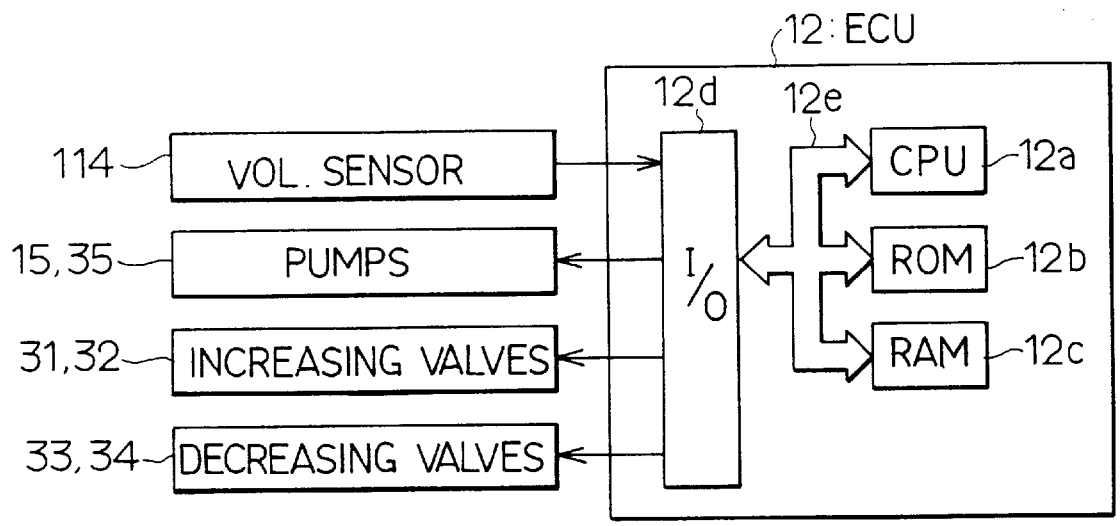
FIG. 32 is a block diagram indicating an electrical control unit of the sixteenth embodiment.

Anti-skid control and control which causes brake fluid to be moved from the master cylinder side to the side of the wheel cylinders 4, 5 to increase braking force are performed by an electronic control unit (ECU) 12 as shown in FIG. 32.

This ECU 12 is structured as a microcomputer provided with a CPU 12a, a ROM 12b, a RAM 12c, an input/output portion 12d, a bus line 12e, and the like of known art. A voltage sensor 114 to detect abnormality of the foregoing pump 35 for anti-skid-control based on an applied voltage thereto is connected to the input/output portion 12d. Further, the pumps 15, 35, first and second pressure-increasing control valves 31, 32, and first and second pressure-reducing control valves 33, 34 are connected to the input/output portion 12d as well.

Control processing performed by this ECU 12 will be described hereinafter.

Figure 33:
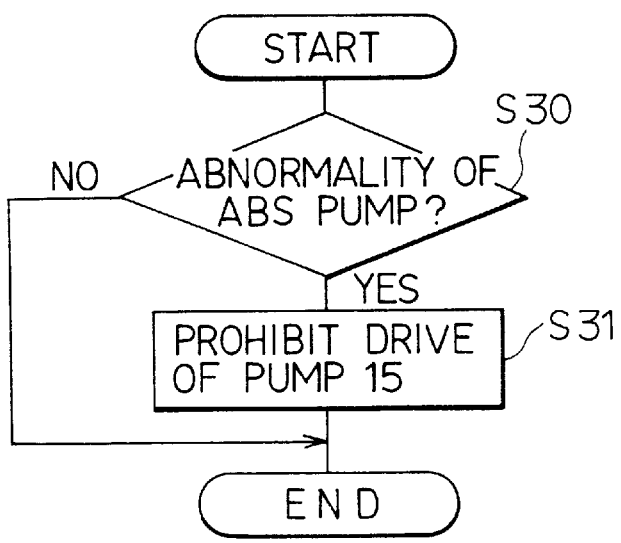
FIG. 33 is a flow diagram indicating control processing of the sixteenth embodiment.

As shown in the flow diagram in FIG. 33, at step S30, the state of voltage applied to the pump 35 for anti-skid-control is detected by the voltage sensor 114, and it is determined on a basis of the signal from this voltage sensor 114 whether an abnormality has occurred in the pump 35. When an abnormality occurs, at step S31, driving of the pump 15 is prohibited.

In this way, the embodiment utilizes a structure wherein an anti-skid control system is combined with the basic structure of the above-described brake control apparatus. However, unlike the foregoing fifteenth embodiment, the pump 10 of the pressure amplifying device 10 and the pump 35 for anti-skid-control are separately provided.

Additionally, when abnormality of the pump 35 for anti-skid-control is detected by the voltage sensor 114, driving of the pump 15 is prohibited.

For this reason, when some abnormality has occurred in the pump 35 for anti-skid-control and pressure-reducing control for the wheel cylinder pressure cannot be performed, pressure-increasing control of the wheel cylinder pressure to increase braking force by the pump 15 is prevented.

That is to say, when anti-skid control cannot favorably be performed, increase of the wheel cylinder pressure by the pump 15 of the pressure amplifying device 10 is impossible. Therefore, wheel locking can be prevented, and braking performance and safety are enhanced.

According to the present embodiment, pump abnormalities are detected. Alternatively, when safety is to be further increased, abnormalities of the reservoir 36, the first and second pressure-increasing control valves 31, 32, the first and second pressure-reducing control valves 33, 34, may also be detected to prohibit driving of the pump 15 when these abnormalities are detected.

The pump 15 may be utilized both for increasing pressure of the second brake fluid pressure PL of the second conduit part A2, and for anti-skid control when an anti-skid-control system is combined with the basic structure of a brake control apparatus, as indicated in FIG. 6.

Referring again to FIG. 6, the pump 15 which moves the brake fluid of the first conduit part A1 to the second conduit part A2 and increases the second brake fluid pressure PL, and the pump 15 which in anti-skid control takes in the brake fluid within the reservoir 20 which has escaped from the respective wheel cylinders 4, 5 because of reduction of wheel cylinder pressure, are caused to be a common device.

For this reason, when, hypothetically speaking, some mechanical abnormality should occur in the structure, and particularly in the pump 15, because the same pump 15 is utilized for the pressure amplifying device 10 as well, performing pressure-increasing control of the wheel cylinder pressure to increase braking force by the pressure amplifying device 10 also becomes impossible.

That is to say, in FIG. 6, the pump 15 for anti-skid-control and the pump 15 utilized as the pressure amplifying device 10 are shared. Therefore, even when the pump 15 fails and anti-skid control becomes impossible, increase in the wheel cylinder pressure by the pressure amplifying device 10 naturally also becomes impossible. Accordingly, safety in braking control is also further enhanced with the embodiment illustrated in FIG. 6.

Additionally, because it is unnecessary to provide two pumps each having a discrete function, structure is simplified and cost can be reduced.

Seventeenth Embodiment

A seventeenth embodiment will be described next with reference to FIG. 34.

First, basic structure of the brake control apparatus will be described with reference to the model diagram indicated in FIG. 34. For structure exhibiting a mode of operation similar to the embodiments described above, description thereof will be omitted or simplified.

A switching device 100 of this embodiment will be described hereinafter.

This switching device 100 switches braking between a pressure amplifying device 10 (i.e., a power brake), and braking due to a normal brake.

The switching device 100 includes a first switching control valve 102 disposed in a conduit between a master cylinder 3 and a first pressure-increasing control valve 31, and a second switching control valve 101 disposed in a conduit between the master cylinder 3 and a proportioning control valve 13. These first and second switching control valves 102, 101 are solenoids which switch a conduit to either of two states, i.e., open or closed, according to a control signal. A check valve 103 is disposed in parallel with the first switching control valve 102.

Figure 34:
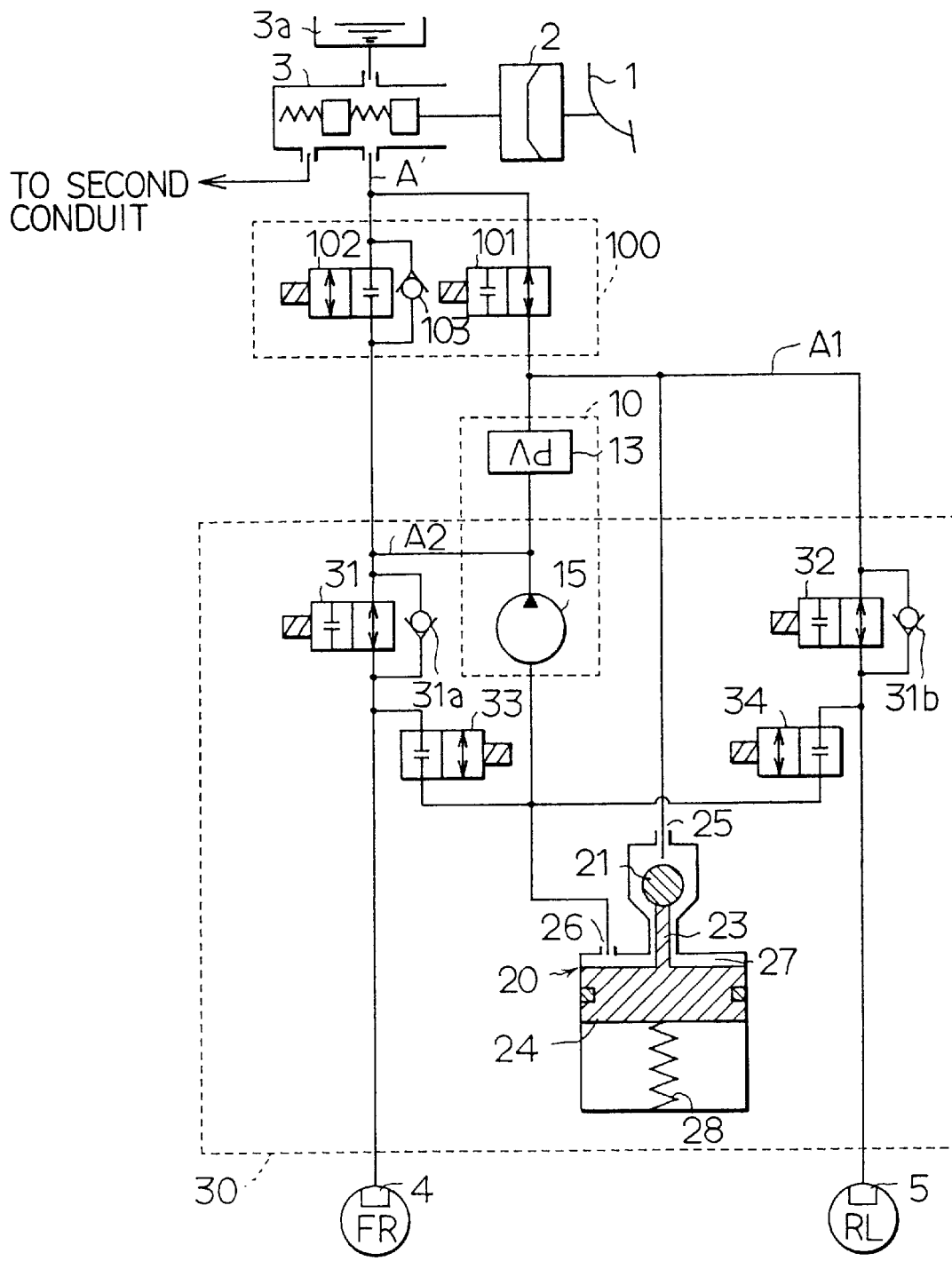
FIG. 34 is a structural view indicating a seventeenth embodiment of the present invention.

Consequently, when brake fluid pressure is increased, and braking force is increased utilizing the pressure amplifying device 10, the first switching control valve 102 is closed and the second switching control valve 101 is opened, as shown in FIG. 34. Because a first wheel cylinder 4 on the front-wheel side is connected to a discharge side of the pump 15 via a second conduit part A2, the high-pressure second brake fluid pressure PL is applied to the first wheel cylinder 4. The master cylinder pressure PU is lower than the second brake fluid pressure PL, and is applied to a second wheel cylinder 5 on the rear-wheel side.

Figure 35:
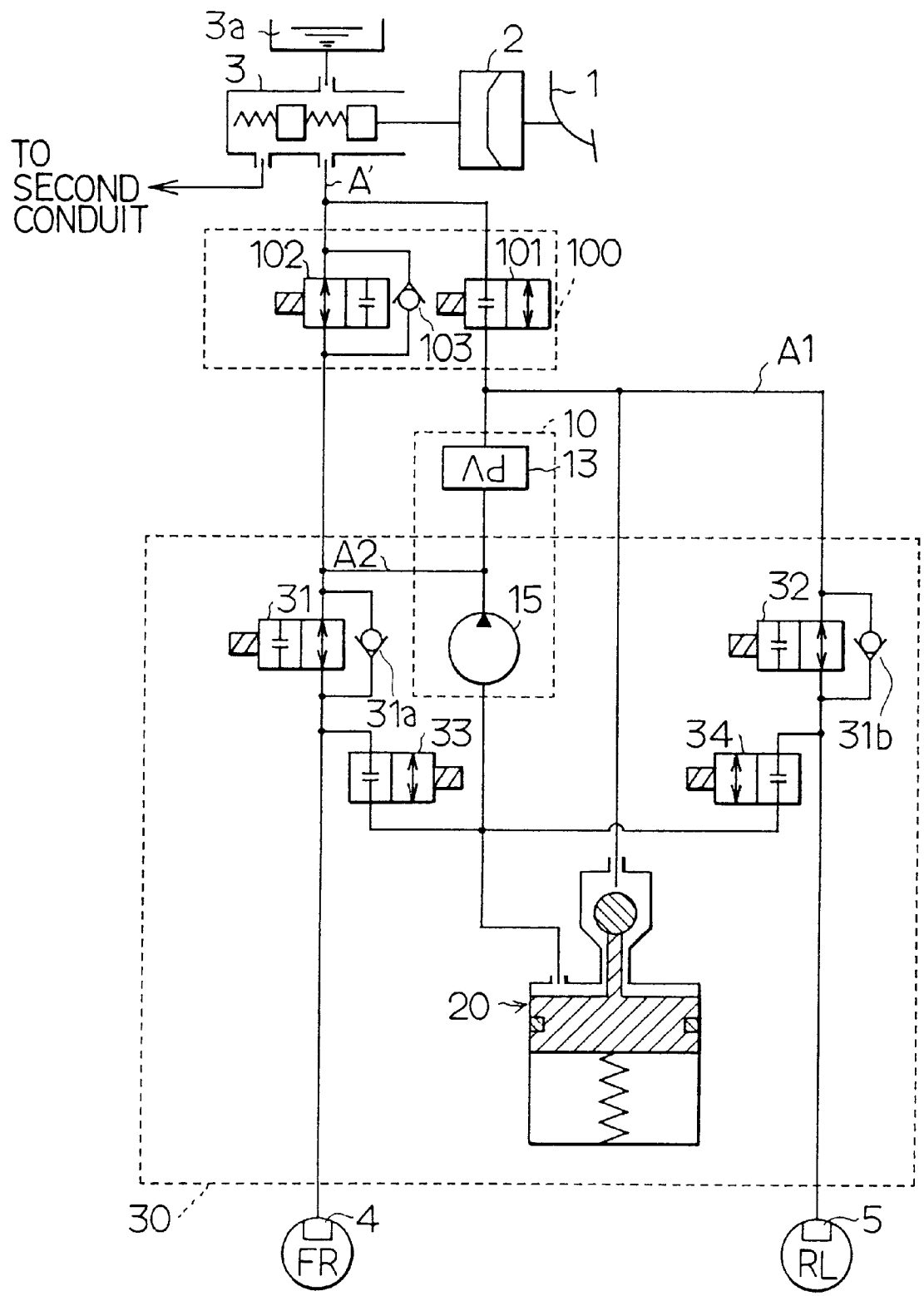
FIG. 35 is a structural view indicating operation of a brake control apparatus according to the seventeenth embodiment.

Meanwhile, during normal braking, the pump 15 is not driven. The first switching control valve 102 is opened and the second switching control valve 101 closed (this is the state when electrification of the two switching control valves 102 and 101 has been switched off), as shown in FIG. 35. Due to this, normal braking is obtained wherein the master cylinder pressure PU is applied via the first switching control valve 102 in a communicated state to the first wheel cylinder 4 on the front-wheel side, and brake fluid pressure caused by the proportioning control valve 13 to be lower than the master cylinder pressure PU is applied to the second wheel cylinder 5 on the rear-wheel side.

Figure 36:
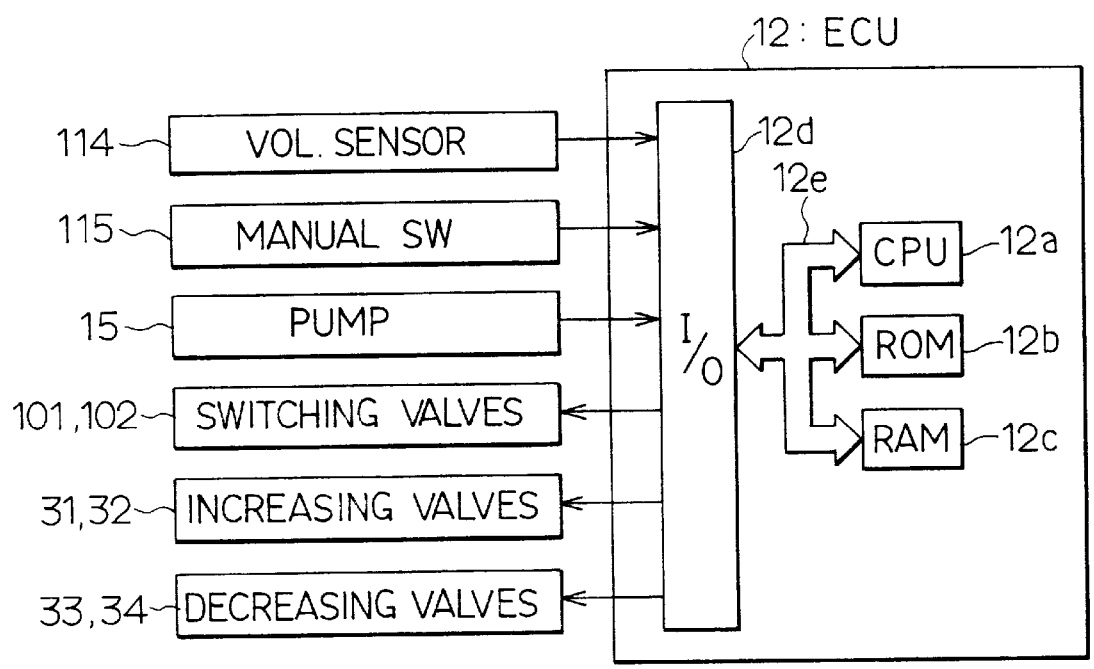
FIG. 36 is a block diagram indicating an electrical control unit of the seventeenth embodiment.

The above-described control by the switching device 100, and the control which moves brake fluid from the master cylinder 3 side to the side of the wheel cylinders 4, 5 to increase braking force, are performed by ECU 12 shown in FIG. 36.

This ECU 12 is structured as a microcomputer provided with a CPU 12*a*, a ROM 12*b*, a RAM 12*c*, an input/output portion 12*d*, a bus line 12*e*, and the like of known art. A manual selector switch 115 to switch between a power-braking state and a normal-braking state, and a voltage sensor 114 that detects abnormalities of the pump 15 based on voltage applied thereto, are connected to the input/output portion 12*d*. The first and second switching control valves 102, 101, along with first and second pressure-increasing control valves 31, 32, and first and second pressure-reducing control valves 33, 34, also are connected to the input/output portion 12*d*.

Drive control of the switching device 100 performed by this ECU 12 will be described next with reference to FIG. 37.

Figure 37:
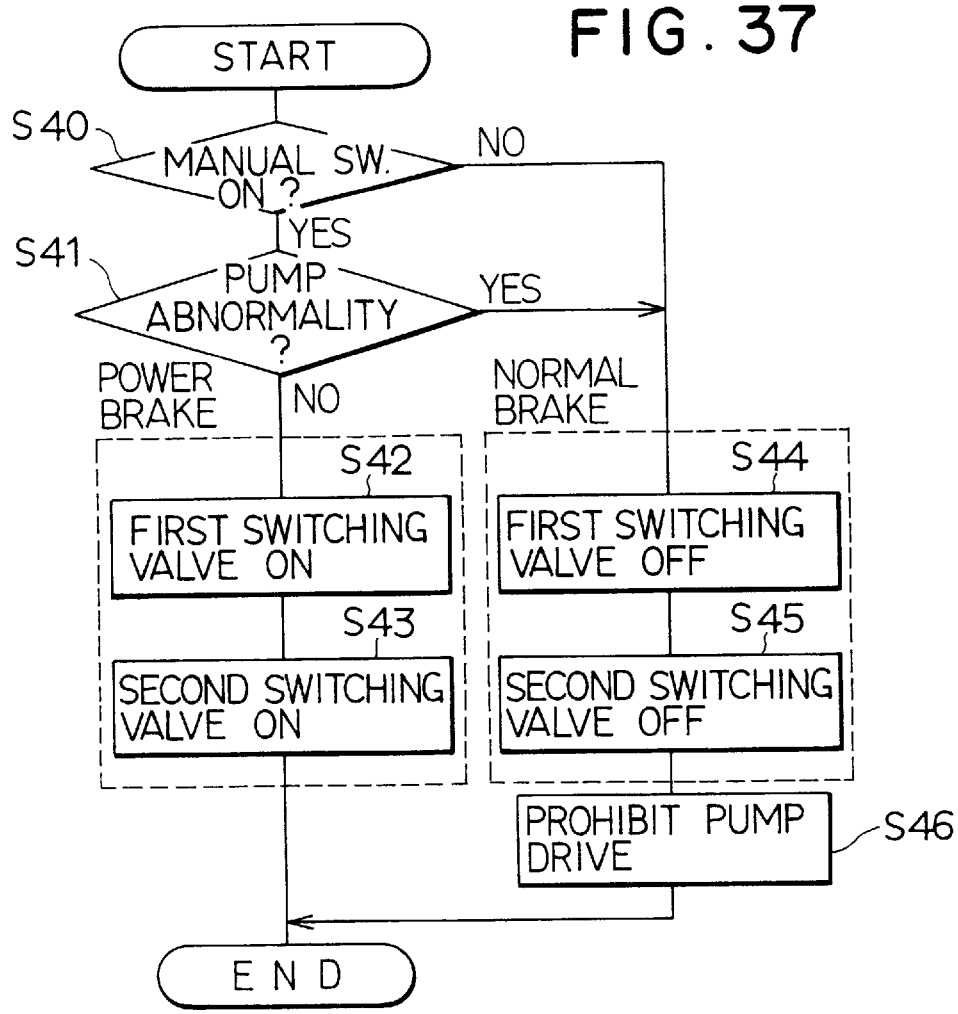
FIG. 37 is a flow diagram indicating control processing of the seventeenth embodiment.

First, at step S40 in FIG. 37, it is determined whether the manual selector switch 115 is on or off. That is to say, it is determined whether the power-braking state (switch 115 is on) has been established or the normal-braking state (switch 115 is off) has been established. When the manual selector switch 115 is on, the processing advances to step S41; when the switch 115 is off, the processing advances to step S44.

At step S41, it is determined on a basis of a signal from the voltage sensor 114 whether an abnormality has occurred in the pump 15. When it is determined that an abnormality has occurred, the processing advances to step S44; when it is determined that no abnormality has occurred, the processing advances to step S42.

At step S42, power braking has been permitted, and so the first switching control valve 102 is switched on to obtain an interrupted state. Subsequently at step S43, the second switching control valve 101 is switched off to obtain a communicated state. Thereafter, the processing is terminated. Thus, a state wherein power braking can be utilized is obtained, as shown in FIG. 34.

Meanwhile, at step S44, the state is such that power braking is not permitted, and so the first switching control valve 102 is switched off to obtain a communicated state. Subsequently at step S45, the second switching control valve 101 is switched off to obtain an interrupted state. Then, at step S46, actuation of the pump 15 for power braking is prohibited, and the processing is terminated. In short, a state wherein normal braking can be utilized is obtained, as shown in FIG. 35.

In this way, according to this embodiment, a state where power braking is utilized, and a state where normal braking is utilized, can be switched by controlling the first and second switching control valves 102, 101 based on signals from the manual selector switch 115 and the voltage detector 114.

Consequently, when, for example, a state exists in which power braking cannot be normally used due to an abnormality in the pump 15, the brake fluid pressures of the front-wheel side and the rear-wheel side may become equal, and the rear-wheel side may become susceptible to locking prior than the front-wheel side. As a result, braking may become unstable. However, according to this embodiment, when such an abnormality in the pump 15 is detected by the voltage detector 114, the state can be switched to normal braking. That is to say, when an abnormality in the pump 15 has occurred, the switching device 100 switches to a normal braking state wherein the ordinary proportioning control valve 13 is connected in the normal direction. Accordingly, ideal braking force distribution at the front and rear wheels can be obtained, and stabilized braking can be performed.

Additionally, because the power-braking state and the normal-braking state can be suitably switched through manipulation of the manual selector switch 115 by the driver, even when there is no abnormality in the pump 15, favorable multiple-mode operation becomes possible.

Eighteenth Embodiment

An eighteenth embodiment will be described next with reference to FIG. 38. Description of portions similar to the embodiments described above will be simplified or omitted.

First, basic structure of the brake control apparatus will be described with reference to the model diagram in FIG. 38.

Figure 38:
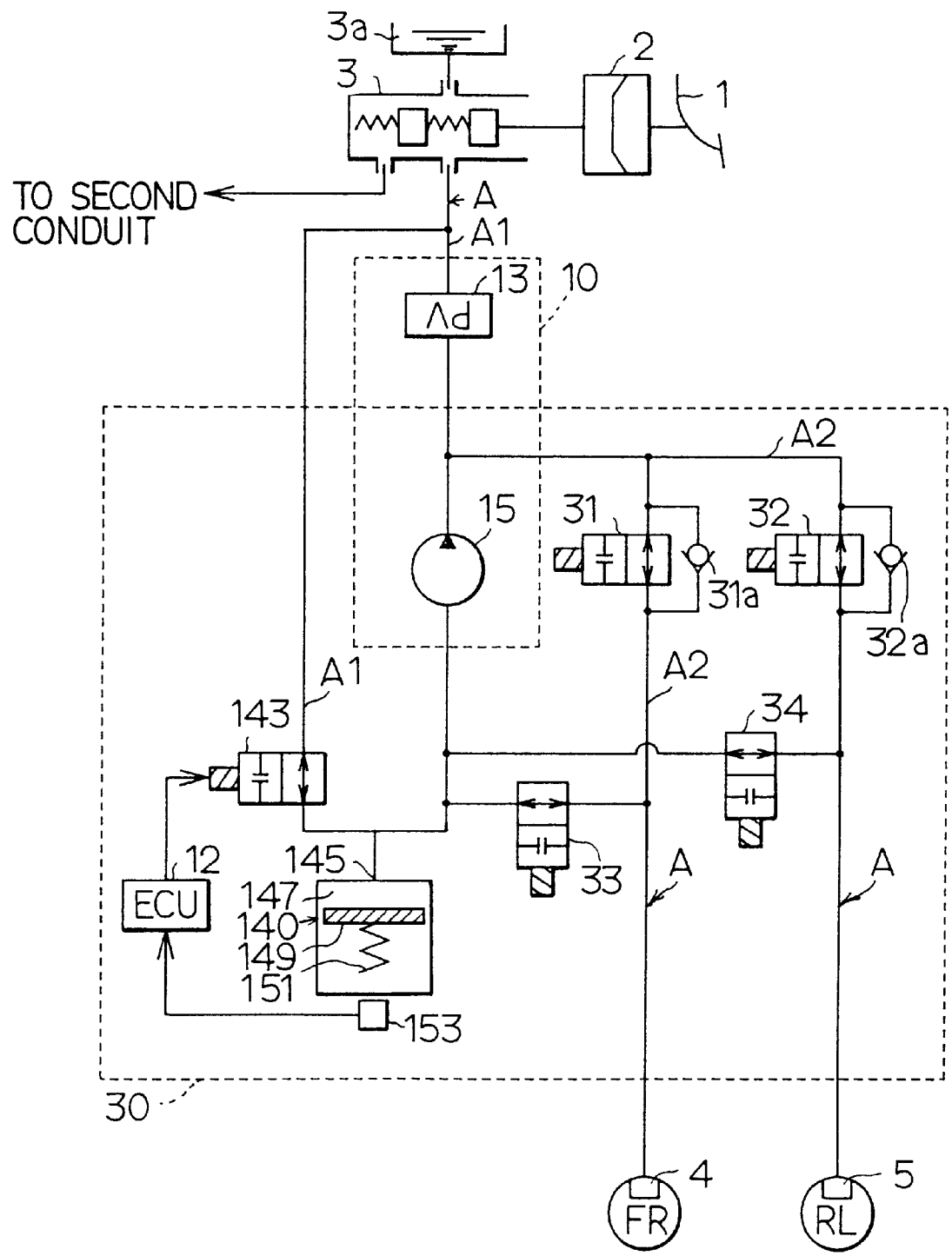
FIG. 38 is a structural view indicating an eighteenth embodiment of the present invention.

In FIG. 38, a reservoir 140 is disposed in a first conduit part A1 between the master cylinder 3 and a brake fluid intake side of a pump 15. A solenoid 143 is disposed in the first conduit part A1 between the master cylinder 3 side and the reservoir 140.

This reservoir 140 is for accumulating brake fluid discharged from wheel cylinders 4, 5, defines a reservoir hole 145 connected to the first conduit part A1 and a reservoir chamber 147 to store brake fluid. Further, the reservoir includes a piston 149 which causes the capacity of the reservoir chamber 147 to be variable, and a spring 151 to compress the piston 149 toward the reservoir chamber 147 and apply force to expel brake fluid. Additionally, a stroke sensor 153 to measure the amount of movement of the piston 149 is installed on this reservoir 140 to detect the brake fluid quantity within the reservoir chamber 147 based on the amount of movement of the piston 149.

Meanwhile, the solenoid 143 is controlled at two positions, i.e., open and closed, to switch a communicated state and an interrupted state of the first conduit part A1 between the master cylinder side and the reservoir 140.

Accordingly, signals from the stroke sensor 153 are received by an ECU 12, and control signals are sent from the ECU 12 to the solenoid 143.

Figure 39:
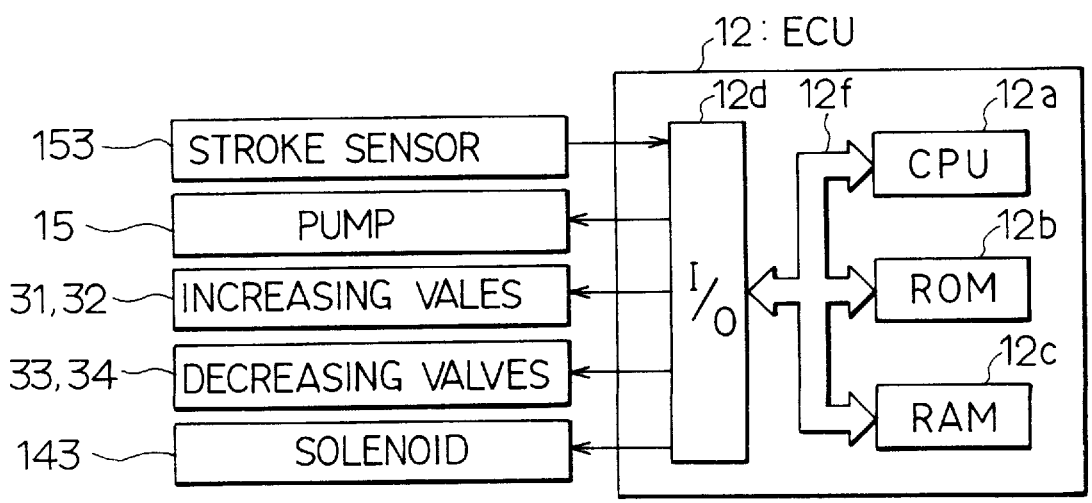
FIG. 39 a block diagram indicating an electrical control unit of the eighteenth embodiment.

This ECU 12 is structured as a microcomputer provided with a CPU 12a, a ROM 12b, a RAM 12c, an input/output portion 12d, a bus line 12f, and the like of known art, as shown in FIG. 39. The stroke sensor 153, the solenoid 143, the pump 15, first and second pressure-increasing control valves 31, 32 and first and second pressure-reducing control valves 33, 34 are connected to the input/output portion 12d.

Processing control of this embodiment structured in the above-mentioned manner will be described next.

When a locking state of the wheel has been detected on a basis of signals from a wheel-speed sensor (not illustrated), brake fluid which has been applied to the wheel cylinders 4, 5 is discharged into the reservoir chamber 147. Accordingly, the respective wheel cylinder pressures can be reduced, by closing the solenoid 143, closing the first and second pressure-increasing control valves 31, 32 and opening the first and second pressure-reducing control valves 33, 34. In this way, pressure-reducing control for the wheel cylinder pressures in anti-skid control can be executed.

Additionally, when a locking tendency of the wheels is weakened and an increase in wheel cylinder pressure is desired, the brake fluid accumulated within the reservoir chamber 147 can be pumped up and the wheel cylinder pressure increased by closing the solenoid 143, opening the first and second pressure-increasing control valves 31, 32, closing the first and second pressure-reducing control valves 33, 34, and driving the pump 15.

Furthermore, when the brake fluid within the reservoir 140 has been consumed by the intake of the pump 15 during pressure increase in anti-skid control, brake fluid can be taken in from the first conduit part A1, wheel cylinder pressure can be increased (while preventing generation of reaction force due to the master cylinder pressure) by opening the solenoid 143 and driving the pump 15.

Moreover, when the reservoir 140 is determined to be full due to signals from the stroke sensor 153, the brake fluid accumulated in the reservoir chamber 147 can be pumped up and reservoir capacity ensured by closing the solenoid 143, together with closing the first and second pressure-increasing control valves 31, 32, closing the first and second pressure-reducing control valves 33, 129, and driving the pump 15. As a result, pressure-reducing control utilizing the reservoir chamber 147 can be reliably performed during the subsequent anti-skid control.

In this way, according to this embodiment, opening and closing of the passage extending from the master cylinder 3 to the reservoir 140, i.e., the passage between the first conduit part A1 and the brake fluid intake side of the pump 15, is controlled by the solenoid 143 in accordance with the brake fluid quantity within the reservoir 140. At the same time, the pump 15 is driven as required. Therefore, pressure-reducing control in anti-skid control and pressure-increasing control of wheel cylinder pressure can favorably be performed.

In particular, according to the present embodiment, the passage is opened or closed by the solenoid 143, thereby enabling greater accuracy to be achieved.

Nineteenth Embodiment

Figure 40:
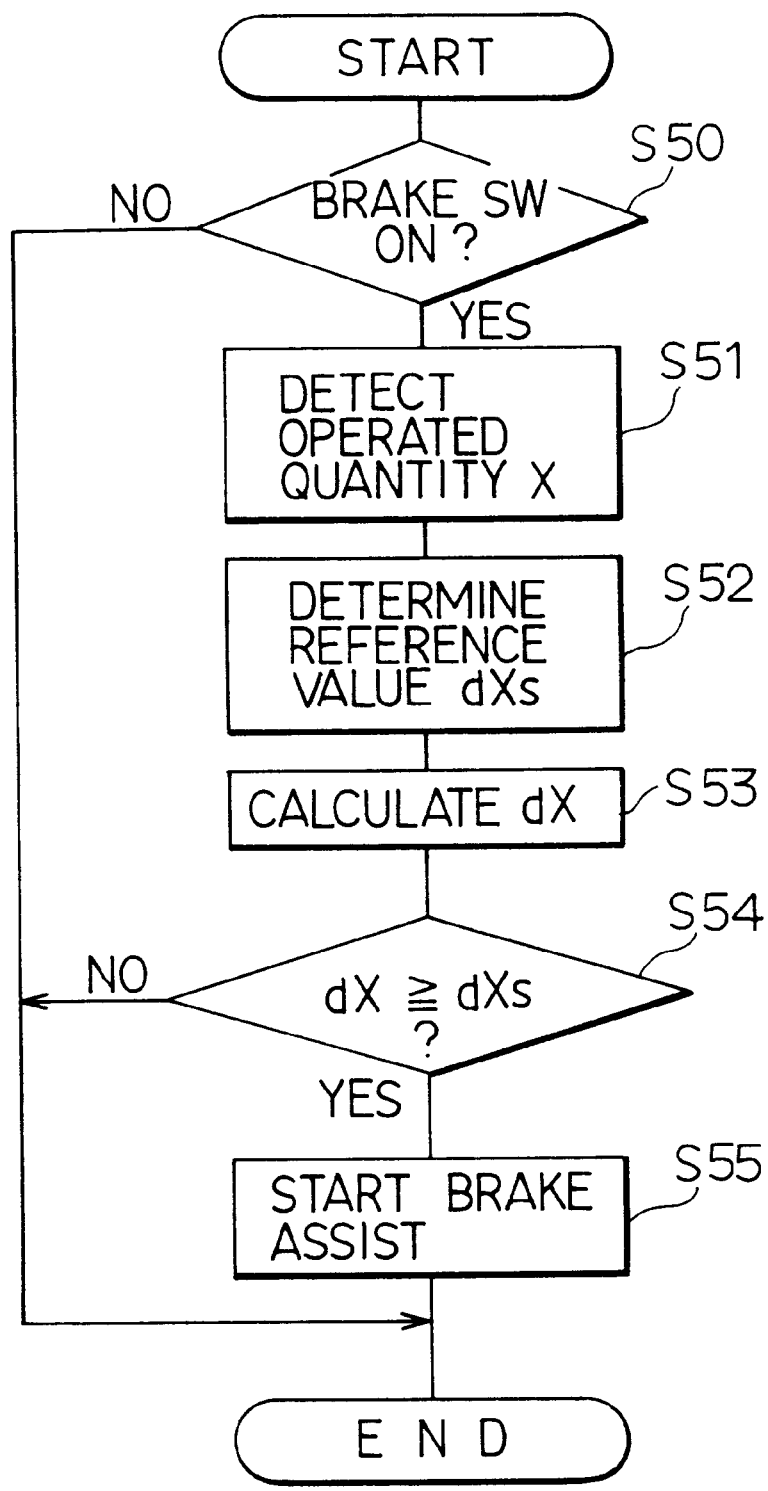
FIG. 40 is a flow diagram indicating control processing of a nineteenth embodiment.

A nineteenth embodiment will be described next with reference to the flow diagram in FIG. 40. An apparatus described in the embodiments above can be utilized for the structure of the brake control apparatus and the structure of the ECU.

At step S50, it is determined whether a brake pedal 1 has been depressed by determining whether a brake switch 113 is on. When the determination herein is affirmative, the processing advances to step S51; when the determination is negative, the processing is terminated.

At step S51, an operated quantity X of the brake pedal 1 is detected based on a signal from a stroke sensor 111. That is to say, the extent to which the brake pedal 1 is depressed is determined.

Figure 41A:
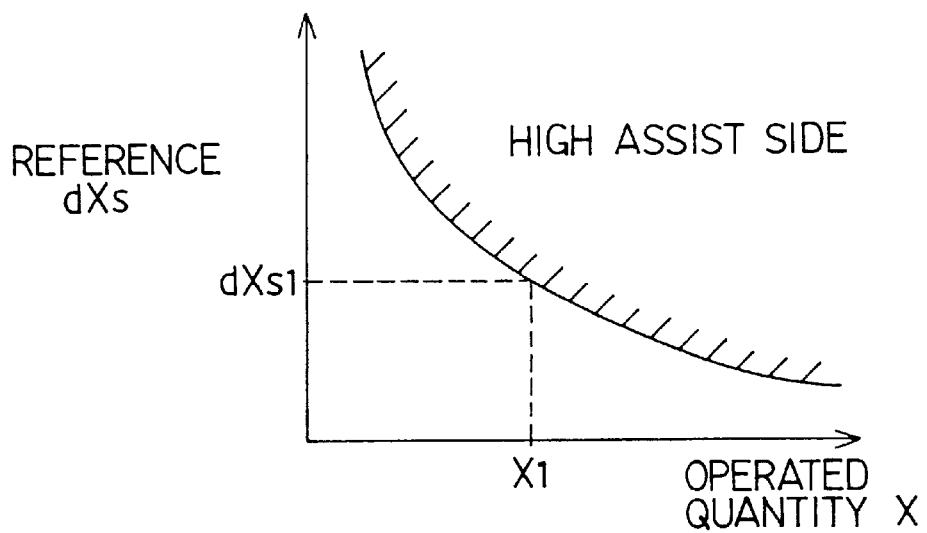
FIGS. 41A and 41B are explanatory diagrams indicating a starting criterion of the nineteenth embodiment.

Next, at step S52, a starting reference value dXs for starting brake assist is varied in accordance with the operated quantity X of the brake pedal 1. In more detail, the operation change-quantity threshold value dXs corresponding to the operated quantity X is determined from a map of the operated quantity X and the operation change-quantity threshold value dXs shown in FIG. 41A. The value is established as the operation change-quantity threshold value dXs.

Next, at step S53, the operated quantity X of the brake pedal 1 is differentiated. An operated-quantity change dX which is the movement speed of the brake pedal 1 is calculated.

Next, at step S54, it is determined whether the operated-quantity change dX of the brake pedal 1 is the operation change-quantity threshold value dXs or more. When an affirmative determination is made herein, the processing advances to step S55; when a negative determination is made, the processing is terminated.

At step S55, the timing for starting brake assist is obtained, and the pump 15 is driven to increase wheel cylinder pressure. As a result, brake assist is started, and processing is terminated.

In this way, according to this embodiment, in an apparatus provided with a power brake composed of a pressure amplifying device 10, the position (operated quantity X) and speed (operated-quantity change dX) of the brake pedal 1 are determined. The operation change-quantity threshold value (starting reference value) dXs for starting brake assist is changed in accordance with this operated quantity X. When the operated-quantity change dX reaches or exceeds the operation change-quantity threshold value dXs, brake assist is started.

Therefore, brake assist can reliably be performed no matter what the state of depression of the brake pedal 1 may be, thereby ensuring sufficient braking force. That is to say, where braking force larger than the braking force during normal braking is requested, such as panic-related sudden braking, large braking force can accurately be ensured.

For example, when the brake pedal 1 is depressed further from an initial state where it is depressed to a certain extent, the starting reference value dXs for brake assist is not reached because the operated speed of the brake pedal 1 does not increase. Thus, brake assist is not initiated. However, according to this embodiment, the starting reference value dxs for brake asvart is varied (i.e., is reduced) in accordance with a state wherein the brake pedal 1 has been depressed to a certain extent. Therefore, in a case of further depression, the pump 15 is promptly driven, and brake assist can be started.

Figure 41B:
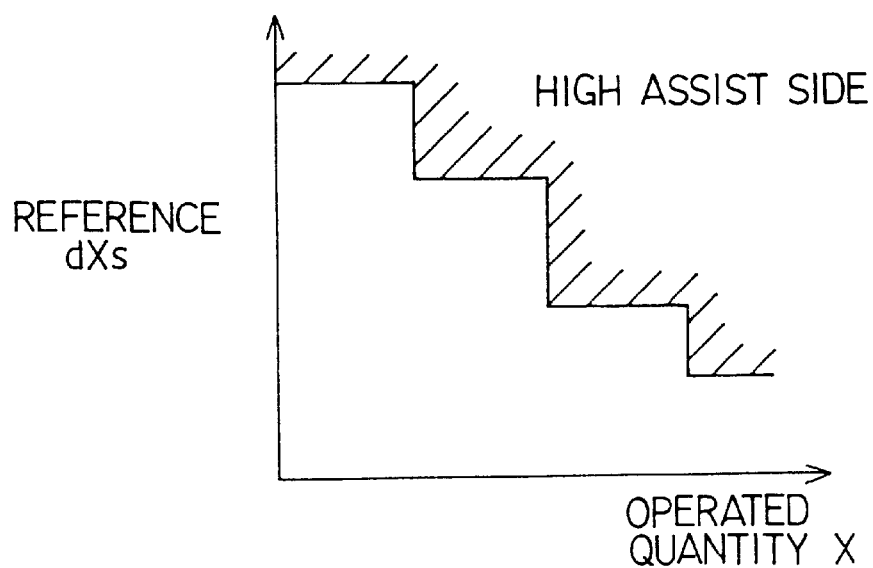

A stepped map, for example, as shown in FIG. 41B, can be utilized as the map for changing this starting reference value dXs. In this case, only a small memory region in the ROM 12b is required.

The assisting force of the brake assist having been started may be uniform. Alternatively, the assisting force may be changed in accordance with the operated quantity X of the brake pedal 1 (for example, when the operated quantity X has surpassed a predetermined value). In this case, favorable braking performance can be obtained even with respect to sudden brake operation during gentle braking.

EXPERIMENTAL EXAMPLES

An experimental example carried out to confirm the effects of this embodiment will be described next.

In this experiment, the several relationships of pedal speed, depression-force gradient, and rising-pressure gradient with respect to before-depression hydraulic pressure of the master cylinder before the brake pedal is further depressed are respectively determined when the driver has calmly depressed the brake, as during normal operation, and when the brake is pressed forcefully during a time of panic. The results of the experiment are indicated in FIGS. 42A to 42C. The relationships indicated by lines X1, X2, and X3 (boundary lines between a time of panic and a normal time) exist between the pedal speed and the before-depression hydraulic pressure of the master cylinder.

As is obvious from these figures, when before-depression hydraulic pressure of the master cylinder is low, i.e., when the brake pedal 1 has not been depressed to a great extent, large pedal speed appears when the pedal 1 is further depressed. Accordingly, brake assist can be started at an appropriate time even when the starting reference value dXs for brake assist is fixed.

However, when the before-depression hydraulic pressure is high, i.e., when the brake pedal 1 has been depressed to a certain extent, large pedal speed does not appear even when the pedal 1 is further depressed. Therefore, brake assist cannot be started at an appropriate time when the starting reference value dXs for brake assist is fixed.

In contrast thereto, according to this embodiment, the starting reference value dXs for brake assist is varied in accordance with the operated quantity X of the brake pedal 1. In more detail, the starting reference value dXs is varied to hasten the initiation of brake assist when the operated quantity X of the brake pedal 1 is large. Consequently, brake assist can be o appropriately initiated. Accordingly, large braking force can be ensured even when, for example, the brake pedal 1 is depressed further from a half-depressed state due to, for example, a panic situation.

Twentieth Embodiment

A twentieth embodiment will be described next. With this embodiment as well, devices described in the embodiments above can be utilized for the structure of the brake apparatus and the structure of the ECU.

Figure 43:
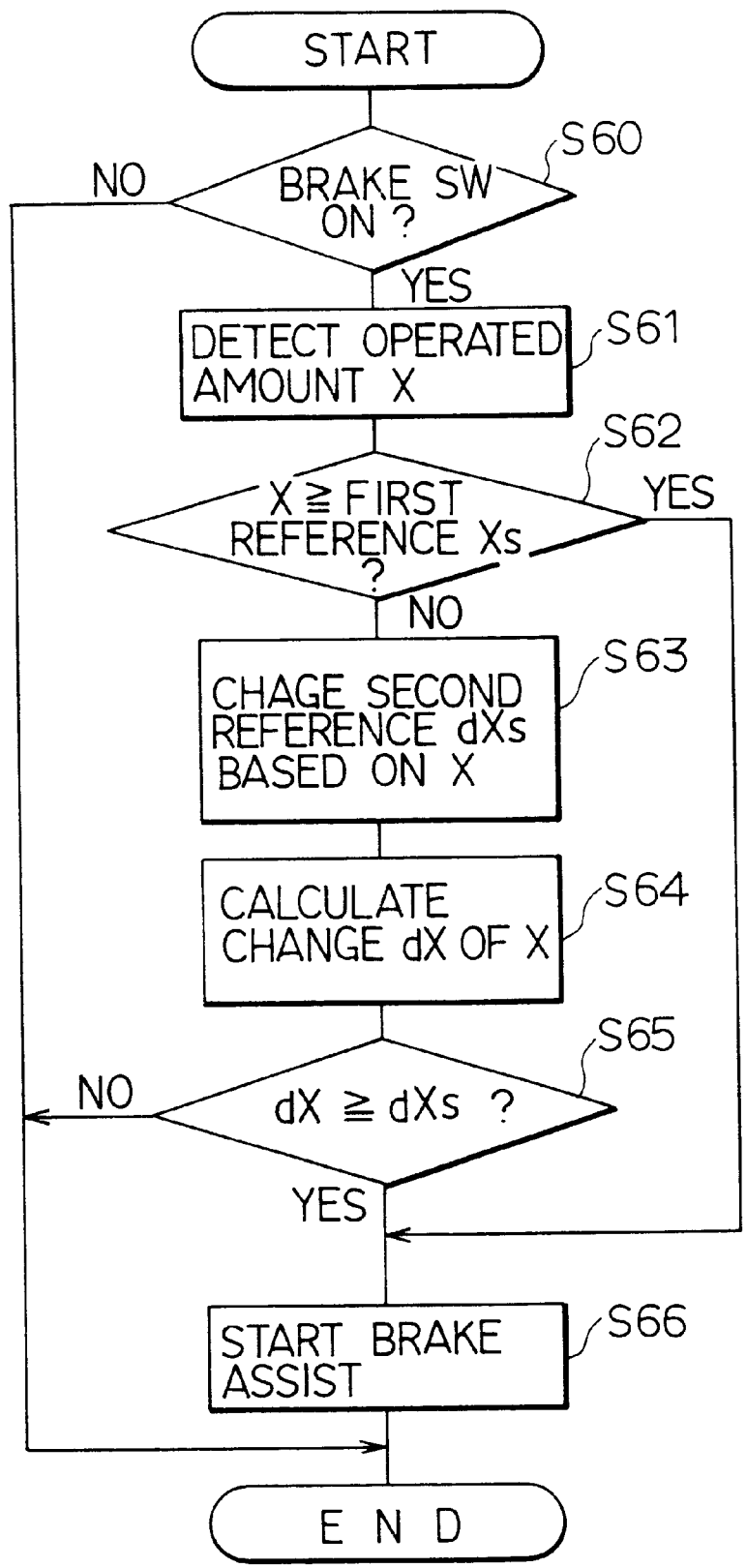
FIG. 43 is a flow diagram indicating control processing of a twentieth embodiment.

As indicated in the flow diagram in FIG. 43, according to this embodiment, first, at step S60, it is determined whether a brake switch 113 is on. When the determination herein is affirmative, the processing advances to step S61; when the determination is negative, the processing is terminated. At step S61, an operated quantity X of the brake pedal 1 is detected.

Figure 44:
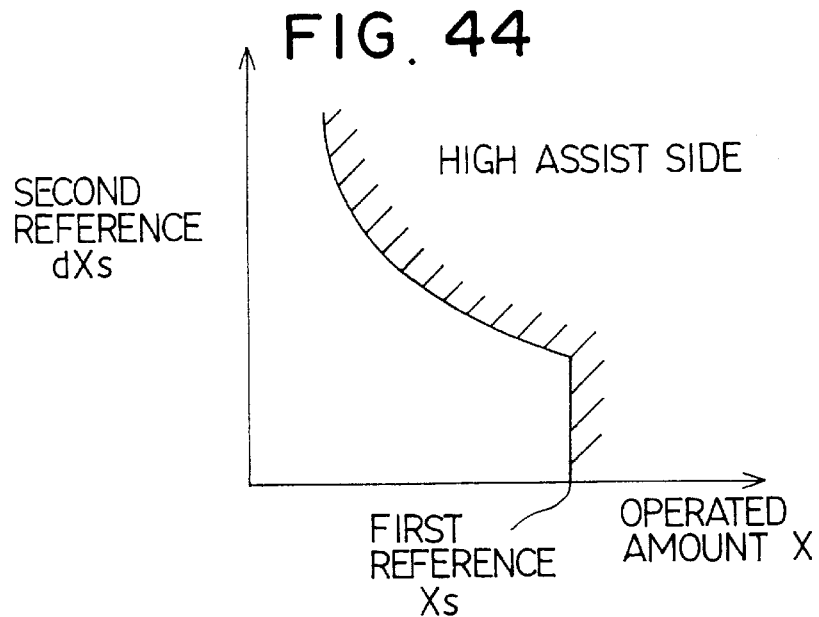
FIG. 44 is an explanatory diagram indicating a starting criterion of the twentieth embodiment.

At step S62, it is determined whether an operated quantity X of the brake pedal 1 is at or above a predetermined operated-quantity threshold value Xs. In more detail, as shown in FIG. 44, it is determined whether an operated quantity X has reached operated-quantity threshold value Xs. When an affirmative determination is made herein, the processing advances to step S63; when a negative determination is made, the processing advances to step S66.

At step S63, a second starting reference value dXs for starting brake assist is varied in accordance with the operated quantity X of the brake pedal 1. In more detail, an operation change-quantity threshold value dXs is determined in accordance with the operated quantity X from a map of the operation change-quantity threshold value dXs and the operated quantity X as shown in the FIG. 44. This second starting reference value dXs is established as the operation change-quantity threshold value dXs for starting brake assist.

Next, at step S64, the operated quantity X of the brake pedal 1 is differentiated, and operated-quantity change dX, which is the operated speed of the brake pedal 1, is calculated.

Next, at step S65, it is determined whether the operated-quantity change dX of the brake pedal 1 is greater than or equal to the operation change-quantity threshold value dXs. When an affirmative determination is made herein, the processing advances to step S66; when a negative determination is made, the processing is terminated.

At step S66, the timing for starting brake assist is obtained, and so a pump 15 is driven to increase wheel cylinder pressure. As a result, brake assist is started, and the processing is terminated.

In this way, according to this embodiment, in an apparatus provided with a power brake composed of a pressure amplifying device 10, brake assist is started when the operated quantity X (the position of the brake pedal 1) is at or above the operated-quantity threshold value Xs for starting brake assist. In addition, the operated speed of the brake pedal 1 is determined, and the operation change-quantity threshold value dXs for starting brake assist is changed in accordance with the operated quantity X. When the operated-quantity change dX is greater than or equal to this operation change-quantity threshold value dxs, brake assist is initiated.

Therefore, brake assist can reliably be performed no matter what the state of depression of the brake pedal 1 may be. As a result, sufficient braking force can be ensured, similarly to the foregoing nineteenth embodiment. Further, power assist is performed when the brake pedal 1 has been depressed by a predetermined quantity or more. Thus, computational processing is also reduced.

Twenty-First Embodiment

A twenty-first embodiment will be described next.

According to this embodiment in particular, a G sensor is utilized to detect deceleration of the vehicle body, and a starting reference value for execution ("on") or stopping ("off") of power assist is varied in accordance with output therefrom.

Figure 45:
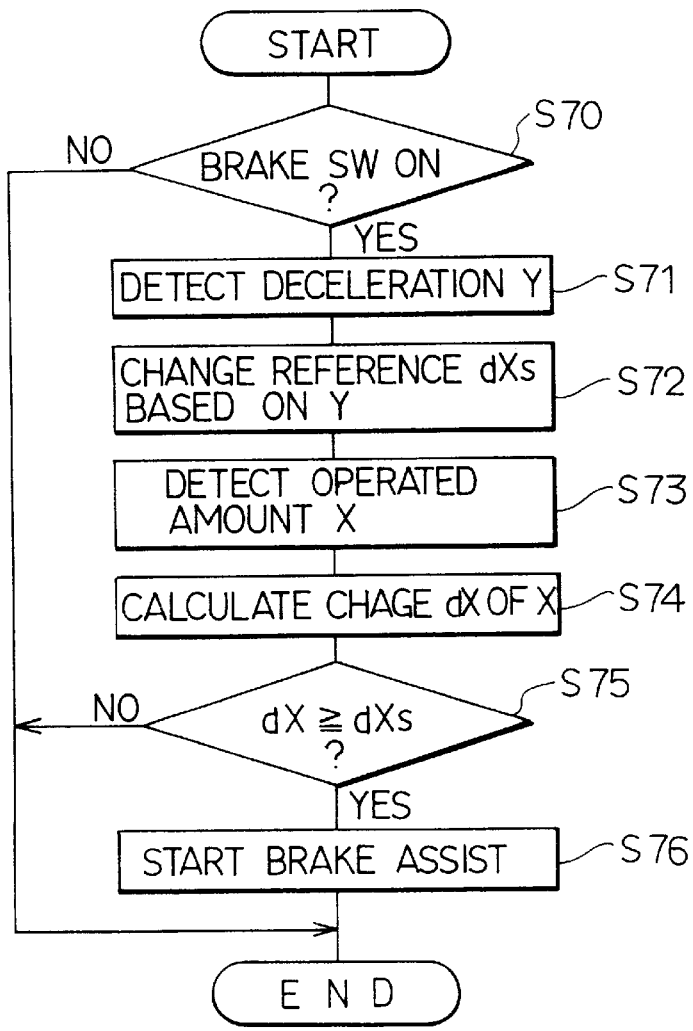
FIG. 45 is a flow diagram indicating control processing of a twenty-first embodiment.

As indicated in the flow diagram in FIG. 45, according to this embodiment, first, at step S70, it is determined whether a brake switch 113 is on. When the determination herein is affirmative, the processing advances to step S71; when the determination is negative, the processing is terminated.

At step S71, body deceleration Y is detected on a basis of a signal from the G sensor.

Next, at step S72, starting reference value dXs for starting brake assist is varied in accordance with the body deceleration.

At step S73, operated quantity X of the brake pedal 1 is detected, and at step S74, the operated quantity X of the brake pedal 1 is differentiated. That is, operated-quantity change dX, which is the movement speed of the brake pedal 1, is calculated.

Next, at step S75, it is determined whether the operated-quantity change dX of the brake pedal 1 is greater than or equal to the foregoing operation change-quantity threshold value dXs. When an affirmative determination is made herein, the processing advances to step S76; when a negative determination is made, the processing is terminated.

At step S76, the timing for starting brake assist is obtained, and so a pump 15 is driven to increase wheel cylinder pressure. As a result, brake assist is started, and the processing is terminated.

In this way, according to this embodiment, in an apparatus provided with a power brake composed of a pressure amplifying device 10, the body deceleration Y is determined and the operation change-quantity threshold value dXs for starting brake assist is changed in accordance with this body deceleration Y. When the operated-quantity change dX of the brake pedal 1 is greater than or equal to the operation change-quantity threshold value dXs, brake assist is initiated.

Consequently, brake assist can reliably be performed when deceleration G of a predetermined value or more has occurred, such as when the brake has suddenly been depressed during panic, and so sufficient braking force can be ensured.

Further, according to this embodiment, the body deceleration Y is determined by a G sensor, but estimated body speed and estimated body deceleration may be determined according to a known method from wheel speed determined by, for example, a wheel-speed sensor.

Twenty-Second Embodiment

A twenty-second embodiment will be described next with reference to the flow diagram in FIG. 46.

Devices described in the embodiments above can be utilized for the structure of the brake apparatus or the structure of the ECU. Additionally, a booster 2 is utilized as a first amplifying device, and a pressure amplifying device 10 is utilized as a second amplifying device.

Figure 46:
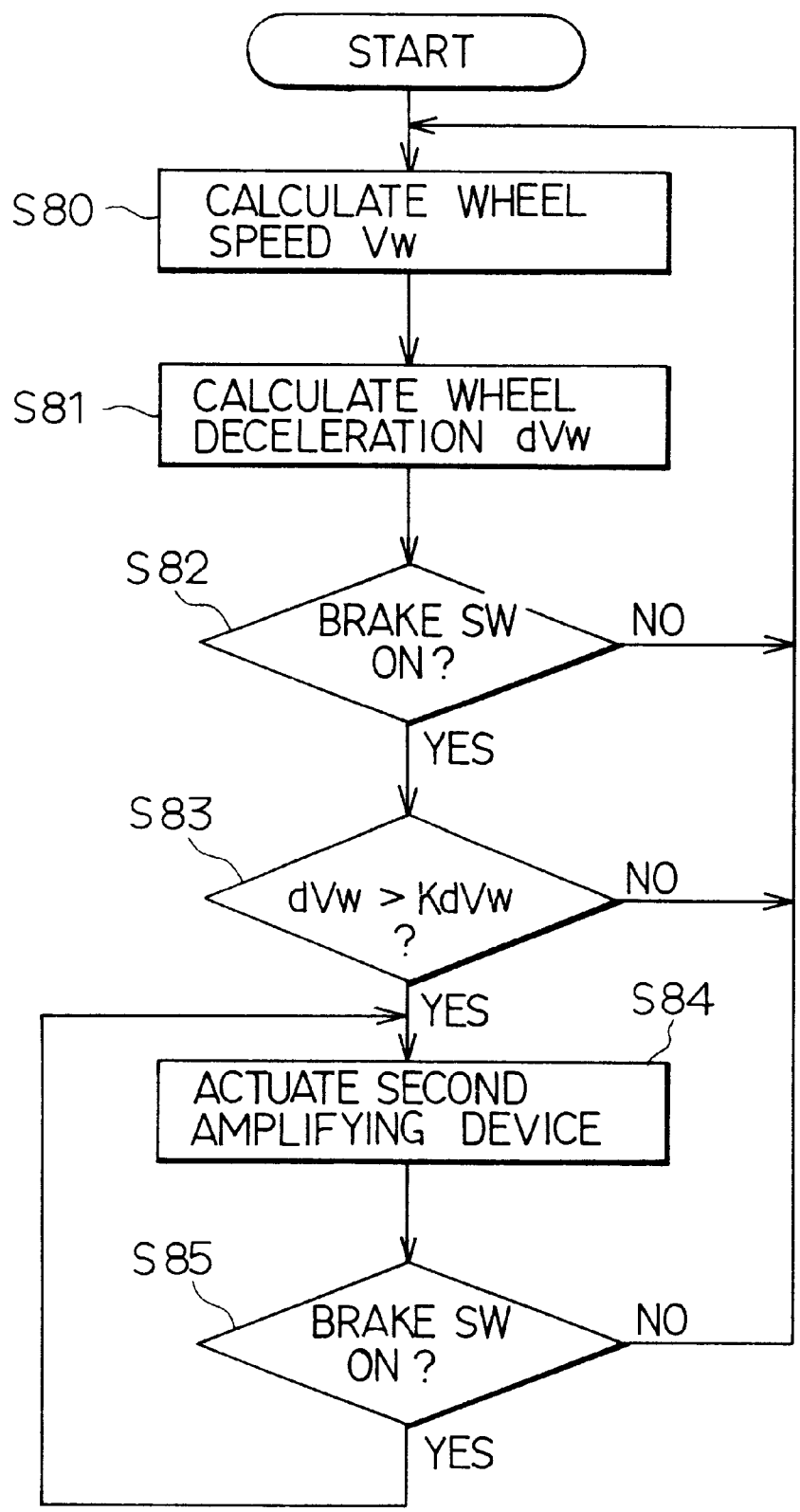
FIG. 46 is a flow diagram indicating control processing of a twenty-second embodiment.

The flow diagram indicated in FIG. 46 is executed by an electronic control unit 12 when a driver switches on an ignition switch. At step S80, wheel speed VW of several wheels is calculated based on output from a wheel-speed sensor (not illustrated). Next, at step S81, wheel deceleration dVW is calculated based on the wheel speed VW.

At step S82, it is determined whether a brake switch 113 is in an "on" state, i.e., whether a brake pedal 1 has been depressed by a predetermined amount or more and the vehicle is in a braking state. The processing advances to step S83 when the brake switch 113 is on. In contrast, the processing is repeated from step S80 when the brake switch 113 is determined not to be on.

At step S83, it is determined whether the wheel deceleration dVW calculated at step S81 is greater than a predetermined deceleration KdVW. This predetermined deceleration KdVW may be established based on wheel deceleration occurring at the several wheels when sudden braking is performed on a traveling surface having an intermediate friction coefficient or more, such as an asphalt road in rainy weather. When an affirmative determination is made at step S83, the above-mentioned second amplifying device is executed at the subsequent step S84. This case represents sudden braking of the vehicle on a traveling surface of a predetermined travel surface. Comparison of the predetermined deceleration KdVW with the wheel deceleration dvW may be performed for solely one wheel, or all wheels may be the subject of comparison. When the wheel deceleration dVW of at least one wheel is greater than the predetermined deceleration KdVW, the second amplifying device may be executed for a predetermined time.

After the second amplifying device is executed for the predetermined time at step S84, the processing advances to step S85, and it is determined whether the brake switch 113 is in an "on" state. When the brake switch 113 is herein in an "off" state, the braking state of the vehicle is considered to have ended, the second amplifying device is terminated, and the processing returns to step S80. When the brake switch 113 is in an "on" state, the processing returns to step S84, and the second amplifying device continues to be executed.

The relationship of operating force with respect to the brake pedal 1, and wheel cylinder pressure PL when such processing has been executed, will be described hereinafter with reference to FIGS. 47A and 47B.

Line S1 in FIG. 47A indicates wheel cylinder pressure PL applied to respective wheel cylinders 4, 5 when boosting action by a brake booster 2 and amplifying action by the second amplifying device are not performed when the driver operates the brake pedal 1. The brake control apparatus for a vehicle having the brake booster 2 has a characteristic shown by line S2 above at least line S1 due to the boosting action of the brake booster 2. When the second amplifying device is not executed, the wheel cylinder pressure PL and the master cylinder pressure PU are shifted as shown by the double-dotted broken line BB, due to the boosting action of the brake booster 2. However, in FIG. 47A, a proportioning valve 6 disposed with respect to the wheel cylinder 5 of the rear-wheel side is eliminated, and wheel cylinder pressure PL is considered to be the brake fluid pressure applied to both the wheel cylinders 4, 5.

Next, observation of change in wheel cylinder pressure PL over time reveals that a characteristic indicated by line S2 due to the boosting action of the brake booster 2 is obtained prior to the wheel deceleration dVW becoming greater than the predetermined deceleration KdVW, at time t1 after the brake pedal 1 is depressed. Additionally, when the second pressure amplifying device is executed when the wheel deceleration dvW reaches the predetermined deceleration KdVW at time t1, the pump 15 takes in brake fluid from a first conduit part A1 and discharges the brake fluid to a second conduit part A2. That is to say, brake fluid having the master cylinder pressure PU in the first conduit part A1 is moved to the second conduit part A2, and the brake fluid pressure at the second conduit part A2 is increased to the second brake fluid pressure. Because the brake fluid quantity at the first conduit part A1 is reduced at this time, reaction force conveyed to the driver from the brake pedal 1 when the driver has depressed the brake pedal 1 is decreased. In other words, the load on the driver is lessened as the depression stroke of the brake pedal 1 is maintained.

Additionally, because brake fluid is discharged to the second conduit part A2 by the pump 15, the brake fluid pressure within the second conduit part A2 is increased to the second brake fluid pressure, and wheel cylinder pressure PL is increased as indicated by line S3 in FIG. 47A. That is to say, the slope of the wheel cylinder pressure PL with respect to the operating force F with which the driver operates the brake pedal 1 is increased at line S3 from time t1. The slope indicated by this line S3 is established by the attenuation ratio of the proportioning control valve 13, i.e., by the attenuation ratio of brake fluid pressure during the flow of brake fluid from the second conduit part A2 to the first conduit part A1. In this way, the amplifying action of the brake pedal operating force due to the booster 2 corresponding to the first amplifying device is performed within a low braking force region of wheel braking force, and the amplifying action due to the pressure amplifying device 10 corresponding to the second amplifying device is performed within a high braking force region.

In this way, according to this embodiment, greater wheel braking force can be obtained by determining from wheel deceleration, for example, a circumstance wherein greater braking force is required, and by activating the second pressure amplifying device in addition to the booster 2. That is to say, when a booster 2 not having an extremely large boosting action is utilized for normal braking, normal braking can be smoothly performed in accordance with the feeling of the driver. The pressure amplifying device 10 can be activated as the second amplifying device when the vehicle is suddenly braked. Additionally, because amplification of brake fluid pressure is executed by the pressure amplifying device 10, it is possible also to utilize a brake booster 2 wherein a first chamber and a second chamber are small and do not provide an extremely large boosting action.

Because the proportioning control valve 13 connected in reverse is utilized as a holding device to maintain the differential pressure between the first conduit part A1 and the second conduit part A2 in the pressure amplifying device 10, according to this embodiment, the pressure amplifying device 10 can be activated at a suitable timing, without the need for additional sensors other than the wheel-speed sensor already utilized in ABS. Brake fluid pressure does not remain in the wheel cylinders 4, 5 and no brake pull-up occurs due to mechanical action of the proportioning control valve 13 when the depression of the brake pedal has been released and the master cylinder pressure has declined. Additionally, when a split-point pressure and an attenuation ratio are mechanically established in the proportioning control valve 13, wheel braking force is increased in accordance with these settings when the pump 15 is uniformly driven and the pressure amplifying device 10 operates.

Twenty-Third Embodiment

Figure 49:
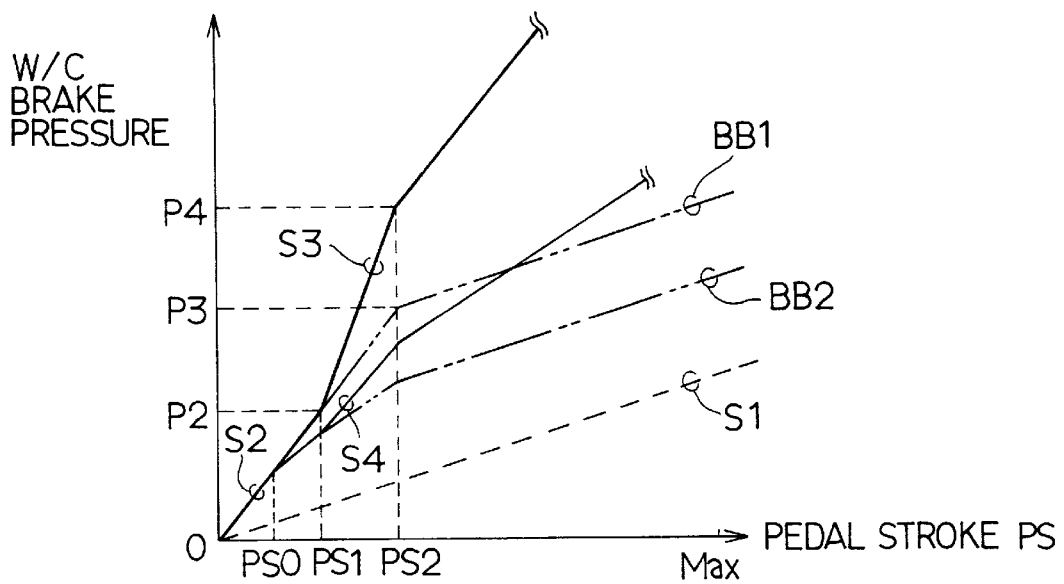
FIG. 49 is a characteristic diagram indicating a mode of operation of the twenty-third embodiment.

A twenty-third embodiment will be described next with reference to FIG. 48 and FIG. 49.

In braking control according to the embodiment described above, the second amplifying device is executed based on wheel deceleration dVW corresponding to wheel behavior depending on a road-surface state. According to the twenty-third embodiment, however, the second amplifying device, i.e., a pressure amplifying device 10, is initiated based on pedal stroke PS of a brake pedal 1 when operated by a driver.

Referring to FIG. 48, subsequent to the switching of an ignition switch to an "on" position, at step S90, pedal stroke PS is detected based on a signal from a stroke sensor 111. Next, at step S91, this pedal stroke PS and a predetermined value KPS are compared. This predetermined value KPS may be established in light of pedal stoke, for example, when the driver depresses the brake pedal 1 to stop the vehicle suddenly during vehicle travel at a body speed of a predetermined value or more. Herein, the processing advances to step S92 when the pedal stroke PS has been determined to be larger than the predetermined value KPS, and is returned to step S90 when a negative determination has been made. Because the pedal stroke PS is less than the predetermined value KPS during non-depression of the brake pedal 1, the processing is returned to step S90.

At step S92, because the amount of pedal depression by the driver, i.e., the pedal stroke PS, is greater than the predetermined value KPS, a situation wherein rapid stopping of the vehicle is desired is presumed to exist. Therefore, the second amplifying device is activated.

Effects will be described next with reference to FIG. 49. When the brake pedal 1 is depressed further from a time when the pedal stroke PS is 0, the master cylinder pressure PU becomes P2 due to the action of the brake booster 2 until the pedal stroke PS becomes PS1. The brake fluid pressure applied to the wheel cylinder 4 on the front-wheel side also reaches a pressure similar to the master cylinder pressure PU, and is maintained as indicated by line S2. The brake fluid pressure applied to the wheel cylinder 5 on the rear-wheel side is reduced by a predetermined attenuation ratio to a pressure lower than the master cylinder pressure PU due to a known action of a proportioning control valve 6 connected in the normal direction within the conduit. The brake fluid pressure of the wheel cylinder 5 on the rear-wheel side becomes a pressure that is reduced compared with line S2 in correspondence with the pedal stroke PS at which master cylinder pressure PU not less than the split-point pressure of the proportioning control valve 6 is generated.

When the pedal stroke becomes larger than PS1 (equal to KPS), due to the pressure amplifying device 10, the brake fluid pressure applied to the wheel cylinder 4 on the front-wheel side is amplified as indicated by line S3. This amplification is large when compared with line BB1 indicating the brake fluid pressure applied to the wheel cylinder 4 on the front-wheel side due to the boosting action of the booster 2. The brake fluid pressure applied to the wheel cylinder 4 can reach a pressure P4 larger than pressure P3, which is the limit of wheel cylinder pressure which can be generated with pedal stroke PS2 by the booster 2. Additionally, the brake fluid pressure applied to the wheel cylinder 5 on the rear-wheel side also is amplified as indicated by line S4. This amplification is large when compared with line BB2, which indicates the brake fluid applied to the wheel cylinder 5 amplified only by the boosting action of the booster 2. In this way, when the pressure amplifying device 10 is activated, a pressure-increasing gradient larger than the pressure-increasing gradient of the wheel cylinder pressure due to the booster 2 is produced. As a result, vehicle braking force is obtained when the pedal stroke PS is greater than a predetermined value. Operation due to the pressure amplifying device 10 similar to those of the embodiments described above are demonstrated.

Even when the brake booster 2, having a boosting rate which is so small that the boosting effect is substantially eliminated at the pedal stroke PS2, is utilized, the brake fluid pressure applied to the wheel cylinders 4, 5 can be gradually increased by the second amplifying device. Furthermore, because the second amplifying device is executed by movement of brake fluid by the pump 15 and by the proportioning control valve 13 connected in reverse, the brake fluid pressure applied to the wheel cylinders 4, 5 can be gradually increased due to a mechanical aperture effect in the proportioning control valve 13, even when the pedal stroke has substantially been stopped at PS1 or PS2.

Twenty-Fourth Embodiment

Figure 50:
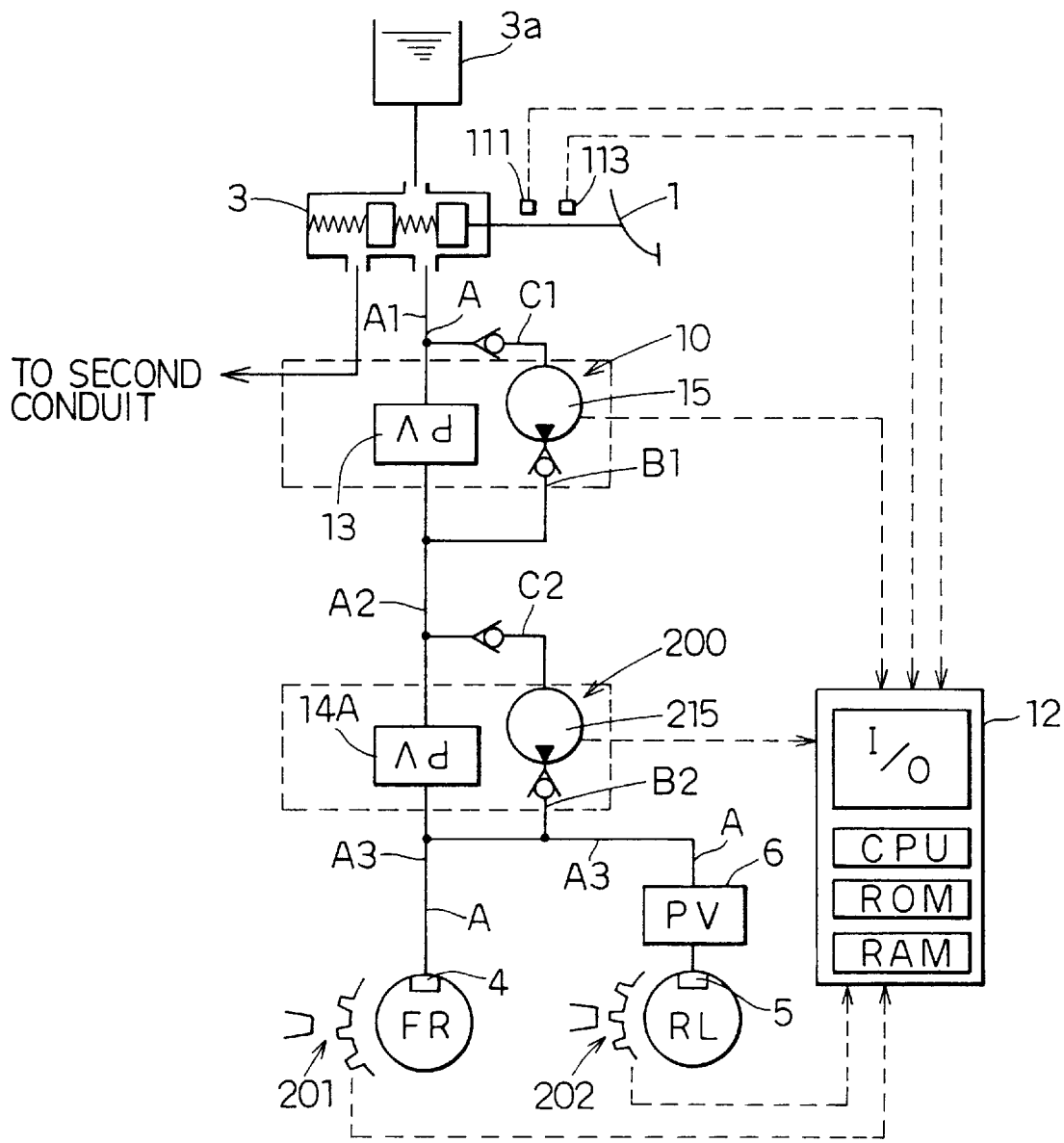
FIG. 50 is a structural view indicating a structure of a brake control apparatus according to a twenty-fourth embodiment.

A twenty-fourth embodiment of this invention will be described next with reference to FIG. 50. Detailed description regarding structure exhibiting a mode of operation similar to the structure of the embodiments described above will be simplified or omitted.

In the twenty-fourth embodiment, the booster 2 comprising the first amplifying device in the above-described embodiments is eliminated, and structure of a pressure amplifying device 10 corresponding to the second amplifying device in the foregoing embodiment is disposed in series in a first conduit A.

The first conduit A extends from a master cylinder 3, and is connected respectively to a wheel cylinder 4 of a front-right wheel FR and a wheel cylinder 5 of a rear-left wheel RL. Accordingly, a first proportioning control valve 13 connected in a reverse direction and a first pump 15 connected in parallel to the first proportioning control valve 13 are disposed as a first amplifying device 10 in this first conduit A. A second amplifying device 200 is disposed in the first conduit A between the first pressure amplifying device 10 and a branch to the respective wheel cylinders 4, 5. This second amplifying device 200 also is made up of a reverse-connected second proportioning control valve 14A and a second pump 215, as in the first amplifying device 10.

The first conduit A is separated into a first conduit part A1, a second conduit part A2, and a third conduit part A3 by the first and second amplifying devices 10 and 200. That is to say, the first conduit A is separated into the first conduit part A1 in an interval from the master cylinder 3 to the first amplifying device 10, the second conduit part A2 in an interval from the first amplifying device 10 to the second amplifying device 200, and the third conduit part A3 in an interval from the second amplifying device 200 to the respective wheel cylinders 4, 5. An intake port of the first pump 15 is connected to a first intake conduit C1 connected to the first conduit part A1, and a discharge port of the first pump 15 is connected to a first discharge conduit B1 connected to the second conduit part A2. Similarly, an intake port of the second pump 215 is connected to a second intake conduit C2 connected to the second conduit part A2, and a discharge port of the second pump 215 is connected to a second discharge conduit B2 connected to the third conduit part A3.

In the brake control apparatus structured in this way, when the brake pedal 1 is depressed and the first amplifying device 10 and the second amplifying device 200 are not actuated, brake fluid having master cylinder pressure PU generated in accordance with depression force applied to the brake pedal 1 passes through the first and second proportioning control valves 13 and 14A with no attenuation of pressure. Accordingly, the master cylinder pressure PU is conveyed to the wheel cylinders 4, 5.

Figure 51:
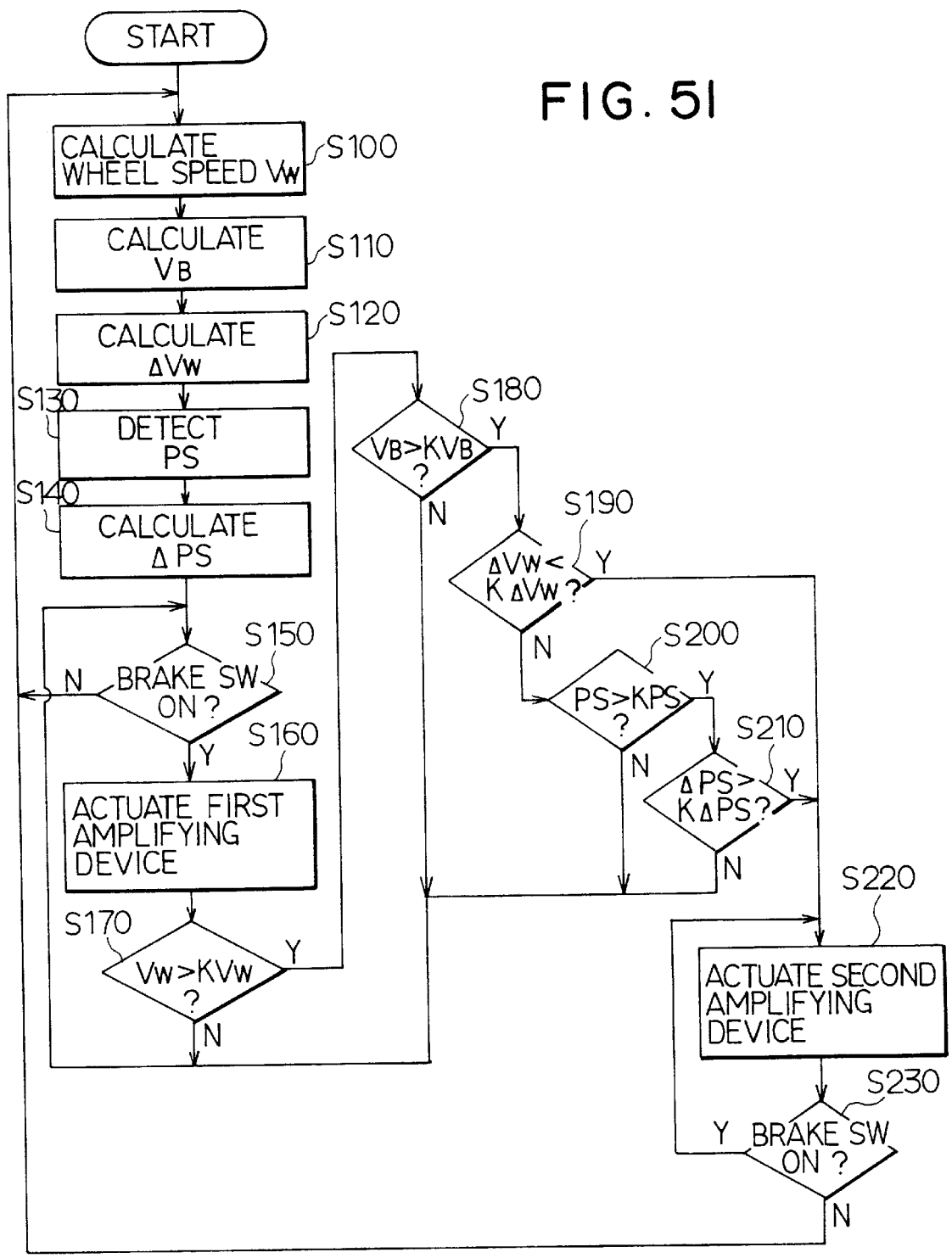
FIG. 51 is a flow diagram according to the twenty-fourth embodiment.

A mode of operation according to the twenty-fourth embodiment will be described hereinafter with reference to FIG. 51.

Subsequent to an ignition switch being turned to an "on" position at step S100, wheel speed VW is calculated based on output signals from wheel-speed sensors 201, 202. Subsequently, at step S100, body speed VB is computed. In this case, the body speed VB may be computed based on wheel speed VW of a driven wheel, or alternatively based on an integrated output value of a body-acceleration sensor (not illustrated). At step S120, wheel acceleration dVW of the wheel is computed. Wheel speed VW may be calculated with respect to each of the several wheels.

At step S130, pedal stroke PS is detected and computed based on output from a stroke sensor 111. At step S140, the change dPS in pedal stroke per unit of time is computed.

At step S150, to detect whether the wheels are in a braking state, it is detected whether a brake switch 113 is in an "on" state. When the brake switch 113 is not in an "on" state and the wheels are not in a braking state, processing is returned to step S100. When the brake switch 113 is in an "on" state, the processing advances to step S160.

At step S160, the first amplifying device 10 is actuated. That is to say, brake fluid is moved by driving first pump 15, taking in brake fluid from the first conduit part A1, and discharging the brake fluid to the second conduit part A2. In accordance therewith, the brake fluid pressure of the second conduit part A2 and the third conduit part A3 is increased, and the pressure applied to the wheel cylinders 4, 5 is increased in comparison with the master cylinder pressure PU, and becomes a second brake fluid pressure.

When the reverse-connected first proportioning control valve 13 causes brake fluid to flow from the side of the second and third conduit parts A2, A3 to the first conduit part A1 side, the brake fluid pressure is reduced by a predetermined attenuation ratio set to the first proportioning control valve 13, and flow of the brake fluid occurs. Accordingly, the brake fluid pressure of the second and third conduit parts A2, A3 is maintained unless the master cylinder pressure is greatly reduced. When the brake pedal 1 is gradually depressed, the flow of brake fluid from the second conduit part A2 side to the first conduit part A1 side is substantially nil. Brake fluid pressure of the second and third conduit parts A2, A3 is amplified at a predetermined pressure ratio accompanying the increase in the brake fluid pressure of the first conduit part A1 and the movement of brake fluid from the first conduit part A1 to the second conduit part A2 due to the pump 15.

At step S170, the wheel speed VW and a predetermined value KVW are compared. The processing advances to step S180 when the wheel speed VW is greater than the predetermined value KVW, or is returned to step S150 in a case of negative determination. At step S180, the body speed VB and a predetermined value KVB are compared. Processing advances to step S190 when the body speed VB is determined to be greater than the predetermined value KVB, or is returned to step S150 when a negative determination is made. Herein, the predetermined value KVW and the predetermined value KVB are established at values whereat it can be determined that vehicle braking exists from a state of vehicle travel at a certain degree of high speed.

For example, the predetermined value KVB may be established at a speed of approximately 80 km/h, and the predetermined value KVW may be established at a speed of approximately 85 km/h in consideration of wheel slippage during vehicle travel. At step S190, it is determined whether the wheel acceleration dVW is smaller than the predetermined value KdVW. This predetermined value KdVW is established with an aim toward a value generated as wheel behavior when, for example, the driver has requested a certain degree of sudden braking. When an affirmative determination is made at step S190, a state of a certain degree of sudden vehicle stoppage from a predetermined vehicle speed is presumed, and the processing advances to step 220, where the second amplifying device 200 is actuated. That is to say, the second pump 215 is driven, and brake fluid in the second conduit part A2 having brake fluid pressure amplified by the first amplifying device 10 is taken in and discharged to the third conduit part A3 by the second pump 215. The brake fluid pressure of the third conduit part A3 is increased with respect to the brake fluid of the second conduit part A2, which is higher than the master cylinder pressure PU.

Accordingly, this increased third brake fluid pressure is maintained by the reverse-connected second proportioning control valve 14A, similarly to the mode of operation of the first proportioning control valve 13. Accordingly, the third brake fluid pressure amplified in two stages by the first and second amplifying devices 10, 200 is applied to the wheel cylinder 4. Similarly, brake fluid pressure based on the third brake fluid pressure (i.e., pressure attenuated by a proportioning valve 6) amplified in two stages by the first and second amplifying devices 10, 200 is applied to the wheel cylinder 5. As a result, the respective wheels FR and RL demonstrate high wheel braking force in accordance with the brake fluid pressure amplified in two stages in comparison with the master cylinder pressure PU.

In a case of a negative determination at step S190, the processing advances to step S200. At step S200, it is determined whether pedal stroke PS is greater than a predetermined value KPS. When a negative determination is made herein, the processing is returned to step S150; when an affirmative determination is made, the processing advances to step S210. At step S210, it is determined whether the change dPS in pedal stroke per unit time is greater than a predetermined value KdPS. When a negative determination is made herein, the processing returns to step S150, and vehicle braking is continued solely with actuation of the first amplifying device 10 until the vehicle is stopped.

When an affirmative determination is made at step S210, it is determined from wheel behavior that the braking state is not so sudden. However, it can be determined to be a sudden-braking state from the state of depression of the pedal 1 by the driver, and at step S220 the second amplifying device 200 is actuated.

When a predetermined time has elapsed during actuation of the second amplifying device 200, the processing advances to step S230, and it is determined whether the brake switch 113 is in an "on" state. That is to say, because the second amplifying device 200 is actuated in addition to the first amplifying device 10 until the vehicle is stopped or the vehicle braking state is released, large vehicle braking force can be generated, and distance traveled by the vehicle until stopped can be shortened.

Additionally, because the first amplifying device 10 and the second amplifying device 200 have been disposed in series in the conduit extending from the master cylinder 3 to the wheel cylinders 4, 5, the pressure amplifying action in the first amplifying device 10 can be established to be small. Thus, there is no need for the pump 15 to have a high capacity. Furthermore, because first-stage pressure amplification is performed by the first amplifying device 10, there similarly is no need for a high capacity second pump 215 in the second amplifying device 200.

Twenty-Fifth Embodiment

Figure 53:
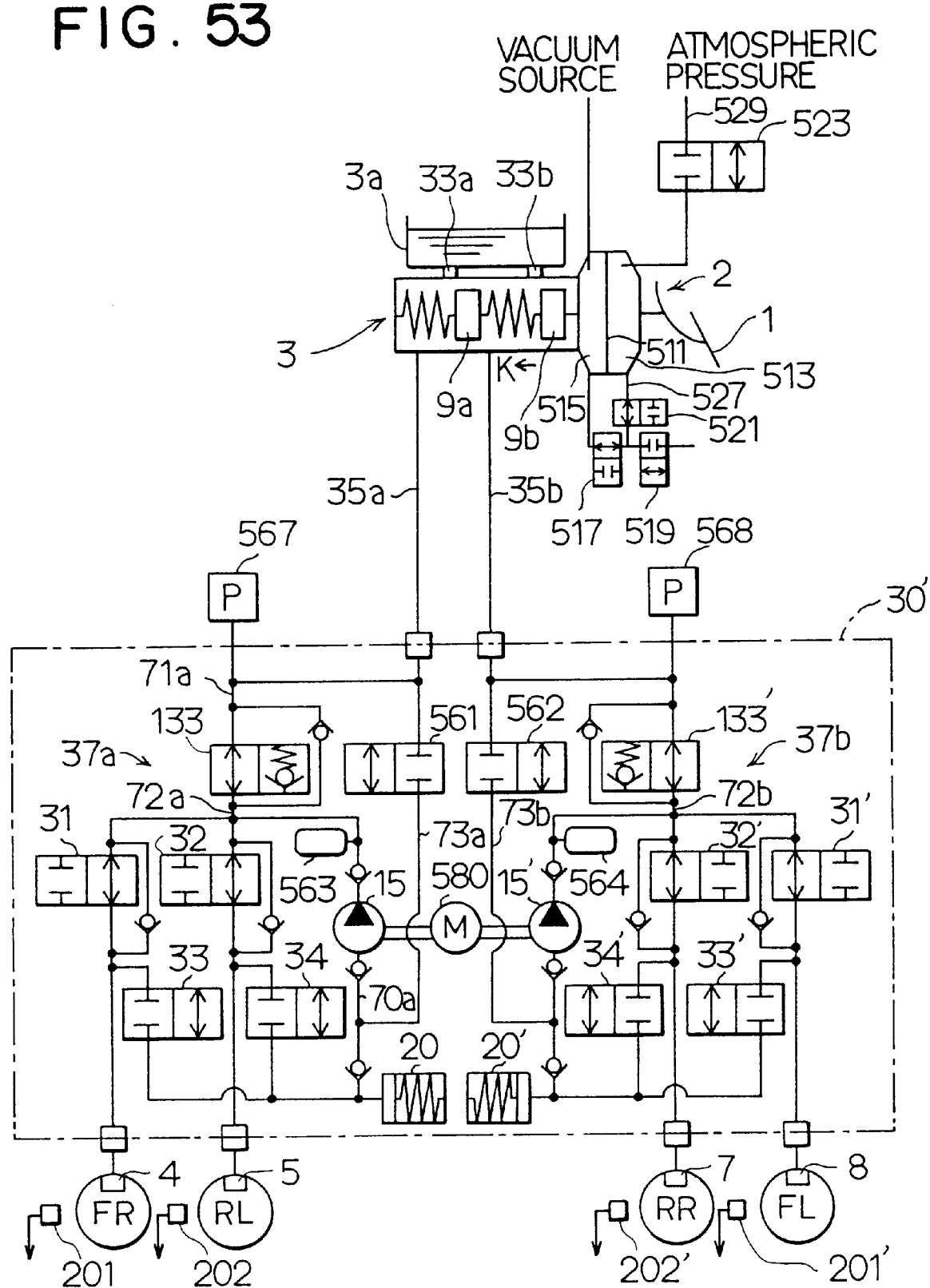
FIG. 53 is a structural view indicating a brake control apparatus of the twenty-fifth embodiment and a peripheral structure thereof.

FIG. 53 indicates a twenty-fifth embodiment, and is a schematic structural view indicating a brake control apparatus for a vehicle capable of performing traction control (i.e., TRC control) to impart braking force to wheels to suppress slippage of the wheel as braking control not due to brake operation by a driver (hereinafter termed "braking control during non-braking"). For devices having a mode of operation similar to the embodiments described above, symbols similar to the foregoing are used.

As shown in FIG. 53, in the brake-controlling apparatus according to the present embodiment, a vacuum booster 2 is interconnected with a tandem type master cylinder 3. A hydraulic control circuit 30', which performs traction control and is made up of two hydraulic systems of diagonal conduit, is connected to the master cylinder 3. The several structures thereof will be described hereinafter.

The vacuum booster 2 exhibits a boosting action, utilizing a pressure differential of intake-manifold vacuum generated by an engine and atmospheric pressure. Further, the vacuum booster 2 regulates the pressure differential in accompaniment with depression of a brake pedal 1 to increase the pressure applied to pistons 9a, 9b of the master cylinder 3.

This vacuum booster 2 is provided with a pressure-converting chamber 513 wherein atmospheric pressure is introduced when boosting action is exhibited, and a vacuum chamber 515 wherein an intake vacuum is maintained. The two chambers 513, 515 are partitioned by a diaphragm 511. The vacuum booster 2 is provided with a first mechanical valve 517, a second mechanical valve 519, and first and second communication control valves 521, 523 to regulate the pressure of the two chambers 513, 515, respectively.

Among these, the first and second mechanical valves 517, 519 are mechanically actuated to an open or closed position in accompaniment with operation of the brake pedal 1. When the brake pedal 1 is depressed, the first mechanical valve 517 is closed and the second mechanical valve 519 is opened. Atmospheric pressure is introduced solely into the pressure-converting chamber 513.

Figure 54:
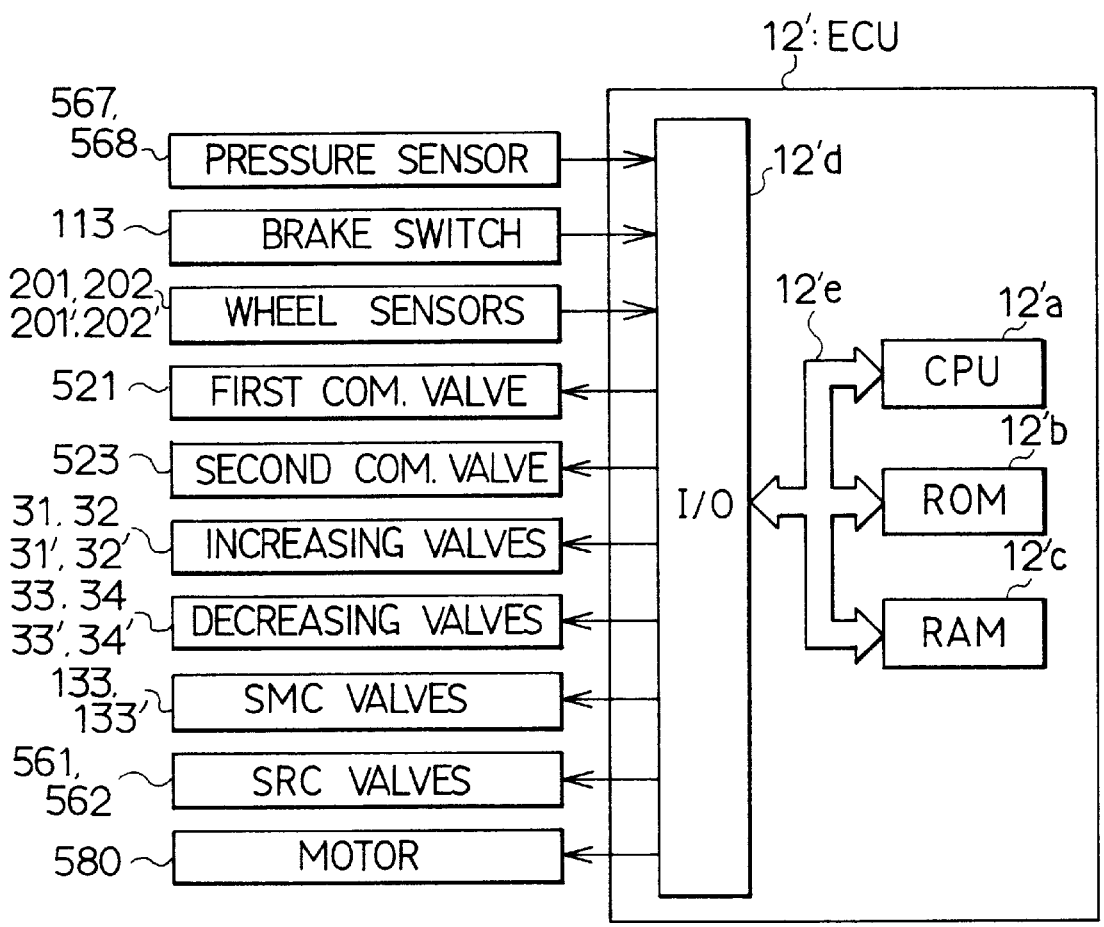
FIG. 54 is a block diagram indicating a structure of an electronic control unit of the twenty-fifth embodiment.

Additionally, the first and second communication control valves 521, 523 are solenoids driven, for example, during traction control to one of two positions, i.e., open or closed, according to a signal from an electronic control unit (ECU 12; see FIG. 54). This first communication control valve 521 is disposed in a first communicating passage 527 to communicate the pressure-converting chamber 513 and the foregoing first and second mechanical valves 517, 519, and is switched off to open the first communicating passage 527. Meanwhile, the second communication control valve 523 is disposed in a second communicating passage 529 to communicate the pressure-converting chamber 515 with an atmospheric-pressure side, and is switched off to close the second communicating passage 529.

The master cylinder 3 is directly connected to a master reservoir 3a via passages 33a, 33b. An open portion (not illustrated) of these passages 33a, 33b on the master cylinder 3 side is provided to be closed by the pistons 9a, 9b where the vacuum booster 2 has been actuated and the pistons 9a, 9b have been shifted in the direction of arrow K.

Additionally, the master cylinder 3 is connected via two brake fluid paths 35a, 35b to first and second hydraulic conduits 37a, 37b, respectively which comprise the hydraulic circuit 30'.

In the hydraulic control circuit 30', a wheel cylinder 4 of a front-right (FR) wheel, and a wheel cylinder 5 of a rear-left (RL) wheel communicate through the first hydraulic conduit 37a. Additionally, a wheel cylinder 7 of a rear-right (RR) wheel and a wheel cylinder 8 of a front-left (FL) wheel communicate through the second hydraulic conduit 37b.

Accordingly, a pressure-increasing control valve 31 and a pressure-reducing control valve 33 control the pressure of the wheel cylinder 4 of the FR wheel. A pressure-increasing control valve 32 and a pressure-reducing control valve 34 control the pressure of the wheel cylinder 5 of the RL wheel. The valves 31–34 are disposed in the first hydraulic conduit 37a. Further, a pressure-increasing control valve 31' and a pressure-reducing control valve 33' control the pressure of the wheel cylinder 7 of the RR wheel, and a pressure-increasing control valve 32' and a pressure-reducing control valve 34' control the pressure of the wheel cylinder 8 of the RL wheel. The valves 31'–34' are disposed in the second hydraulic conduit 37b.

The structure of the first hydraulic conduit 37a will be described hereinafter.

A master cylinder cutoff valve (SMC valve) 133 to cause a hydraulic path 71a to be communicated or interrupted is provided in the first hydraulic conduit 37a between the master cylinder 3 side and the respective pressure-increasing control valves 31, 32. The SMC valve 133 is operative to open a passage 71a when hydraulic pressure on the side of the wheel cylinders 4, 5 reaches at least a predetermined value.

A reservoir 20 to temporarily accumulate brake fluid discharged from the respective pressure-reducing control valves 33, 34 is provided on a downstream side of the respective pressure-reducing control valves 33, 34. A hydraulic pump 15 is provided in a hydraulic path 70a extending from this reservoir 20 to the interval between the SMC valve 133 and the pressure-increasing control valves 31, 32 to take in brake fluid from the reservoir 20 or the master cylinder 3 side and to send brake fluid to a hydraulic path 72a between the SMC valve 133 and the pressure-increasing control valves 31, 32. An accumulator 563 to suppress pulsation in internal hydraulic pressure is disposed in a discharge path for brake fluid from the hydraulic pump 15.

Furthermore, a hydraulic path 73a to supply brake fluid from the master cylinder 3 directly to the hydraulic pump 15 during execution of the traction control which will be described later is provided in the first hydraulic conduit 37a. Further, a reservoir cutoff valve (SRC valve) 561 to communicate or interrupt the hydraulic path 73a is disposed in the hydraulic path 73a.

According to this embodiment in particular, a pressure sensor 567 to detect pressure on the intake side of the hydraulic pump 15 is provided in the hydraulic path 71a between the SMC valve 133 and the master cylinder 3.

Meanwhile, as with the foregoing first hydraulic conduit 37a, the pressure-increasing control valves 31', 32', the pressure-reducing control valves 33', 34', an SMC valve 133', a reservoir 20', a hydraulic pump 15' an accumulator 564, an SRC valve 562, and a pressure sensor 568 are disposed at similar locations in the second hydraulic conduit 37b.

Additionally, as shown in FIG. 54, an ECU 12' to control the brake control apparatus according to the present embodiment is made up primarily of a microcomputer provided with a CPU 12'a, a ROM 12'b, a RAM 12'c, an input/output portion 12d, a bus line 12'e, and the like of known art. Signals from wheel-speed sensors 201, 202, 201', 20'b disposed at the several wheels, a brake switch 113, the pressure sensors 567, 568, and so on are input to the ECU 12'.

A motor 580 to drive the hydraulic pumps 15, 15', the first and second communication control valves 521, 523, the pressure-increasing control valves 31, 32, 31', 32', the pressure-reducing control valves 33, 34, 33', 34', the SMC valves 133, 133', and the SRC valves 561, 562 are driven and controlled based on input signals from the several wheel-speed sensors 201, 202, 201', 202'and the pressure sensors 567, 568, performing traction control and the like.

Action of the vacuum booster 2 in braking operation during non-braking will be described in brief hereinafter.

Figure 55A:
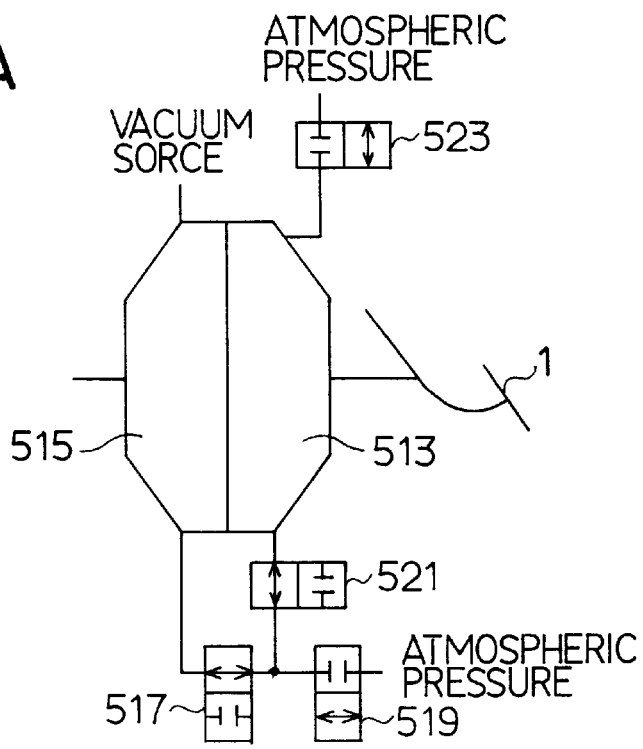
FIGS. 55A and 55B are explanatory diagrams indicating actuation of valves in a vacuum booster shown in FIG. 54.

(1) Boosting Action is not Exhibited (FIG. 55A)

Because this is a time of non-braking wherein brake operation by a driver is not performed, the brake pedal 1 is not depressed. Accordingly, the first mechanical valve 517 remains open and the second mechanical valve 519 remains closed. At this time, the first communication control valve 521 is off and in an open state and the second communication control valve 523 is off and in a closed state. Therefore, atmospheric pressure is not inducted into the pressure-converting chamber 513. The vacuum chamber 515 and the pressure-converting chamber 513 are in a communicated state, and a vacuum from a vacuum source is inducted therewithin.

For this reason, no pressure differential is produced in the two chambers 513, 515, and so boosting action is not exhibited.

Figure 55B:
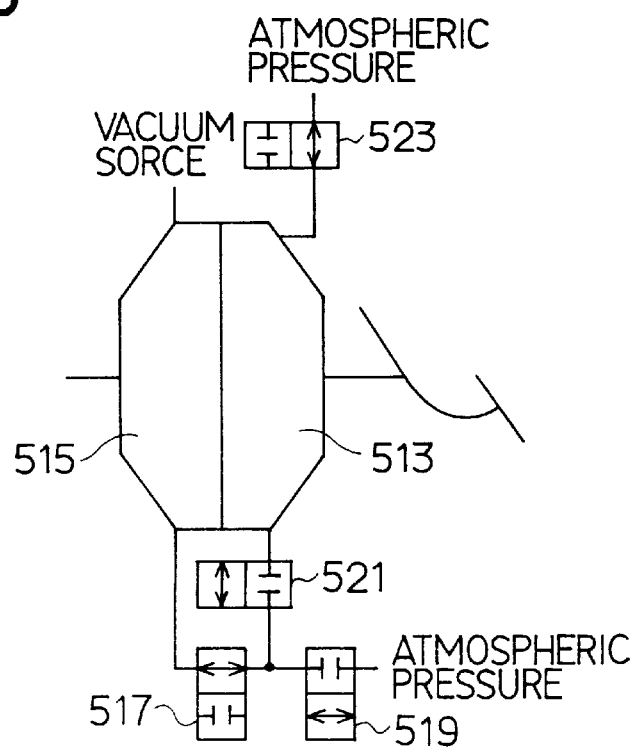

(2) Boosting Action is Exhibited (FIG. 55B)

Because this is a time of non-braking wherein brake operation by a driver is not performed, the brake pedal 1 is not depressed. Accordingly, the first mechanical valve 517 remains open and the second mechanical valve remains closed. At this time, where traction control or the like is performed, the first communication control valve 521 is switched on and closed, and the second communication control valve 523 is switched on and opened. Because of this, communication between the pressure-converting chamber 513 and the vacuum chamber 515 is in an interrupted state. Atmospheric pressure is inducted solely into the pressure-converting chamber 513.

For this reason, a pressure differential of, for example, several bars is produced in the two chambers 513, 515, and so boosting action is exhibited.

Action of the brake-controlling apparatus according to this embodiment will be described next with reference to the flow diagram in FIG. 56 and the timing diagram in FIGS. 57A to 57H.

Figure 56:
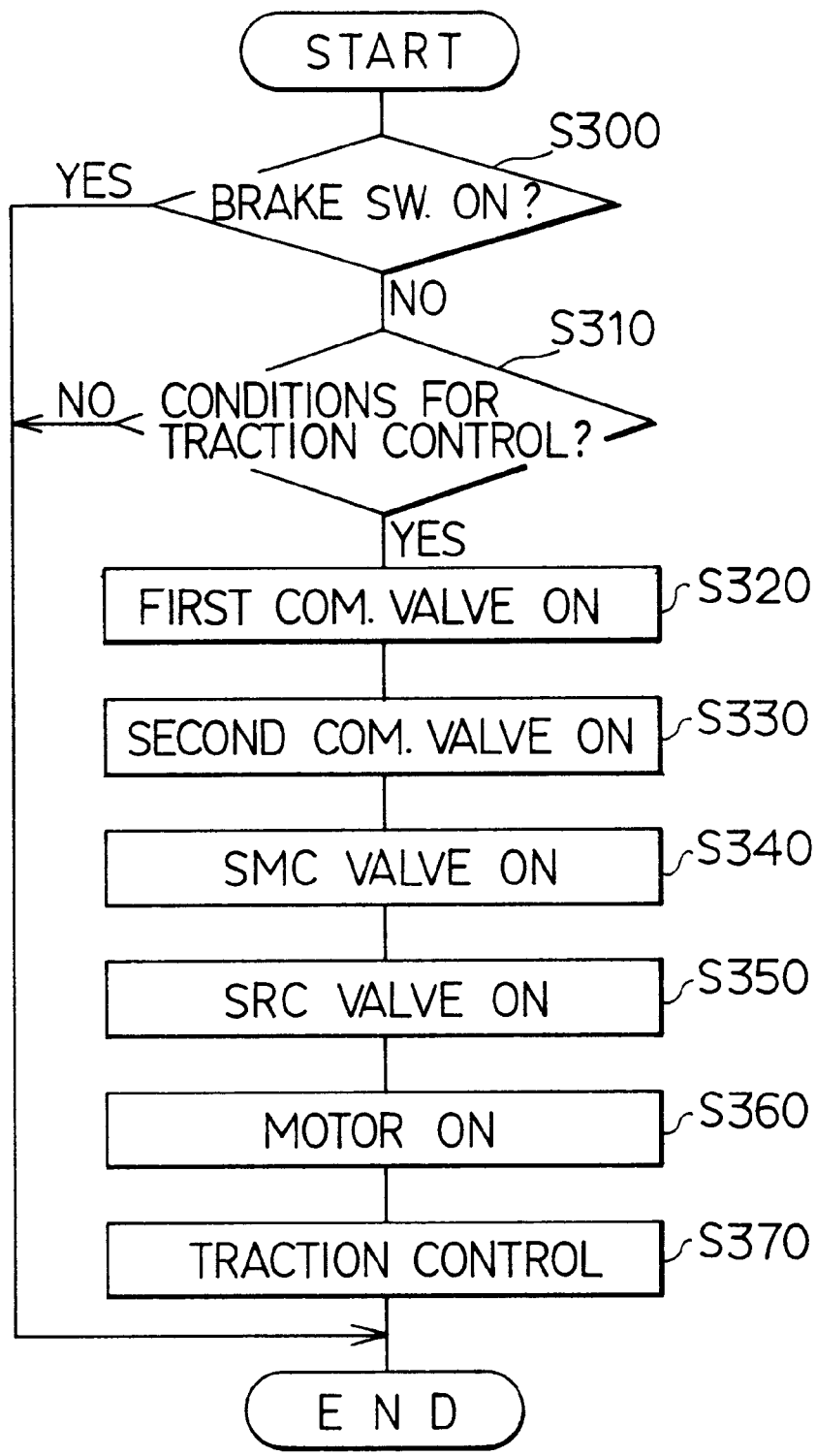
FIG. 56 is a flow diagram indicating control processing of the control unit of the twenty-fifth embodiment.

At step S300 in FIG. 56, it is determined whether the brake pedal 1 has been depressed by determining whether the brake switch 113 is on. When an affirmative determination is made herein that the brake pedal 1 has been depressed, because the state is not a non-braking state, the processing is terminated. When a negative determination is made, the processing advances to step S310.

At step S310, it is determined whether a condition for starting, for example, traction control, has been fulfilled by determining, for example, whether a wheel slip ratio is a predetermined value or more. When an affirmative determination is made herein, the processing advances to step S320; when a negative determination is made, the processing is terminated.

At step S320, to exhibit boosting action by the vacuum booster 2, as shown in FIG. 55B, the first communication control valve 521 is switched on, interrupting communication between the pressure-converting chamber 513 and the vacuum chamber 515. At step S330, the second communication control valve 523 is switched on, introducing atmospheric pressure into the pressure-converting chamber 513.

At this time, a vacuum is introduced into the vacuum chamber 515, and the vacuum booster 2 is actuated by the differential pressure of this vacuum and atmospheric pressure. A low pressure of several bars is thus imparted to the master cylinder 3. That is to say, the intake sides of the hydraulic pumps 15, 15' are preloaded via SRC valves 561, 562 due to the pressure being imparted, and so the hydraulic pumps 15, 15' assume a state wherein rapid discharge of brake fluid subsequent to actuation is possible.

Additionally, due to the pressure being imparted, the brake pedal 1, along with the pistons 9a, 9b, is shifted in the direction of arrow K in FIG. 53, and the passages 33a, 33b to the master reservoir 3a are interrupted.

Next, at step S340, as shown in FIG. 57, the SMC valves 133, 133' are switched on to close the hydraulic paths thereof. Subsequently, at step S350, the SRC valves 561, 562 are switched on to open the hydraulic paths thereof.

Next, at step S360, the motor 580 is switched on, and the hydraulic pumps 15, 15' are actuated. As a result, brake fluid is taken in by the hydraulic pumps 15, 15' not from the master reservoir 3a but rather from the master cylinder 3, via the SRC valves 561, 562 and the hydraulic paths 73a, 73b, and is discharged to the hydraulic paths 72a, 72b leading to the wheel cylinders 4, 5, 7, 8.

Next, at step S370, the pressure-increasing control valves 31, 32, 31', 32, and the pressure-reducing control valves 33, 34, 33', 34' are controlled and normal traction control is performed in accordance with the slippage state of the wheel, as shown in FIGS. 57G and 57H. After that, the processing is terminated.

In this way, according to this embodiment, when traction control, which is braking control during a non-braking state, is performed, action to impart braking force to the wheels in normal traction control, wherein the motor 580 is switched on, the SMC valves 133, 133' are switched on, the SRC valves 561, 562 are switched on, and pressure-increasing control valves 31, 32, 31', 32 and the pressure-reducing control valves 33, 34, 33', and 34' are controlled. In addition, the first and second communication control valves 521, 523 are switched on so that booster action by the vacuum booster 2 is generated. As a result, pre-loading, which slightly increases the pressure of the intake side of the hydraulic pumps 15, 15', is performed by applying a predetermined low pressure to the master cylinder 3.

Figure 52:
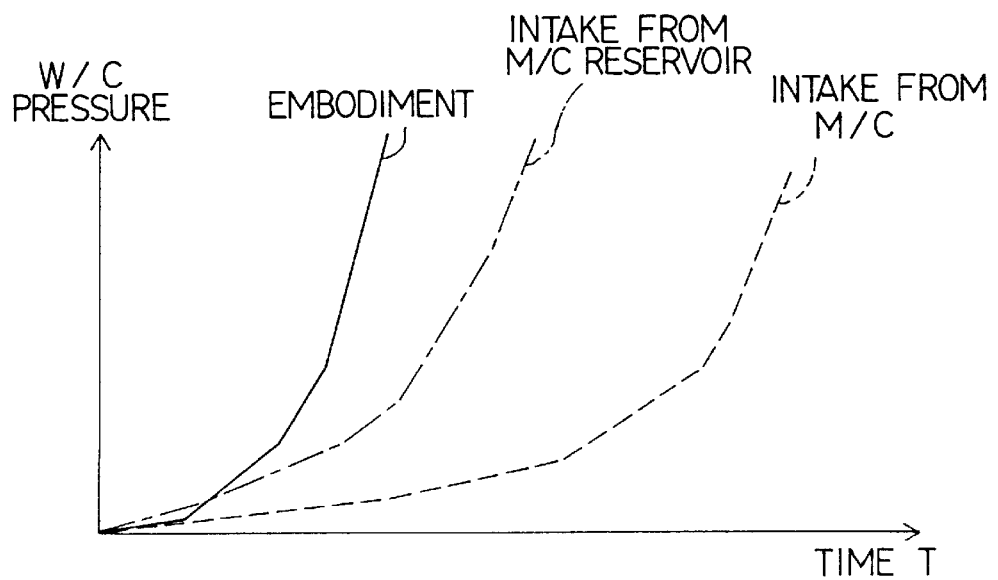
FIG. 52 is an explanatory diagram indicating an effect of a twenty-fifth embodiment.

For this reason, when the hydraulic pumps 15, 15' are actuated in a state where this pre-loading has been performed, wheel cylinder pressure can be rapidly increased as shown in FIG. 52. Accordingly, traction control response is enhanced.

In particular, because this embodiment does not utilize a structure which takes in brake fluid from the master reservoir 3a, but rather utilizes a structure which takes in brake fluid from the master cylinder 3, the structure thereof can be simplified. As a result, high response and low cost can both be realized.

Furthermore, according to this embodiment, when pressure is imparted by the vacuum booster 2, the passages 33a, 33b from the master reservoir 3a to the master cylinder 3 are interrupted so that brake fluid from other than the master cylinder 1 is not introduced into the hydraulic control circuit 30'. Therefore, the amount of fluid consumed by the master cylinder 3 matches the amount of fluid consumed by the wheel cylinders 4, 5, 7, 8. For this reason, deceleration G corresponding to the depressed position of the brake pedal 1 is obtained, thereby enhancing driving feel.

Moreover, an example of controlling the brake fluid pressure in both systems of the first and second hydraulic conduits 37a, 37b is given in the description of this embodiment to clarify the several valves and the like utilized in the control. However, it is also acceptable to control the brake fluid pressure of solely one or the other hydraulic conduit.

Additionally, when controlling the hydraulic conduit of solely one system in the first and second hydraulic conduits 37a, 37b while in braking control during a non-braking state, pressure due to pressurization by the vacuum booster 2 is also generated in the other system. However, because this is low pressure it does not particularly become a problem. To the contrary, this is efficacious in the sense of filling a gap between the wheel cylinders 4, 5, 7, 8 and the pads within the relevant cylinders. In, for example, VSC control (i.e., control which can prevent lateral slippage of the vehicle and avoid obstacles when the steering wheel has been suddenly turned during travel), even when spin has been prevented by control of one system, the other system is substantially invariably controlled to prevent rock-back of the vehicle thereafter. Therefore, prior eliminating the play of stroke of the other system improves hydraulic response.

Twenty-Sixth Embodiment

A twenty-sixth embodiment will be described next.

Because a brake-controlling apparatus according to this embodiment differs from the foregoing twenty-fifth embodiment solely in the vacuum booster 2, structure otherwise is similar to the above-described twenty-fifth embodiment, and so description relating solely to the vacuum booster 2 will be given hereinafter.

Figure 58A:
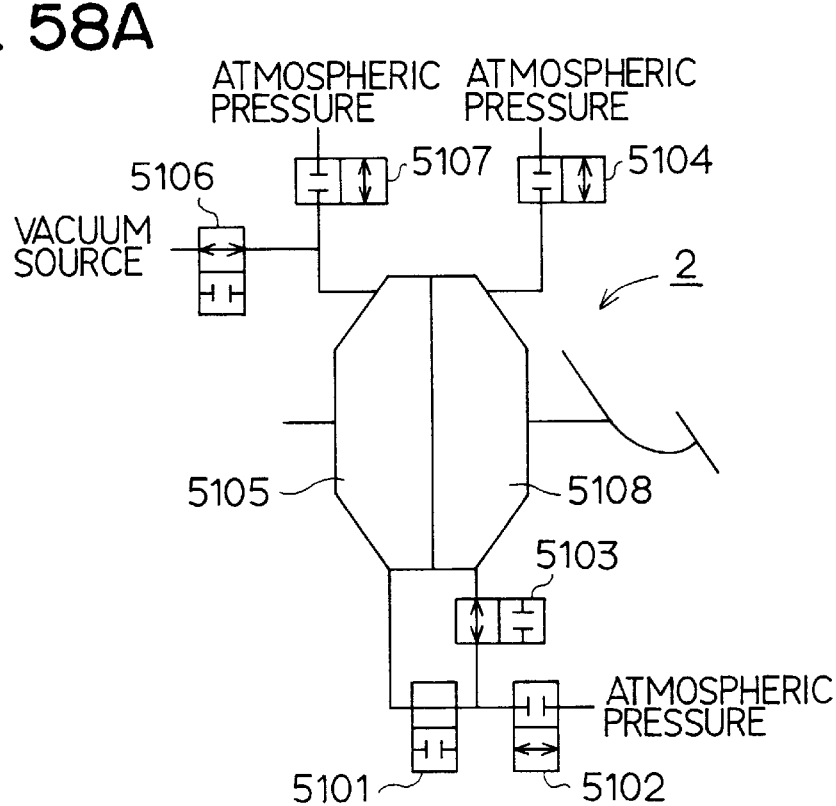
FIGS. 58A and 58B are schematic structural views indicating a vacuum booster of a twenty-sixth embodiment.

As shown in FIG. 58A, in addition to a first mechanical valve 5101, a second mechanical valve 5102, a first communication control valve 5103, and a second communication control valve 5104 similar to the foregoing twenty-fifth embodiment, a vacuum booster 2 utilized in this embodiment provides a third communication control valve 5106 in a communicating passage communicating a vacuum chamber 5105 and a vacuum source, together with providing a fourth communication control valve 5107 in a communication passage communicating the vacuum chamber 5105 with an atmospheric-pressure side.

Accordingly, when braking control during non-braking is started, the first communication control valve 5103 is switched on (closed) and the second communication control valve 5104 is switched on (open). Also, the third communication control valve 5106 is caused to remain off (open) and the fourth communication control valve 5107 is caused to remain off (closed). As a result, the vacuum chamber 5105 is in a state where vacuum is introduced therewithin, and only a pressure-converting chamber 5108 is caused to be in a state where atmospheric pressure is introduced therewithin. Accordingly, a pressure differential is produced between the two chambers 5105, 5108, and boosting action of the vacuum booster 2 is exhibited.

Herein, in a case of attempting to instantly stop the boosting action of the vacuum booster 2, the third communication control valve 5106 is switched off (closed) and the introduction of a vacuum into the vacuum chamber 5105 is interrupted. Along with the above, the fourth communication control valve 5107 is switched on (open), and introduction of the atmosphere into the vacuum chamber 5105 is performed. As a result, both chambers 5105, 5108 reach atmospheric pressure and the pressure differential disappears, thereby stopping boosting action.

Figure 58B:
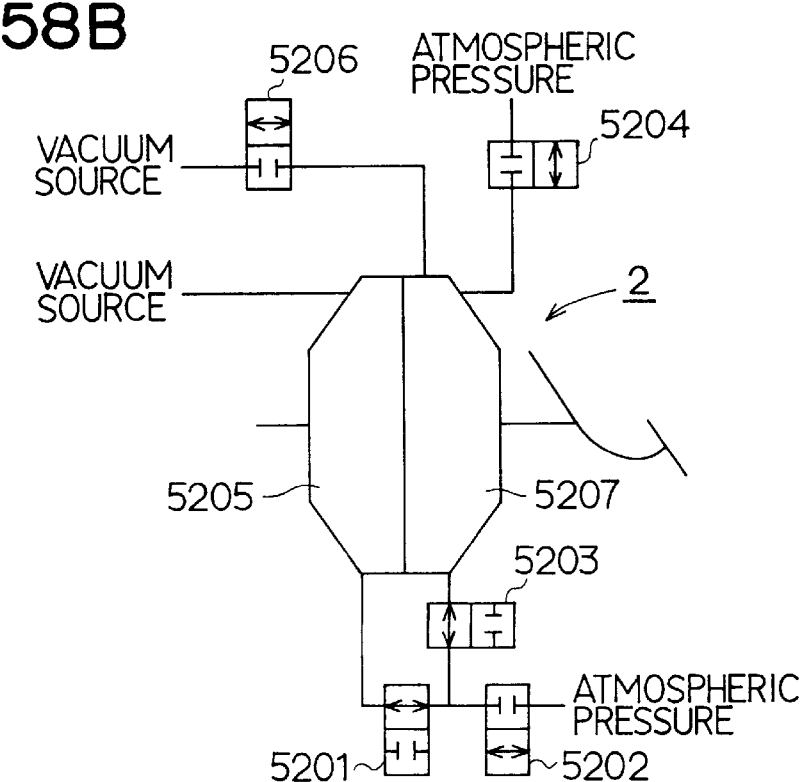

Additionally, as shown in FIG. 58B, in addition to the first mechanical valve 5201, the second mechanical valve 5202, the first communication control valve 5203, and the second communication control valve 5204 similar to the foregoing twenty-fifth embodiment, the vacuum booster 2 utilized in this embodiment may be provided with a fifth communication control valve 5206 in a communication passage communicating the pressure-converting chamber 5207 with the vacuum source.

Accordingly, when braking control during non-braking is initiated, the first communication control valve 5203 is switched on (closed) and the second communication control valve 5204 is switched on (open). Also, the fifth communication control valve 5206 is caused to remain off (closed). As a result, a pressure differential is produced between the vacuum chamber 5205 and the pressure-converting chamber 5207, and boosting action is exhibited.

Herein, in a case of attempting to instantly stop the boosting action, the second communication control valve 5204 is switched off (closed) and the introduction of atmospheric pressure into the pressure-converting chamber 5207 is interrupted. Also, the fifth communication control valve 5206 is switched on (open), and introduction of a vacuum into the pressure-converting chamber 5207 is performed. As a result, a vacuum is formed in both chambers 5205, 5207. The pressure differential disappears, and so the boosting action is stopped.

Modifications of the twenty-fifth and twenty-sixth embodiments are indicated hereinafter.

(1) Various types of hydraulic control circuit other than the hydraulic control circuit of the foregoing embodiments can be utilized.

(2) An example of a device utilizing an engine vacuum and atmospheric pressure as the vacuum booster was given in the foregoing embodiments, but a device utilizing an alternative pressure source can be utilized as the vacuum booster.

That is to say, because it is sufficient to introduce higher pressure to the pressure-converting chamber than to the vacuum-chamber side to cause boosting action of the vacuum booster 2, various types of structure causing such a pressure differential to be generated can be utilized.

(3) Various types of structure introducing the same pressure into the vacuum chamber and the pressure-converting chamber of the vacuum booster, causing the boosting action to be stopped, can be utilized other than the method of stopping boosting action indicated in the foregoing embodiments.

(4) Additionally, a hydro booster may be utilized in replacement of the vacuum booster.

(5) In the foregoing embodiments, the extent of boosting action of the vacuum booster may be controlled, and back pressure of a hydraulic pump may be controlled at a target hydraulic pressure based on hydraulic pressure (back pressure) at an intake side of the hydraulic pump detected by a pressure sensor.

For example, when back pressure of the hydraulic pump is excessively large, a first communication control valve provided in a communicating passage communicating, for example, a vacuum chamber and a pressure-converting chamber may be duty-controlled to cause a pressure differential of the vacuum chamber and the pressure-converting chamber to become smaller. As a result, the differential pressure of the two chambers is reduced, and so boosting action also is reduced. Accordingly, the back pressure of the hydraulic pump also is reduced.

(6) Traction control was given as an example in the foregoing embodiments, but this invention naturally can be applied in various types brake control when a brake pedal is not depressed, such as VSC control, control of an automatic brake to prevent collision, and so on.

What is claimed is:

1. A brake control apparatus for a vehicle, comprising:
 a brake fluid pressure generating device which has a generating source to generate a first brake fluid pressure to apply braking force to a vehicle;
 a wheel braking force generating device which generates a braking force at a wheel in response to a brake fluid pressure applied thereto;
 a conduit system which communicates said brake fluid pressure generating device with said wheel braking force generating device; and
 a pressure amplifying device which divides said conduit system into a first conduit subsystem and a second conduit subsystem, said first conduit subsystem conveying brake fluid between said brake fluid pressure generating device and said pressure amplifying device at said first brake fluid pressure and said second conduit subsystem conveying brake fluid between said pressure amplifying device and said wheel braking force generating device at a second brake fluid pressure when said first brake fluid pressure is generated by said brake fluid pressure generating device, said pressure amplifying device including a pump and being constructed and arranged to move brake fluid from said first conduit subsystem to said second conduit subsystem so that said second brake fluid pressure is greater than said first brake fluid pressure,
 wherein said pressure-amplifying device is provided with a holding device to hold a differential pressure between said second brake fluid pressure at said second conduit subsystem and said first brake fluid pressure at said first conduit subsystem, and wherein said second conduit subsystem is provided with an antiskid controlling system, comprising:
- a pressure adjusting device for increasing or decreasing brake fluid pressure applied to said wheel braking force generating device to realize an optimal slip state of a wheel;
- a reservoir to accumulate brake fluid discharged from the wheel braking force generating device during operation of said pressure adjusting device; and
- a discharging device to discharge brake fluid accumulated in said reservoir.

2. A brake control apparatus for a vehicle as recited in claim 1, wherein said pressure-amplifying device is provided with a holding device to hold said second brake fluid pressure increased beyond said first brake fluid pressure at said second conduit subsystem.

3. A brake control apparatus for a vehicle as recited in claim 1, wherein said pressure-amplifying device is provided with a holding device to hold said second brake fluid pressure at said second conduit subsystem at a higher level than said first brake fluid pressure at said first conduit subsystem by attenuating pressure from said second brake fluid pressure to said first brake-fluid pressure when brake fluid flows from said second conduit subsystem to said first conduit subsystem.

4. A brake control apparatus for a vehicle as recited in claim 1, wherein said pressure-amplifying device is provided with first compensation device to cause brake fluid pressure of said second conduit subsystem to be said first brake fluid pressure or more during vehicle braking.

5. A brake control apparatus for a vehicle as recited in claim 1, wherein said discharging device is structured by the pump as said brake-fluid moving device.

6. A brake control apparatus for a vehicle as recited in claim 5, further comprising:
- a switching device for switching a source of brake fluid intake of said pump to a first conduit-subsystem side of said reservoir in accordance with a quantity of brake fluid accumulated in said reservoir.

7. A brake control apparatus for a vehicle, comprising:
- a master cylinder which generates a master cylinder pressure in response to a braking operation;
- a wheel cylinder which causes wheel braking force to be generated at a wheel when receiving the master cylinder pressure from the master cylinder;
- a holding valve unit disposed between the master cylinder and the wheel cylinder, which is capable of holding a wheel cylinder pressure higher than the master cylinder pressure;
- a pump which takes in brake fluid from a conduit between the master cylinder and the holding valve unit when the master cylinder pressure is generated and which discharges the brake fluid into a conduit between the holding valve unit and the wheel cylinder;
- an intake conduit which connects an intake port of the pump and the conduit between the master cylinder and the holding valve unit;
- a discharge conduit which connects a discharge port of the pump and the conduit between the holding valve unit and the wheel cylinder;
- an anti-skid control valve unit provided between the holding valve unit and the wheel cylinder for performing anti-skid control, the anti-skid control valve unit discharging brake fluid into the intake conduit when the wheel cylinder pressure is to be reduced;
- a reservoir disposed in the intake conduit for accumulating the brake fluid discharged from the wheel cylinder via the anti-skid control valve unit.

8. The apparatus of claim 7, wherein the reservoir is provided with a switching device for switching a source of brake fluid intake of the pump between the master cylinder side of said reservoir in accordance with a quantity of brake fluid accumulated in the reservoir.

9. The apparatus of claim 7, wherein the reservoir is provided with a reservoir chamber for accumulating brake fluid, the reservoir chamber being connected to the intake conduit leading to both the master cylinder and the pump intake port.

10. A vehicle brake control apparatus, comprising:
- a master cylinder which generates a master cylinder pressure in response to a braking operation;
- a wheel cylinder which causes wheel braking force to be generated at a wheel when receiving the master cylinder pressure from the master cylinder;
- a holding valve unit disposed between the master cylinder and the wheel cylinder, which is capable of holding a wheel cylinder pressure higher than the master cylinder pressure;
- an anti-skid control valve unit provided between the holding valve unit and the wheel cylinder for adjusting a wheel cylinder pressure for performance of anti-skid control;
- a reservoir provided with a reservoir chamber for accumulating brake fluid discharged from the wheel cylinder via the anti-skid control valve unit during performance of anti-skid control;
- a pump which takes in brake fluid from a master cylinder side via the reservoir chamber when the master cylinder pressure is generated and which discharges the brake fluid into a conduit between the holding valve unit and the wheel cylinder;
- an intake conduit which connects a conduit between the master cylinder and the holding valve member to the reservoir chamber and also connects the reservoir chamber to an intake port of the pump; and
- a discharge conduit which connects a discharge port of the pump and the conduit between the holding valve unit and the wheel cylinder.

11. A vehicle brake control apparatus, comprising:
- a master cylinder which generates a master cylinder pressure in response to a braking operation;
- a wheel cylinder which causes wheel braking force to be generated at a wheel when receiving the master cylinder pressure from the master cylinder;
- a holding valve unit disposed between the master cylinder and the wheel cylinder, which is capable of holding a wheel cylinder pressure higher than the master cylinder pressure;
- a connecting conduit which starts from a conduit between the master cylinder and the holding valve unit and extends to a conduit between the holding valve unit and the wheel cylinder;
- a pump disposed in the connecting conduit for taking in brake fluid having the master cylinder pressure from said master cylinder side and for discharging the brake fluid to the wheel cylinder side, whereby a wheel cylinder pressure is increased to a level higher than the master cylinder pressure; and a switching mechanism provided between the master cylinder and an intake port of the pump in the connecting conduit, for closing the connecting conduit when a quantity of brake fluid accumulated in the reservoir chamber is greater than a predetermined quantity as well as when the master cylinder pressure is generated and the pump is not driven, and for opening the connecting conduit when the master cylinder pressure is generated, the pump is driven, and a quantity of brake fluid accumulated in the reservoir chamber is less than the predetermined quantity.

12. The apparatus of claim 11, further comprising:

an anti-skid control device for controlling a wheel slip state by adjusting a wheel cylinder pressure;

wherein a discharging conduit of the anti-skid control device is connected to the reservoir chamber so that brake fluid discharged from the wheel cylinder is accumulated in the reservoir chamber when the anti-skid control device reduces the wheel cylinder pressure.

* * * * *